US012379822B2

(12) United States Patent  
Sepulveda et al.

(10) Patent No.: US 12,379,822 B2  
(45) Date of Patent: Aug. 5, 2025

(54) DEVICES, METHODS, AND GRAPHICAL USER INTERFACES FOR DISPLAYING MENUS, WINDOWS, AND CURSORS ON A DISPLAY WITH A NOTCH

(71) Applicant: Apple Inc., Cupertino, CA (US)

(72) Inventors: Raymond S. Sepulveda, Portland, OR (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/949,111

(22) Filed: Sep. 20, 2022

(65) Prior Publication Data

US 2023/0101528 A1     Mar. 30, 2023

Related U.S. Application Data

(60) Provisional application No. 63/248,360, filed on Sep. 24, 2021.

(51) Int. Cl.
*G06F 3/0482* (2013.01)
*G06F 3/0481* (2022.01)
(Continued)

(52) U.S. Cl.
CPC .......... *G06F 3/0482* (2013.01); *G06F 3/0481* (2013.01); *G06F 3/04817* (2013.01); *G06F 3/04886* (2013.01); *G06F 3/0488* (2013.01)

(58) Field of Classification Search
CPC .. G06F 3/0482; G06F 3/0481; G06F 3/04817; G06F 3/0488
See application file for complete search history.

(56) References Cited

U.S. PATENT DOCUMENTS 6,624,831 B1 *   9/2003   Shahine ................. G06F 3/0482
                                                              715/825
2009/0327871 A1   12/2009   Wolf et al.
(Continued)

FOREIGN PATENT DOCUMENTS

EP         3817350 A1      5/2021
KR    20130092934 A        8/2013

OTHER PUBLICATIONS

International Search Report and Written Opinion, dated Mar. 3, 2023, received in International Patent Application No. PCT/US2022/044459, which corresponds with U.S. Appl. No. 17/949,111, 24 pages.

*Primary Examiner* — Roberto Borja
(74) *Attorney, Agent, or Firm* — Morgan, Lewis & Bockius LLP

(57) ABSTRACT

A request to display a user interface that includes a menu along a first edge of a user interface that corresponds to a first edge of a display region is received. The menu includes multiple menu objects, including a first and a second menu object. In response to receiving the request, and if the display generation component is not capable of displaying content in a respective portion of the first edge of the display region, the first menu object is displayed on a first side and the second menu object is displayed on a second side of the respective portion, such that the respective portion is between the first menu object and the second menu object met. And, if the display generation component is capable of displaying content in the respective portion, the first and second menu objects are displayed adjacent to one another in the display region.

34 Claims, 50 Drawing Sheets

(51) Int. Cl.
 *G06F 3/04817* (2022.01)
 *G06F 3/04886* (2022.01)
 *G06F 3/0488* (2022.01)

(56) References Cited

U.S. PATENT DOCUMENTS

| | | | |
|---|---|---|---|
| 2011/0063491 A1* | 3/2011 | Kim | H04N 23/631 |
| | | | 345/173 |
| 2012/0036471 A1* | 2/2012 | Swanson | G06F 3/0482 |
| | | | 715/779 |
| 2013/0239015 A1 | 9/2013 | Forest | |
| 2018/0017996 A1* | 1/2018 | Ryu | G06F 1/1643 |
| 2018/0088748 A1* | 3/2018 | Ozer | G06F 3/0481 |
| 2019/0107943 A1 | 4/2019 | Daioku et al. | |
| 2019/0281154 A1* | 9/2019 | Choi | G06F 3/0486 |
| 2020/0310627 A1* | 10/2020 | Ning | G06F 9/451 |
| 2020/0409545 A1 | 12/2020 | Wang et al. | |
| 2021/0132756 A1* | 5/2021 | Zhang | G06F 3/048 |
| 2021/0248981 A1* | 8/2021 | Chen | G09G 5/14 |
| 2022/0038568 A1* | 2/2022 | Chen | G06F 3/0486 |

* cited by examiner

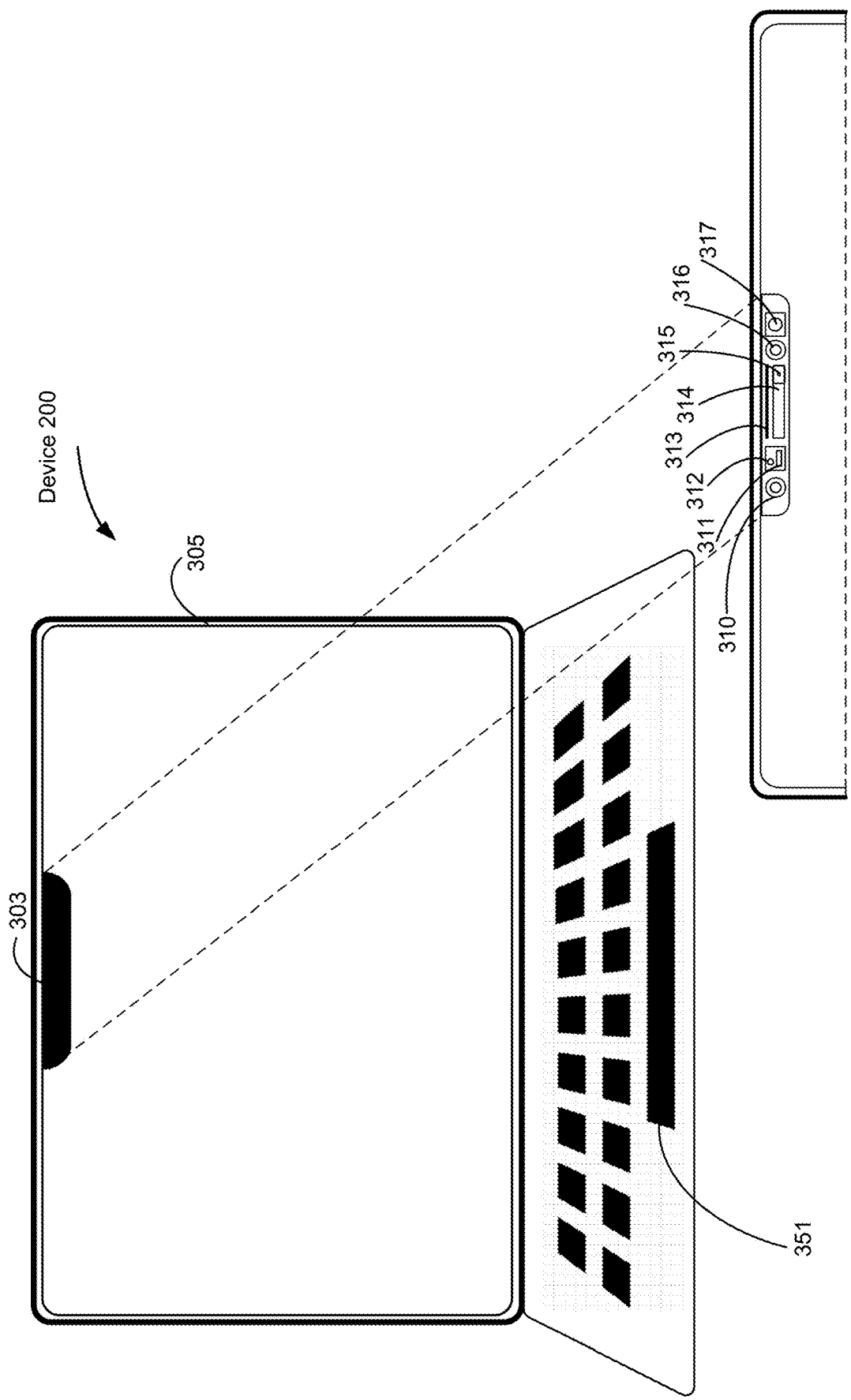

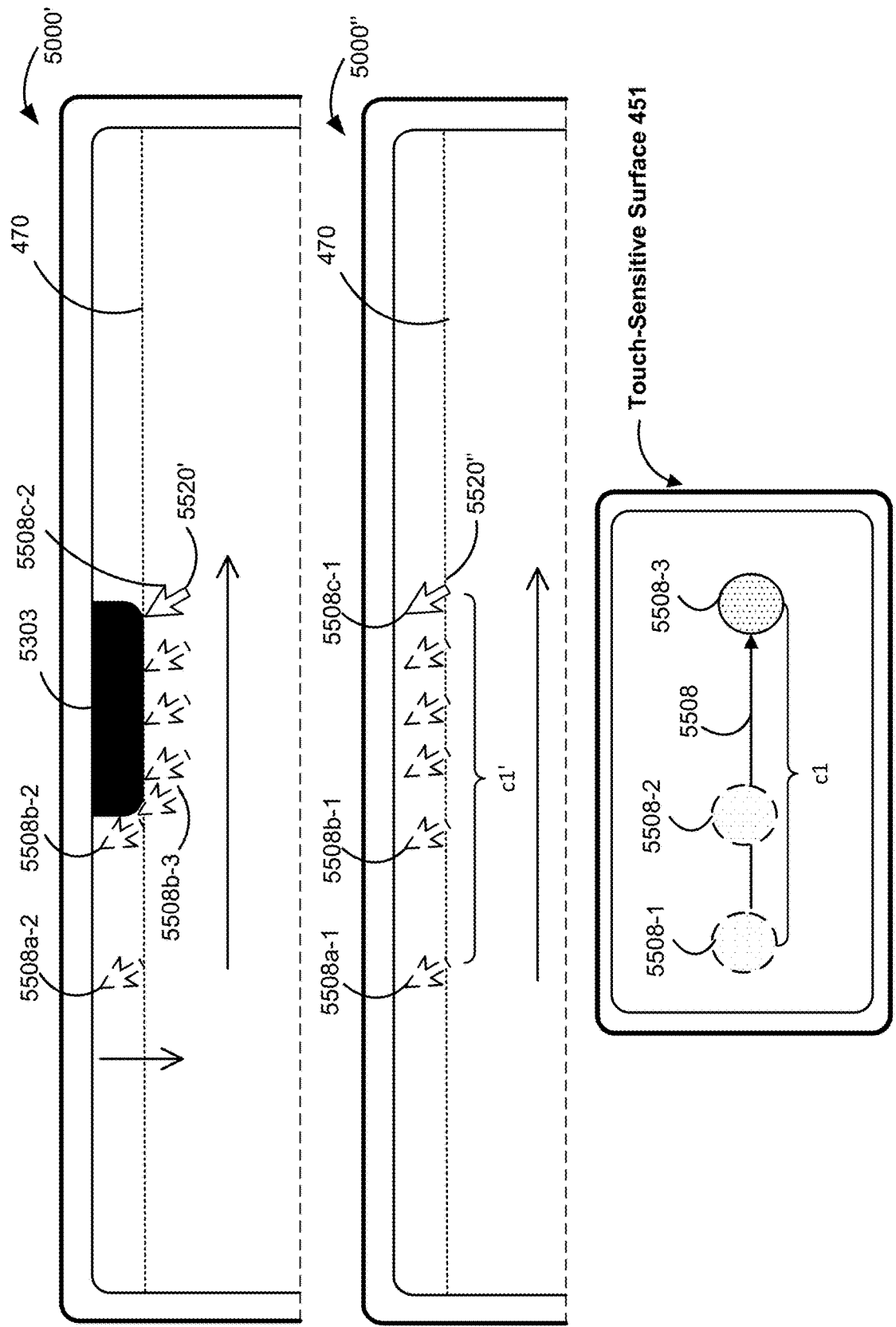

(A)

---

614 In accordance with a determination that there is insufficient space to distribute the multiple menu objects at the first and second sides of the respective portion, display less than all of the multiple menu objects according to a pre-determined priority 616 The multiple menu objects include one or more application menu items and one or more system menu items, and displaying less than all of the multiple menu objects according to a pre-determined priority comprises prioritizing the display of application menu items over system menu items.

618 The multiple menu objects multiple menu objects include application menu items and system menu items. Displaying less than all of the multiple menu objects according to a pre-determined priority comprises: displaying some of the system menu items and displaying some of the application menu items, wherein displaying some of the system menu items is prioritized over displaying the application menu items.

618 Add undisplayed system menu items of the multiple menu items to a system command menu that can be accessed from the display region

---

(B)

620 The respective portion is a notch in the display region

622 The display region along the first edge of the display region includes a first display region on the first side of the respective portion and a second display region on the second side of the respective portion, and wherein a first set of menu objects of the multiple menu objects are application menu items that are displayed in the first display region, and a second set of menu objects of the multiple menu objects are system menu items that are displayed in the second display region

724 The respective portion is a notch in the display region while detecting the input moving the application window, and before detecting the end of the input, display portions of the application window that do not overlap with the non-display region while forgoing display of portions of the application window that would have overlapped with the non-display region 726 While detecting the input moving the application window, and before detecting the end of the input, in accordance with a determination that the input requests to move the application window through the non-display region, shift the application while the application is being moved to avoid the location of the non-display region while the application is being moved 728 Display a menu along a first edge of the user interface that corresponds to a first edge of the display region, wherein the menu includes multiple menu objects. Detect, via the one or more input devices, a request to display the application window in a full-screen mode. In response to the request to display the application window in the full-screen mode: cease displaying the menu bar, including ceasing to display the first and the second menu objects; and display the application window in the full-screen mode without the application window overlapping the non-display region.

730 Displaying the application window in full-screen mode without any portion of the application window overlapping the non-display region includes displaying the application window such that a top edge of the application window is adjacent to a bottom edge of the non-display region, and display areas of the display region above the top edge of the application window are displayed in a color matching a color of the non-display region 732 While displaying the application window in full-screen mode, detect, via the one or more input devices, a request to display the menu bar. In response to the request to display the menu bar, display the menu bar in the color that matches the color of the non-display region 734 Displaying the menu bar further includes displaying the multiple menu objects in the menu bar in a color that contrasts the color of the menu bar and the non-display region 736 In response to detecting the request to display the application window in full-screen mode, cease to display the multiple menu objects 738 While displaying the application window in full-screen mode, detect a movement of a cursor in an area adjacent the non-display region. In response to detecting the movement of the cursor, display one or more of the multiple menu objects 740 The one or more of the multiple menu objects are displayed in an appearance that is different from an appearance when the application window is not in full-screen mode (B)

742 The respective portion is a notch in the display region

744 Detect, via the one or more input devices, a request to display the application window in full-screen mode. In response to the request to display the application window in full-screen mode: cease display of the menu bar including the first menu object and the second menu object, and display the application window in full-screen mode such that the non-display region is a notch in the application window where content is not displayed

Figure 7C (A)

822 The input includes a request to move the focus selector in a first direction. Providing the visual feedback includes: moving the focus selector in the first direction by an amount determined based on the input, and moving the focus selector in a second direction, different from the first direction, by an amount determined based on a distance between the location of the focus selector and an edge of the predetermined region.

824 After moving the focus selector in the first direction by the amount determined based on the input and moving the focus selector in the second direction by the amount determined based on the distance between the location of the focus selector and the edge of the predetermined region, detect further input corresponding to a request to move the focus selector in the first direction. In response to detecting the further input: move the focus selector in the first direction by an amount determined based on the further input, and move the focus selector in a direction that is opposite to the second direction

Figure 8B

DEVICES, METHODS, AND GRAPHICAL USER INTERFACES FOR DISPLAYING MENUS, WINDOWS, AND CURSORS ON A DISPLAY WITH A NOTCH

RELATED APPLICATIONS

This application claims priority to U.S. Provisional Application Ser. No. 63/248,360, filed Sep. 24, 2021, which is incorporated by reference in its entirety.

TECHNICAL FIELD

This relates generally to electronic devices that display content on displays with notches.

BACKGROUND

The use of electronic devices that have displays, including touch-sensitive displays, has increased significantly in recent years. Examples of such devices include, but are not limited to laptop computers, smartphones, tablet computers, desktop computers, wearable electronic devices such as watches and glasses, etc. There is a constant demand for improving computer display areas in variety of respects, including maximizing screen size. However, even though making devices with large display areas is an important goal, many of these devices also need to be compact so that they can fit in variety of settings, such as on desks and on tables, in bags, in pockets, in users' hands, etc.

Accordingly, there is a trend in the design of electronic devices for maximizing display areas. Screen-to-body ratio may be improved in variety of ways such as by relocating hardware such as microphones or speakers, by making hardware buttons virtual, and/or by reducing the size of the display's bezel (e.g., a frame around the screen). Some components such as a front facing camera, however, typically cannot be relocated. While reducing the size of the bezel can help maximize the display area, the front facing camera generally cannot be housed in a very thin bezel.

SUMMARY

Accordingly, there is a need for electronic devices with displays that have improved or increased screen-to-body ratios. One solution that allows for a reduction in the size of the bezel (thereby increasing the screen-to-body ratios) without relocating front-facing hardware components, introduces a notch at the top of the display. The notch extends into the display, leaving screen space available around the notch that extends into the two upper corners of the display. Introducing the notch provides space on the display on both sides of the notch that can be utilized to improve the user experience. Displays with notches, and more efficient methods and interfaces for displaying interaction of menu bar its items, windows, and cursors with a notch on a display. Such methods and interfaces optionally complement or replace conventional methods for user interaction with menu bars and menu bar items, application windows, and cursors on displays without a notch. Such methods and interfaces reduce the number, extent, and/or nature of the inputs from a user, provide continued visual feedback to the user, and/or produce a more efficient human-machine interface. For battery-operated devices, such methods and interfaces conserve power and increase the time between battery charges.

The embodiments described herein are suitable for displays of a variety of devices or computer systems, such as desktop computers, portable devices (e.g., a notebook computer, tablet computer, or handheld device), personal electronic devices (e.g., a wearable electronic device, such as a watch), devices with a touchpad, and in some embodiments, devices that have a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device or a computer system that is in communication with a display generation component having a display region. The method includes receiving a request to display a user interface that includes a menu along a first edge of the user interface that corresponds to a first edge of the display region. The menu includes multiple menu objects, including a first menu object and a second menu object. The method further includes in response to receiving the request to display the user interface that includes the menu that includes multiple menu objects, and in accordance with a determination that the display generation component is not capable of displaying content in a respective portion of the first edge of the display region, displaying the first menu object on a first side of the respective portion of the first edge of the display region and displaying the second menu object on a second side of the respective portion of the first edge of the display region, such that the respective portion is between the first menu object and the second menu object met. The method further includes in response to receiving the request to display the user interface that includes the menu that includes multiple menu objects, and in accordance with a determination that the display generation component is capable of displaying content in the respective portion of the first edge of the display region, displaying in the display region the first and second menu objects adjacent to one another.

In accordance with some embodiments, a method is performed at a computer system that is in communication with a display generation component having a display region and a non-display region. The method includes displaying, via the display generation component, an application window. The method further includes detecting, via the one or more input devices, an input moving the application window. The method further includes while detecting the input moving the application window, moving the application window in accordance with the input to a first position. The method further includes detecting an end of the input. The method further includes in response to detecting the end of the input, and in accordance with a determination that at least a portion of the application window overlaps with the non-display region, moving the application window from the first position to a different second position wherein the second position for the application window is automatically selected so that the application window does not overlap with the non-display region. The method further includes in response to detecting the end of the input, and in accordance with a determination that the application window does not overlap with the non-display region, displaying the application window at the first position.

In accordance with some embodiments, a method is performed at a computer system that is in communication with a display generation component having a display region. The method includes displaying, via the display generation component, a user interface. The method further includes detecting, via the one or more input devices, an input moving a focus selector. The method further includes in accordance with a determination that the input is moving the focus selector through a predetermined region and in accordance with a determination that the predetermined region cannot display content, providing visual feedback showing that the focus selector would be moving through the predetermined region that is not capable of displaying content. The method further includes in accordance with a determination that the input is moving the focus selector through a predetermined region and in accordance with a determination that the predetermined region is configured to display content, do not provide the visual feedback.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for displaying and interacting of menu items, windows and cursors with notches on displays, thereby increasing the effectiveness, efficiency, and user satisfaction with such devices. Such methods and interfaces may complement or replace conventional methods for displaying menu bars, windows, and/or cursor on displays without notches.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3A is a block diagram of an example multifunction device with a display with a notch, and a touch-sensitive surface, in accordance with some embodiments.

FIGS. 5U-5AD illustrate example user interfaces for displaying a full-screen mode on a display with a notch, in accordance with some embodiments.

FIGS. 5AE-5AH illustrate example user interfaces for displaying a focus selector on a display with a notch, in accordance with some embodiments.

FIGS. 5AI-5AJ illustrates an example user interface for performing an action by moving a cursor to a particular corner on a display, in accordance with some embodiments.

FIGS. 6A-6B are flow diagrams of a process for displaying menu bar items on a display with a notch, in accordance with some embodiments.

FIGS. 7A-7C are flow diagrams of a process for displaying application windows on a display with a notch, in accordance with some embodiments.

FIGS. 8A-8B are flow diagrams of a process for displaying a focus selector on a display with a notch, in accordance with some embodiments.

DESCRIPTION OF EMBODIMENTS

Figure 1A:
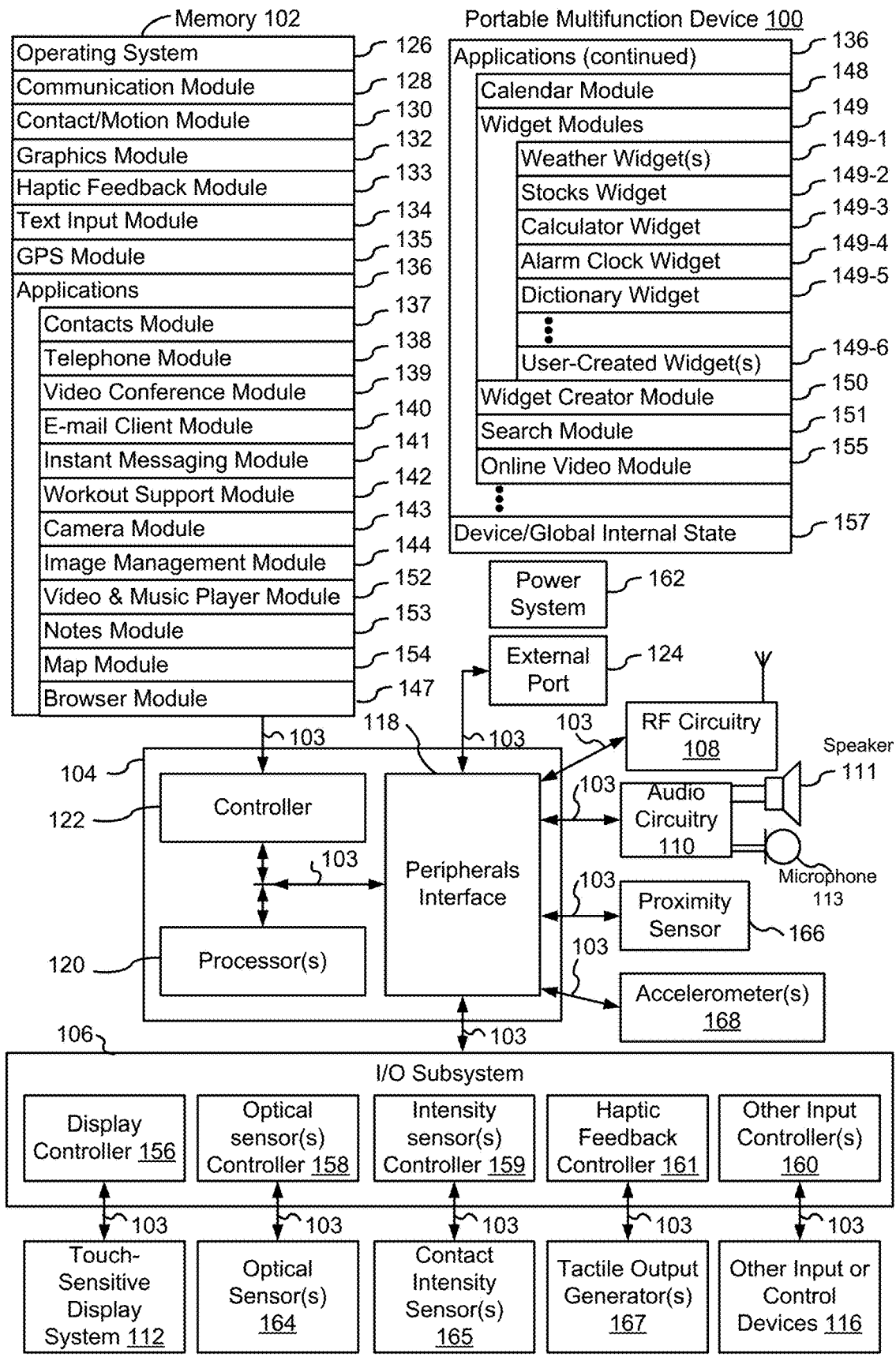
FIG. 1A is a block diagram illustrating a portable multifunction device with a touch-sensitive display, in accordance with some embodiments.

Current displays for electronic devices such as laptops, tablets, and desktop computers have bezels where hardware components such as cameras, sensors, and/or speakers are located. The bezel acts as a frame of the display and also houses the hardware components without cluttering the screen. However, there is a need to maximize display areas or otherwise improve displays' screen-to-body ratios. One solution is to reduce the size of the bezel by making it thinner. However, the bezel cannot be reduced beyond a certain thickness or the hardware components that are typically housed there would no longer fit. Accordingly, there is a need for maximizing or increasing display areas without relocating hardware components and/or without cluttering the display. In the embodiments described below, an increased display area is achieved by reducing the size of the bezel (e.g., by making it thinner so that the display area is as large as possible of the front panel of the display screen) and introducing a notch at the top of the display that cuts into the display area and houses the hardware components that would normally be completely housed in the bezel. Introducing a notch into the display area increases the size of the display area without increasing the size of the electronic device, e.g., by freeing screen space available around the notch that extends into the two upper corners of the display area. However, because the notch extends into an otherwise rectangular display area, there is a need to accommodate the notch, while at the same time use the display area that is made available around the notch.

In the embodiments described below, improved methods and user interfaces for providing access to application commands in a menu bar on a display area with a notch are achieved by automatically distributing application menu items in regions around the notch so as to utilize the display area that has been made available around the notch. In some embodiments, the display area around the notch (e.g., a left shoulder and a right shoulder) is insufficient for all the menu bar items, and the computer system automatically assigns a display priority and determines which menu items to display. In addition, in the embodiments described below, improved methods and user interfaces for managing application windows that interact with or at least partially overlap with the notch are achieved by changing the application windows positions so that they no longer overlap with the notch (e.g., application windows are moved adjacent to the notch, e.g., below or on the side of the notch). Furthermore, in the embodiments described below, improved methods and user interfaces for displaying application windows in full-screen mode with a notch are achieved by masking the notch or by allowing the screen to expand everywhere on the display area where possible, including around the notch. Additionally, improved methods and user interfaces for managing an interaction of a cursor or focus selector with a notch are achieved by providing visual feedback when an input requests that the cursor be moved through an area on the screen occupied by the notch. For example, the visual feedback indicates that the device continues to successfully respond to the user input while at the same time providing ongoing visual feedback that there is a user interaction with an area on the display that cannot display content (e.g., the notch), according to some embodiments.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or haptic feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Figure 3B:
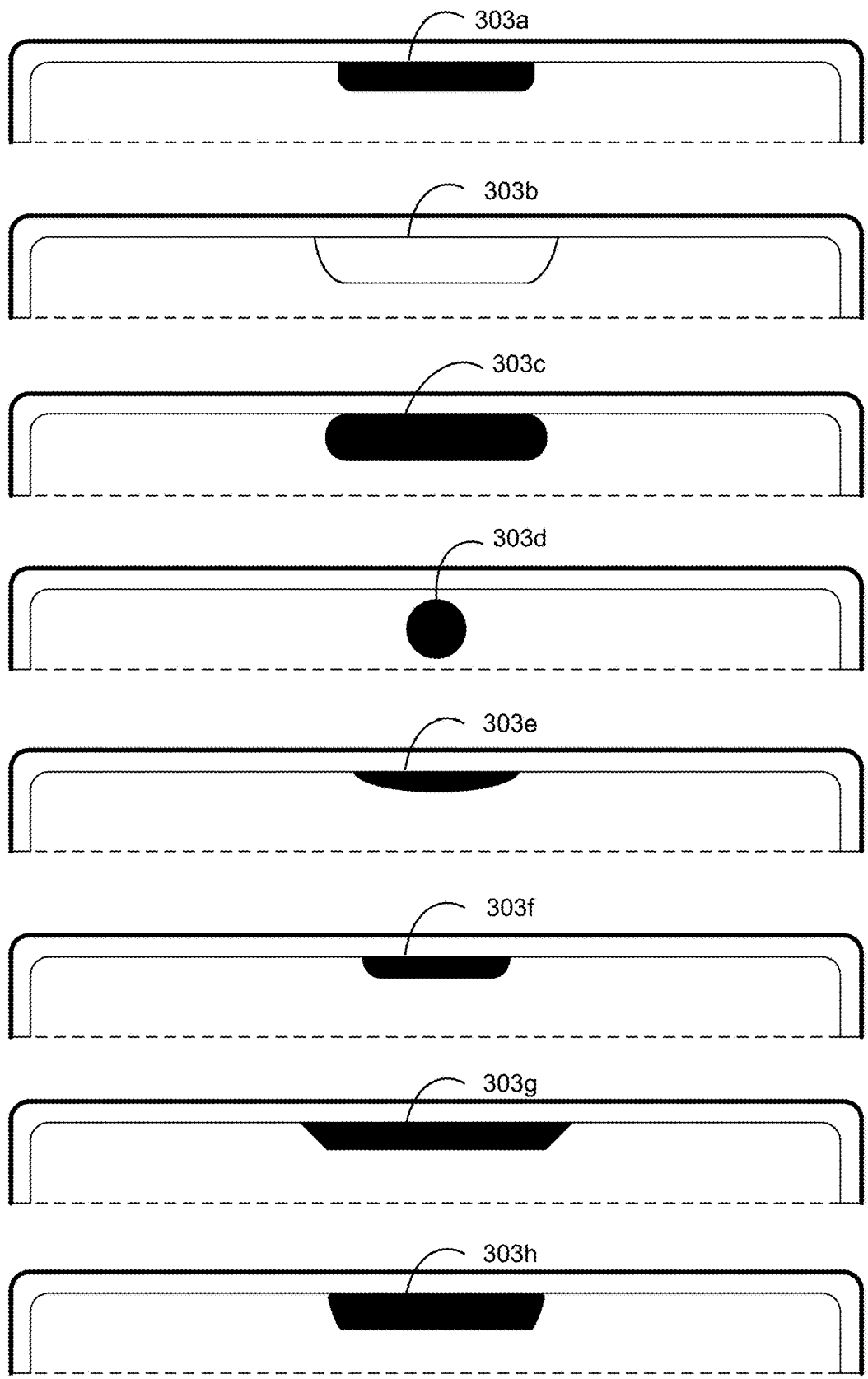
FIG. 3B illustrates a top portion of a display of a multifunctional device with notches of different shapes, sizes, and colors, in accordance with some embodiments.
Figure 4A:
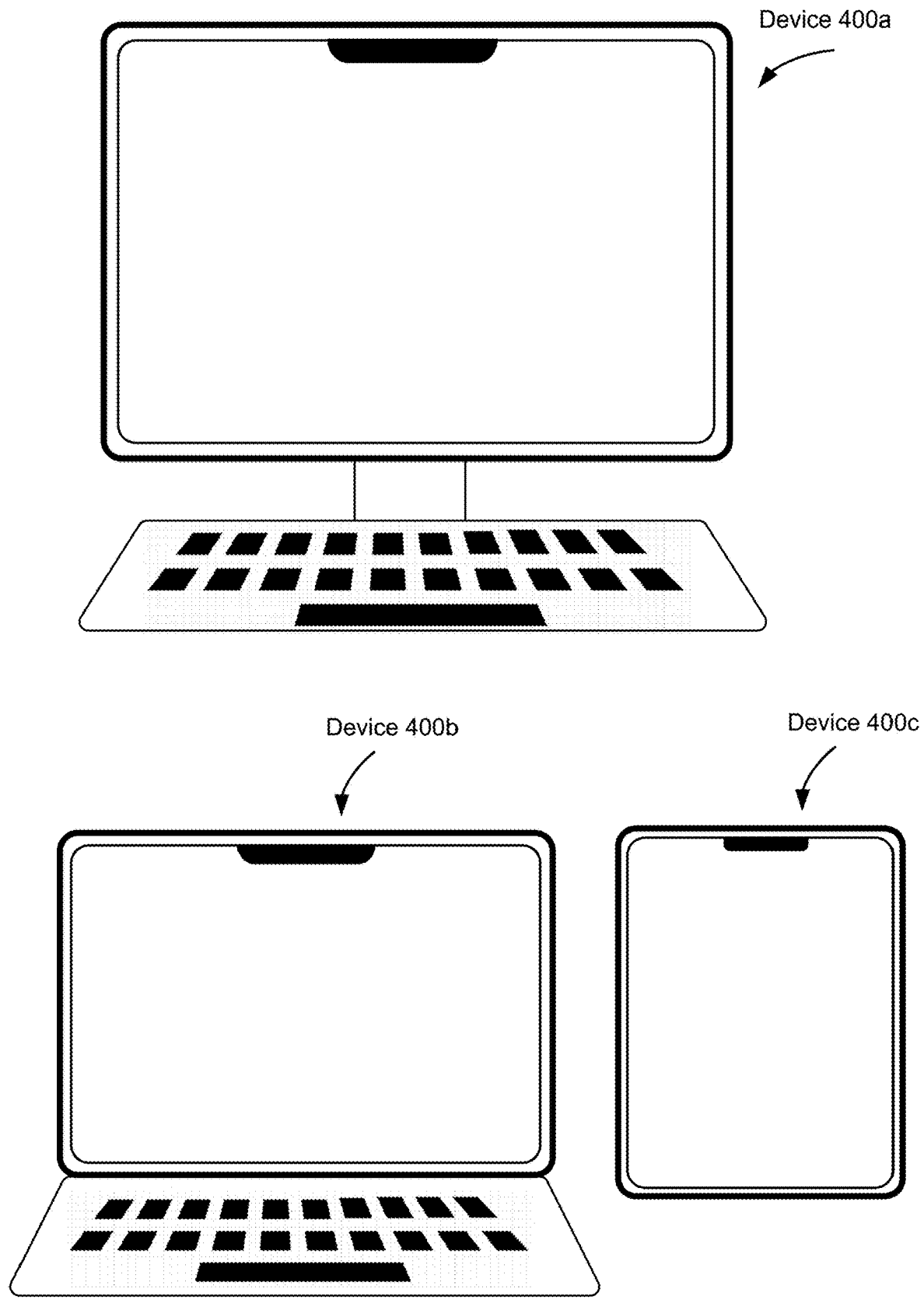
FIG. 4A illustrate different multifunctional devices (optionally portable) that have displays with notches, in accordance with some embodiments.
Figure 4B:
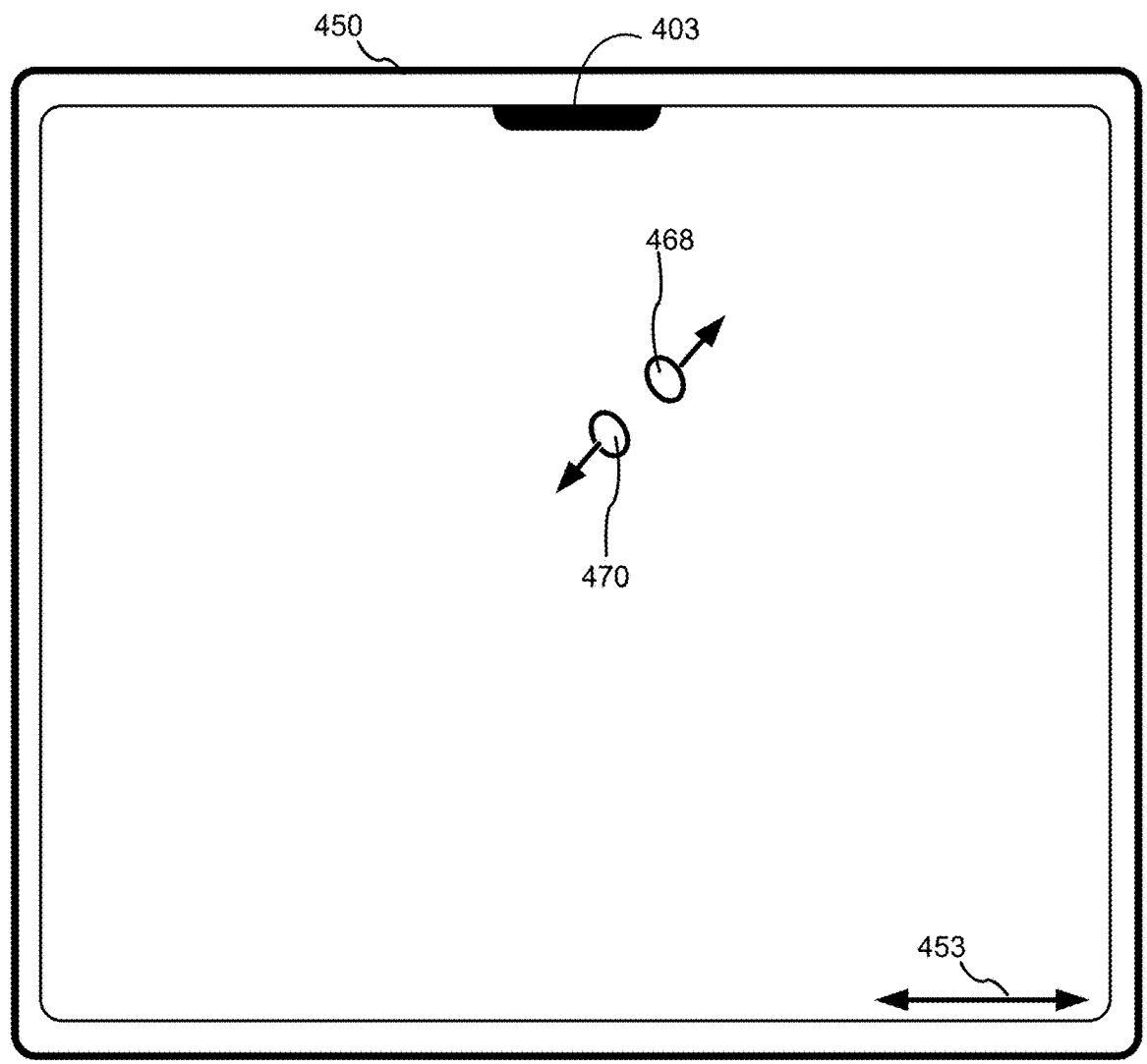
FIG. 4B illustrates an example user interface for a multifunction device with a touch-sensitive surface that is separate from the display, in accordance with some embodiments.
Figure 4B:
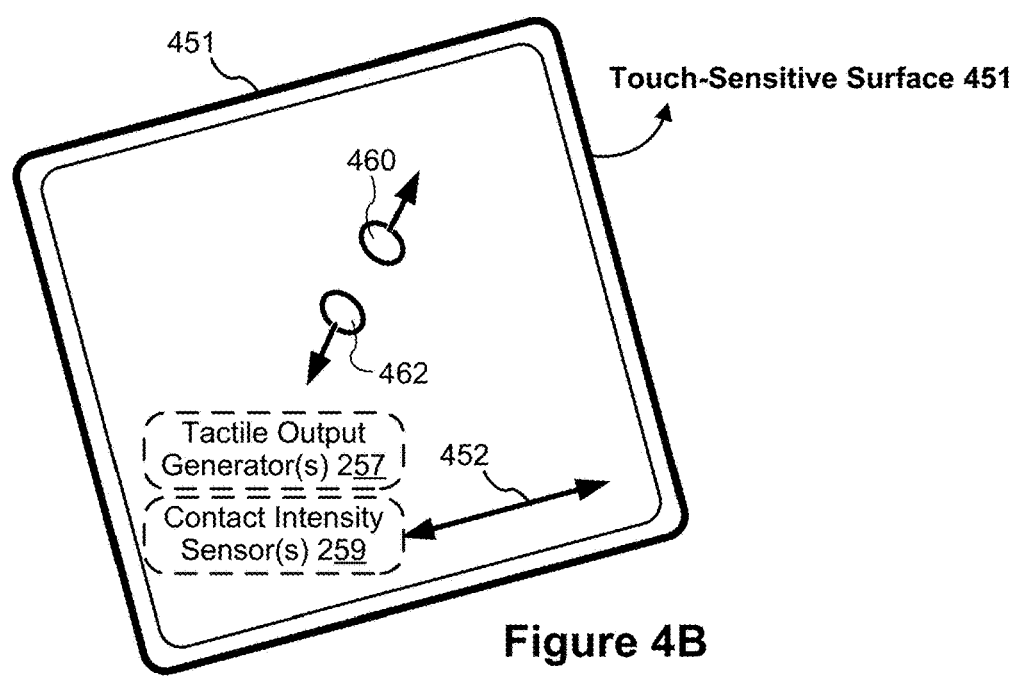
Figure 5A:
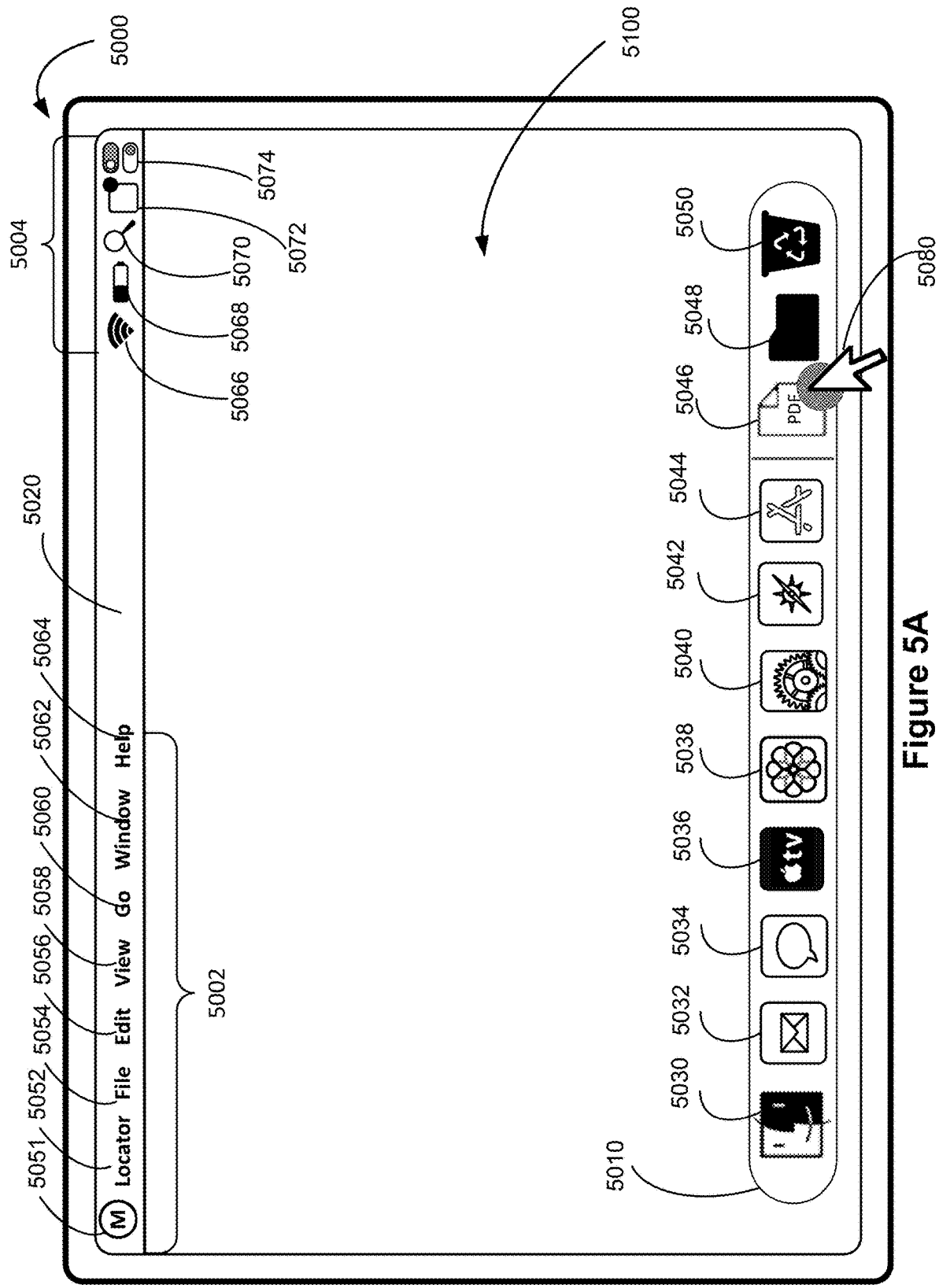
FIGS. 5A-5M illustrate example user interfaces for displaying menu bar items on a display with a notch, in accordance with some embodiments.
Figure 5B:
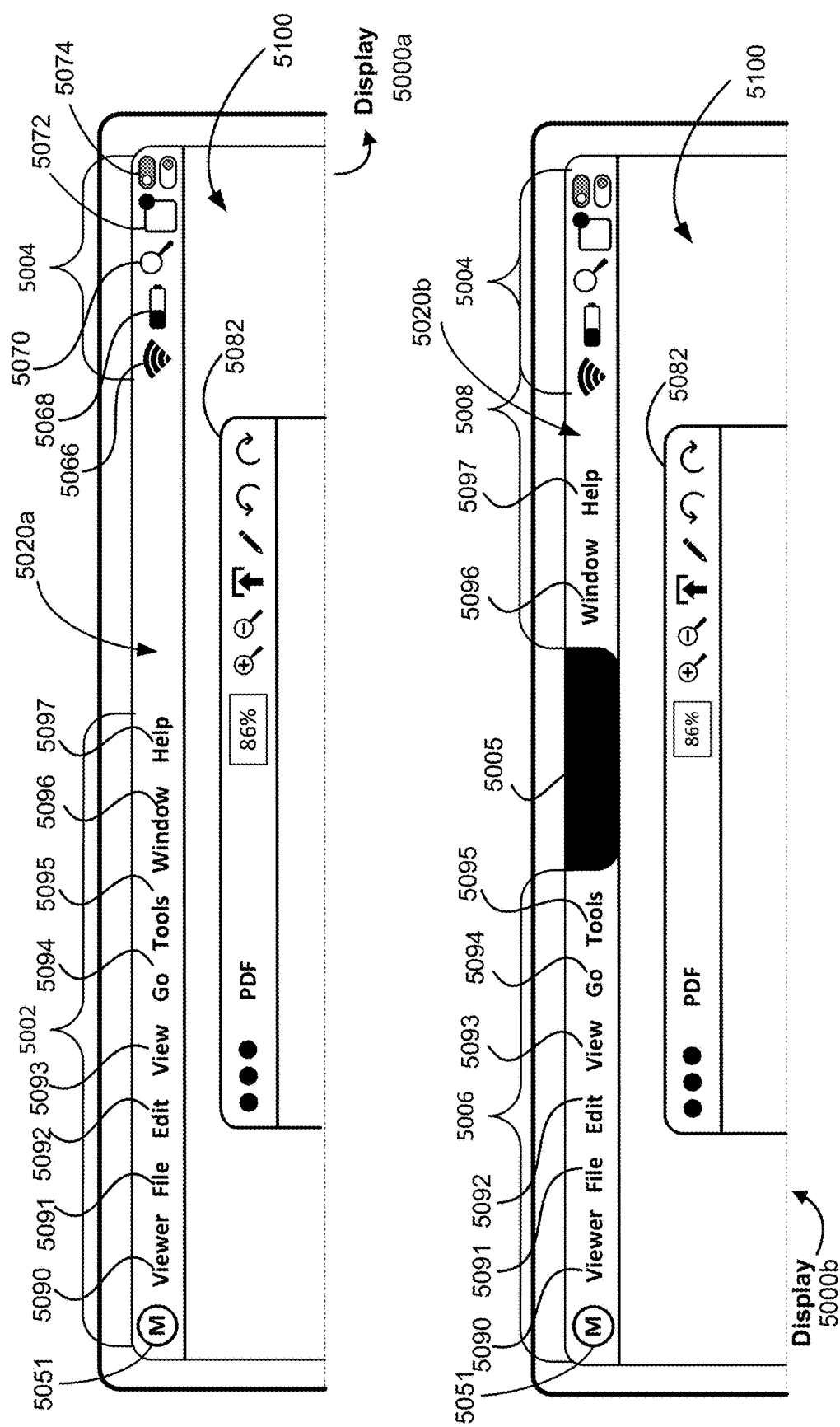
Figure 6A:
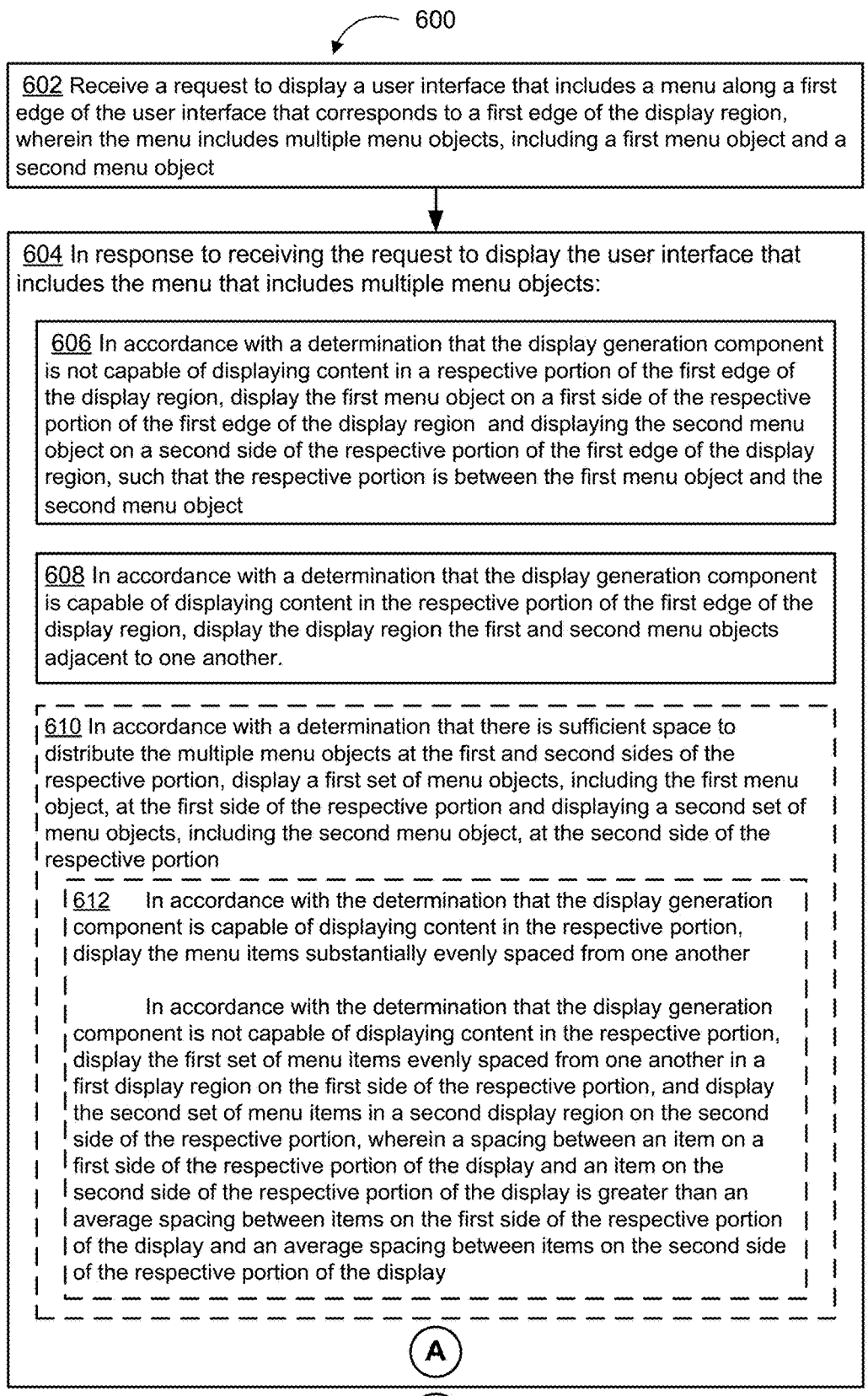
Figure 7A:
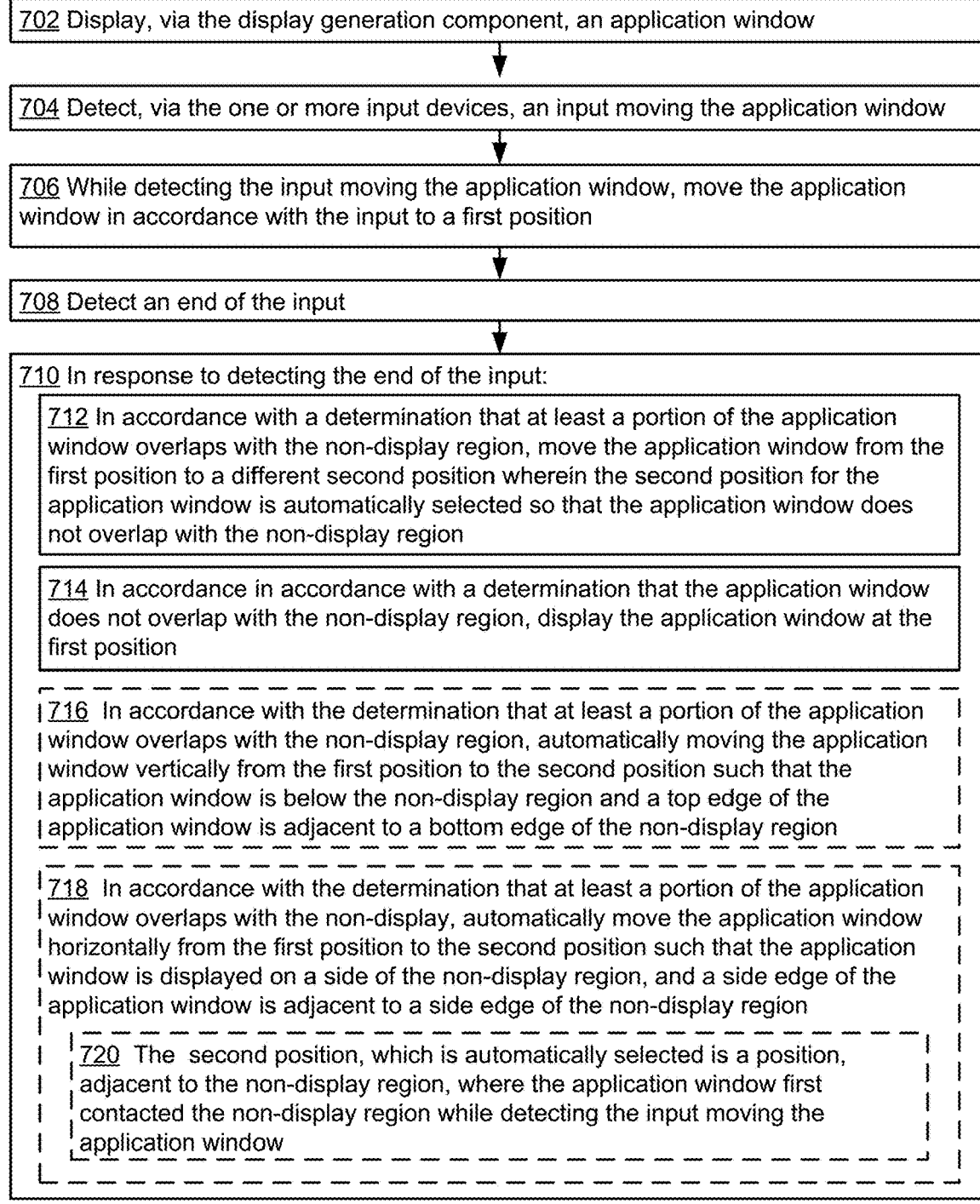
Figure 8A:
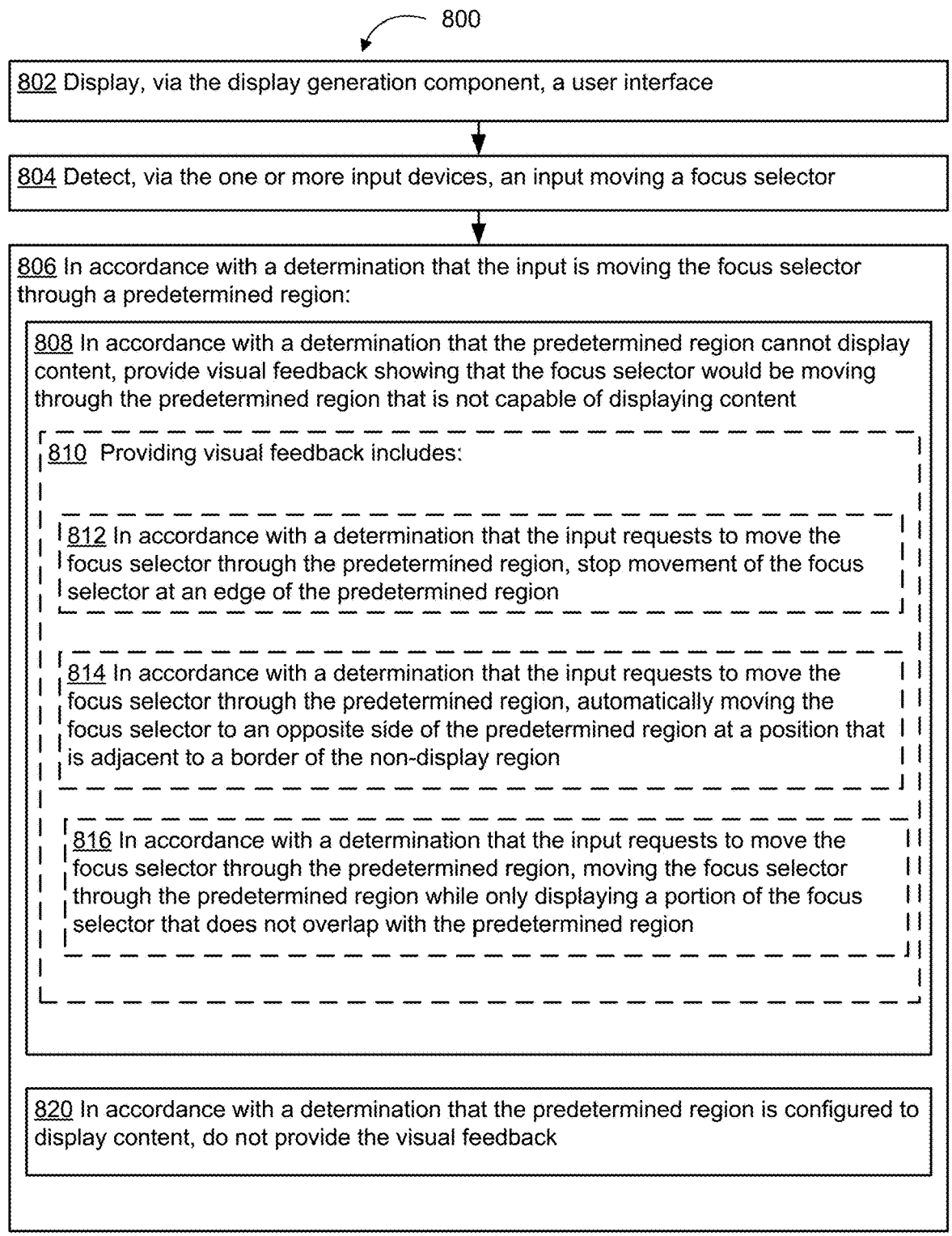

Below, FIGS. 1A-1B, 2A-2B, and 3 provide a description of example devices. FIGS. 4A-4B illustrate notches of different shapes and different devices with a display with a notch. FIGS. 5A-5M illustrate example user interfaces for displaying menu bar and menu bar items on a display with a notch. FIGS. 5N-5T illustrate example user interfaces for displaying application windows on a display with a notch. FIGS. 5U-5AD illustrate example user interfaces for displaying a full-screen mode on a display with a notch. FIGS. 5AE-5AH illustrate example user interfaces for displaying a focus selector on a display with a notch. FIGS. 5AI-5AJ illustrates an example user interface for performing an action by moving a cursor to a particular corner on a display. FIGS. 6A-6B illustrate a flow diagram of a method for displaying menu bar items on a display with a notch. FIGS. 7A-7C illustrate a flow diagram of a method for displaying application windows on a display with a notch. FIGS. 8A-8B illustrate a flow diagram of a method for displaying a focus selector on a display with a notch. The user interfaces in FIGS. 5A-5AJ are used to illustrate the processes in FIGS. 6A-6B, 7A-7C, and 8A-8B.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from APPLE Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from APPLE Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a view for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from APPLE Inc. of Cupertino, California. In some embodiments, the external port is a Lightning connector that is the same as, or similar to and/or compatible with the Lightning connector used in some iPhone®, iPod Touch®, and iPad® devices from APPLE Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, APPLE Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of APPLE Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
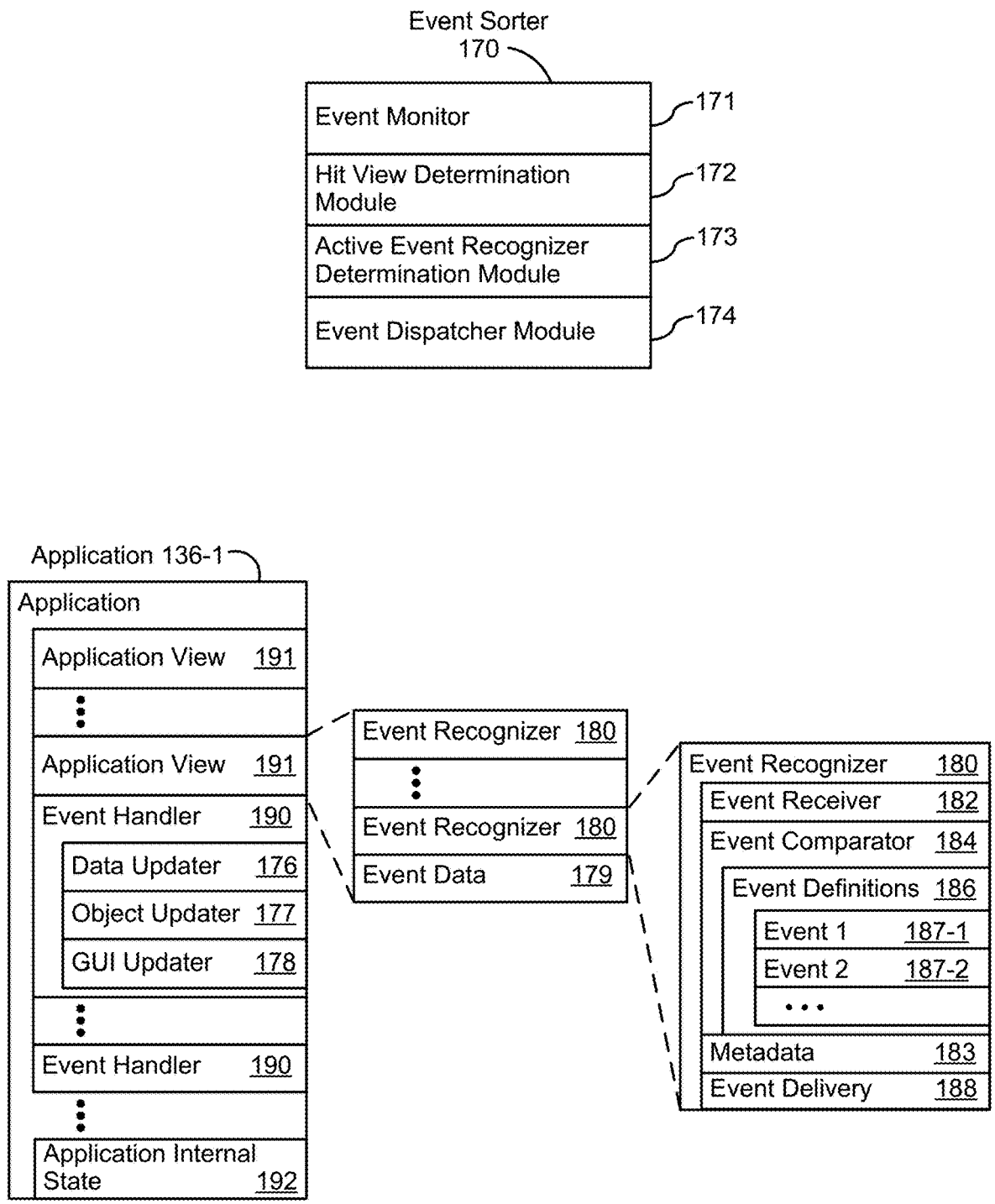
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions;

detected eye movements; biometric inputs; and/or any combination thereof are optionally utilized as inputs corresponding to sub-events which define an event to be recognized.

Figure 2:
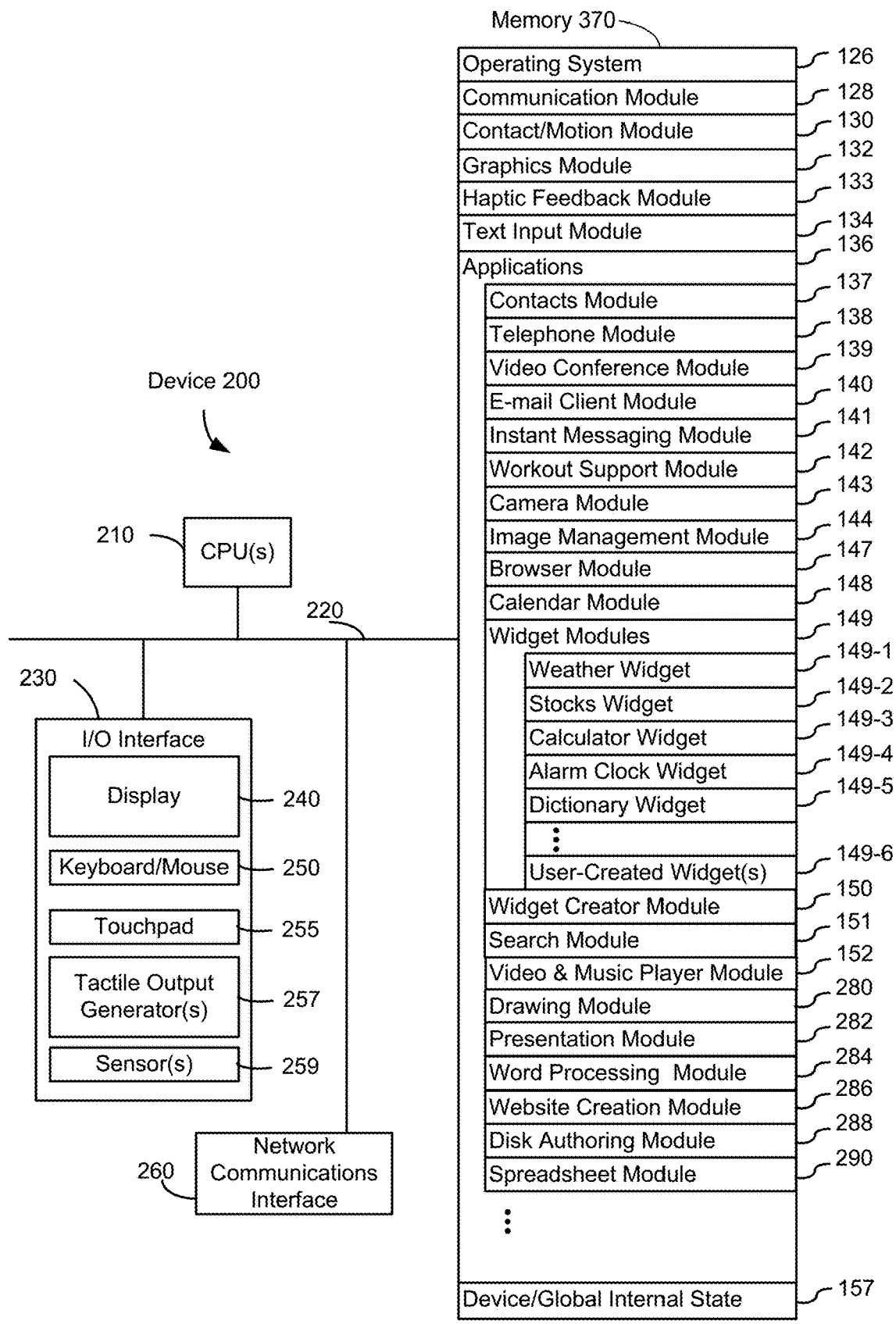
FIG. 2 is a block diagram of an example multifunction device with a display and a touch-sensitive surface, in accordance with some embodiments.

FIG. 2 is a block diagram of an example multifunction device with a display and a touch-sensitive surface in accordance with some embodiments. Device 200 need not be portable. In some embodiments, device 200 is a laptop computer, a desktop computer, a tablet computer, a multimedia player device, a navigation device, an educational device (such as a child's learning toy), a gaming system, or a control device (e.g., a home or industrial controller). Device 200 typically includes one or more processing units (CPU's) 210, one or more network or other communications interfaces 260, memory 270, and one or more communication buses 220 for interconnecting these components. Communication buses 220 optionally include circuitry (sometimes called a chipset) that interconnects and controls communications between system components. Device 300 includes input/output (I/O) interface 230 comprising display 240, which is typically a touch-screen display. I/O interface 230 also optionally includes a keyboard and/or mouse (or other pointing device) 250 and touchpad 255, tactile output generator 257 for generating tactile outputs on device 200 (e.g., similar to tactile output generator(s) 167 described above with reference to FIG. 1A), sensors 259 (e.g., optical, acceleration, proximity, touch-sensitive, and/or contact intensity sensors similar to contact intensity sensor(s) 165 described above with reference to FIG. 1A). Memory 270 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 270 optionally includes one or more storage devices remotely located from CPU(s) 210. In some embodiments, memory 270 stores programs, modules, and data structures analogous to the programs, modules, and data structures stored in memory 102 of portable multifunction device 100 (FIG. 1A), or a subset thereof. Furthermore, memory 270 optionally stores additional programs, modules, and data structures not present in memory 102 of portable multifunction device 100. For example, memory 270 of device 200 optionally stores drawing module 280, presentation module 282, word processing module 284, website creation module 286, disk authoring module 288, and/or spreadsheet module 290, while memory 102 of portable multifunction device 100 (FIG. 1A) optionally does not store these modules.

Each of the above identified elements in FIG. 2 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 270 optionally stores a subset of the modules and data structures identified above. Furthermore, memory 270 optionally stores additional modules and data structures not described above.

FIG. 3A illustrates a portable multifunction device 200 (e.g., a laptop) having a touch-sensitive surface 351 (e.g., a touchpad) and a display with a notch 303 and bezel 305, in accordance with some embodiments. Without regard to the specific form taken by notch 303, notch 303 is a region behind which a number of hardware components 310-317 are housed or located, including but not limited to, one or more cameras, e.g., a front facing camera 316 and/or an infrared camera 310; one or more sensors, e.g., a proximity sensor 312 and/or an ambient light sensor 313; optionally, a speaker 314, a microphone 315, a flood illuminator 311, and dot projector 317 (and subsets thereof). For example, hardware 310-317 may include cameras for face authentication, which uses sensors to scan a user's face to unlock the device 200. Notch 303 provides a place for hardware components 310-317 while allowing for a larger display region. It should be noted that the selection and arrangement of hardware components illustrated in FIG. 3A is only exemplary, and some hardware components may be replaced, new or different hardware components may be included, and others may be moved to different locations.

Further, it should be noted that the cut-out into the display area is referred to as notch for simplicity. It should be further noted, as illustrated in FIG. 3B, that the notch 303 may have different sizes, shapes, and positions (note FIG. 3B is not drawn to scale). In some embodiments, notch 303 is a cut-out at the center top edge of the display of device 200. It should be noted, however, that while the location of the notch 303 in the most of the figures is at the center at the top edge of the display, the location may be elsewhere, and the embodiments described herein would apply equally.

In some embodiments, FIG. 3A shows a display area of device 200 is made larger by making bezel 305 as thin as possible (not drawn to scale), and placing certain hardware components 310-317 behind the notch 303. In some embodiments, the size of notch 303 is also as small as possible while still allowing all necessary hardware components to fit behind it. In some embodiments, the notch 303 visually appears as a black area at the top center of the screen, e.g., visually similar to the bezel. In other embodiments, the notch may have different colors, e.g., to match the color of the bezel.

In some embodiments, a user may select one or more user interface elements displayed in the display area by making a gesture on the user interface elements. For example, the user may select a user interface element using one or more fingers on the touchpad 351 (or trackpad). In some embodiments, the touchpad 351 acts as a button and a user may click and select user interface elements displayed in the display area of device 200. Device 200 optionally also includes one or more physical buttons, such as a power on/off button, volume up/down buttons (also, those hardware buttons may be pressure sensitive). In some embodiments, device 200 optionally includes a touch bar (part or adjacent to a physical keyboard), and optionally includes a touch identification sensor technology located adjacent or as part of the touch bar. Device 200 may also include one or more USB ports, a headphone jack, microphones.

In some embodiments, the display of device 200 is a touch-screen display. In some embodiments, a user may use different input devices such as stylus, a mouse, or fingers on the touch-screen display, and/or combinations thereof, including combinations with a separate touch-sensitive surface such as touchpad 351. In some embodiments, device 200 also accepts verbal input for activation or deactivation of some functions through a microphone. Touch-sensitive surface 351 also, optionally, includes one or more contact intensity sensors for detecting intensities of contacts and/or one or more tactile output generators for generating tactile outputs.

FIG. 3B shows notches 303a-h of different shapes and sizes, according to some embodiments. The size of the notches 303*a-h* is only limited by the hardware components placed behind the notch. The notch may take various shapes such as convex, rectangular (with rounded corners), rhombus, trapezoid, circle, pill shaped, elliptical, etc. The notch may be positioned at the top or bottom edge, or in one of the corners, etc.

FIG. 4A illustrates a variety of devices 400*a-b* (e.g., device 200 in FIG. 2) that each have a display with a notch, and optionally, a bezel with reduced thickness. The notch provides a place for one or more cameras and other sensors while allowing for a larger display region. Methods, systems, and user interfaces described below may be implemented and operated on a desktop computer 400*a*, a laptop computer 400*b*, or a portable multifunctional device, such as tablet computer 400*c* (e.g., device 100, FIG. 1A).

FIG. 4B illustrates an example user interface on a device (e.g., device 200, FIG. 2) with a touch-sensitive surface 451 (e.g., a tablet or touchpad 255, FIG. 2) that is separate from the display 450, and a display 450 with a notch (e.g., notch 403). Many of the examples that follow describe a device that detects inputs on a touch-sensitive surface (e.g., a touchpad) that is separate from the display, as shown in FIG. 4B, or separate from a computer mouse.

In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to contacts on a touchpad, it should be understood that, in some embodiments, contact inputs on a touchpad are replaced with one or more of the finger inputs (e.g., finger contacts, finger tap gestures, finger swipe gestures, etc.) or with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 255 in FIG. 2 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases).

This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, now U.S. Pat. No. 9,910,494, which are incorporated by reference herein in their entireties.

User Interfaces and Associated Processes

Attention is now directed towards embodiments of user interfaces ("UI") and associated processes that may be implemented on an electronic device, such as portable multifunction device 100 or device 300, with a display with a notch, a touch-sensitive surface, (optionally) one or more tactile output generators for generating tactile outputs, and (optionally) one or more sensors to detect intensities of contacts with the touch-sensitive surface.

FIGS. 5A-5AJ illustrate example user interfaces on displays with notches, in accordance with some embodiments. In particular, 5A-5M illustrate displaying menu bar items on a display with a notch, in accordance with some embodiments. FIGS. 5N-5T illustrate interaction of application windows with a notch, in accordance with some embodiments. FIGS. 5U-5AD illustrate full-screen mode on a display with a notch, in accordance with some embodiments. FIGS. 5AE-5AH illustrate a focus selector interacting with a notch, in accordance with some embodiments. FIGS. 5AI-5AJ illustrates an example user interface for performing an action by moving a cursor to a particular corner on a display. The user interfaces in these figures are used to illustrate the processes described below, including the processes in FIGS. 6A-6B, 7A-7C, and 8A-8B. Although some of the examples which follow will be given with reference to inputs on a touch-sensitive surface 451 that is separate from the display 450, or via a computer mouse, in some embodiments, the device detects inputs on a touch-screen display (where the touch-sensitive surface and the display are combined), as shown in FIG. 4A.

FIGS. 5A-5M illustrate example user interfaces for displaying menu bar items on a display with a notch, in accordance with some embodiments. For example, FIGS. 5B, 5D, 5F, 5H, 5J, and 5L illustrate comparison of menu bar items distributions on displays with a notch and on a display without a notch.

FIG. 5A illustrates an example user interface 5100 displayed on display 5000 of device 300, in accordance with some embodiments. Similar user interfaces are, optionally, implemented on portable multifunctional device 100. In some embodiments, display 5000 does not include a notch (such as notches 303 and notches 303a-h illustrated in FIGS. 3A-3B). In some embodiments, the user interface 5100 includes a dock 5010 along a bottom edge of display 5000 and a menu bar 5020 along a top edge of display 5000. In some embodiments, the position of the dock 5010 and/or the position of the menu bar 5020 may be changed, e.g., a user may set an option to show dock 5010 along the left or right edge instead of the bottom edge of display 5000. In some embodiments, user interface 5100 illustrates a desktop application that is currently active on display 5000.

In some embodiments, the dock 5010 is a predetermined region 5010 that includes a number of application icons 5030-5050, which represent corresponding applications. In some embodiments, the corresponding applications are applications that are installed on the device. In other embodiments, the applications may be applications that may be installed on a different device such as a cloud server. The dock 5010 provides efficient access to applications and other features available on device 300. For example, from dock 5010, a user can open an application or re-display an application window by selecting an application icon from application icons 5030-5050. In some embodiments, dock 5010 shows a pre-determined number of recently used applications. In some embodiments, dock 5010 includes a trash icon 5050 representing a trash application and/or a folder icon 5048 representing a folder for items that have been downloaded, for example, by a user from the internet. Application icons 5030-5050 on the dock 5010 may be re-arranged and customized, according to some embodiments.

In some embodiments, dock 5010 includes the following elements, or a subset or superset thereof:
Icons for frequently used applications, such as:
    Icon 5030 for a file management module, which provides graphical access to contents on the electronic device 300; in some embodiments, the file management module is automatically opened and stays open while other application on the electronic device 300 are in use;
    Icon 5032 for e-mail client module 140, which optionally includes an indicator of the number of unread e-mails;
    Icon 5034 for IM module 141;
    Icon 5036 for online video module 155;
    Icon 5038 for image management module 144;
    Icon 5040 for a settings application or module, which provides access to settings for device 300 and its various applications 136.
    Icon 5042 for browser module 147;
    Icon 5044 for application store application, which provides access to various applications for download from the internet
Icons for recently used applications, such as:
    Icon 5046 for a documents module, which provides quick access to recently opened documents;
Icons for default system applications, such as
    Icon 5048 for downloads folder, labeled "Downloads"
    Icons 5050 for trash module, labeled "Trash"

In some embodiments, the menu bar 5010 is a predetermined region 5010 that runs along the top of display area 5000. In some embodiments, the menu bar 5020 includes multiple top-level names of menus (or menu objects) such as menus 5051-5074. In some embodiments, the menu bar includes or provides access to application menus such as menus for an application that is in focus or is active. For example, menus 5052-5064 are top-level menu names for the "Locator" application, which is a file management application (icon 5030 represents the "Locator application"), according to one embodiment. In some embodiments, the application menus provide quick access to various commands and tasks that can be performed in the respective application that is currently active. For example, application menus 5052-5064 provides access to various functions that can be executed in the Locator application. In some embodiments, application menus 5052-5064 include standard menus and/or custom menus. For example, the menu bar 5020 for a particular application may include a main menu for the particular application (e.g., Locator 5052), which is different for each application, as well as standard menus that are common across some applications such as a File menu item 5054, an Edit menu item 5056, a View menu item 5058, a Window menu item 5063, and a Help menu item 5064. Other menus, such as a Go menu item 5062, may be custom menus for particular applications.

In some embodiments, "Locator" menu item 5052 is a main application menu that provides access to a number of commands that apply to the Locator application as whole rather than a particular sub-process running within the Locator application, such as a particular window that is opened, a file, or a document. For example, the main application menu may include commands, such as a command to hide the application, quit the application, display other open application windows, etc. In other embodiments, a different main application menu is included in the menu bar 5020 for respective applications. In some embodiments, the main application menu's name or title is the name of the application. In some embodiments, the main application menu may be visually distinguished from the rest of the application menu items, e.g., the application menu may be displayed in different color or otherwise highlighted, such as in bold.

In some embodiments, menu bar 5020 includes different application-specific menu items for different applications that are currently in focus or active. For example, the "Web" application (represented by icon 5042 on the dock 5010) includes "History" and "Bookmarks" menu items that are application-specific menus (such as menu items 5135 and 5138 illustrated in FIG. 5H). In another example, a "Mail" application (represented by icon 5032 on dock 5010) includes "Mailbox," "Message," and "Format" menu items the application-specific menu items.

Thus, in some embodiments, some of the application menus 5052-5064 may change depending on which application is currently active or in focus. In some embodiments, developers or designers of the different applications determine the names and number of menus to be included in a menu bar. In some embodiments, menus that are included follow guidelines and other system constraints to provide consistency across different devices, different applications, and application developers.

In some embodiments, the menu bar 5020 includes system-provided menus in addition to application menus. In some embodiments, the system-provided menus may include a main system menu, such as system menu item 5051 that provide commands that apply to the system as a whole. For example, the system menu item 5051 may provide access to commands, such as a command to force quit, sleep, restart, shut down, lock screen, etc., and may further provide access to system preferences and other information, recently used applications or documents, etc. In some embodiments, the system menu item 5051 is displayed at the top-left corner of display 5000. In some embodiments, the system menu item 5051 is defined by the operating system and does not change, for example, by an application that is currently active or in focus.

In some embodiments, the menu bar 5020 includes additional system-provided menu items 5066-5074 that are displayed on an opposite side of display area 5000. For example, application menu items 5052-5064 are displayed on a left side 5002 and the system menu items such as system menu items 5066 are displayed on the right side 5004. In some embodiments, the menu items in the menu bar are displayed from left to right; however, in other embodiments or for other languages such as Hebrew or Arabic, the order may be reversed (right to left), for example, based on the device's language settings. If the order is reversed, the application menu items may be displayed on right side 5004, and the system menu items may be displayed in the left side 5002. In some embodiments, system menus may be referred to as menu extras or menu modules. System menu items 5066-5074 are defined by the operating system and may not be modified by an application. In some embodiments, system-provided menu items are represented by icons rather than textual descriptions. For example, a user can connect to a Wi-Fi network or check a Wi-Fi status of device 300 by clicking on Wi-Fi icon 5066; the user can check a battery status by clicking on battery icon 5068; a user can run a system search using search icon 5070; a user can check various received notifications and important information by selecting notification center icon 5074; and a user can invoke various critical system commands by selecting control center icon 5074. In some embodiments, system menu icons that provide status information are also referred to as status menus, such as Wi-Fi icon 5066 and battery icon 5068. Other system-provided menu items that are not displayed in FIG. 5A may include icons for time information, language settings, virtual assistant such as Siri, etc. In some embodiments, a user may customize the menu bar 5020 and may remove or add system menu items. For example, the user may remove Wi-Fi icon 5066, battery icon 5068, or search icon 5070 from menu bar 5020. In some embodiments, some system menu items are not customizable, and as such, may be persistently displayed. For example, a user or an application cannot remove (i) Notification Center menu item 5072 that provides access to received notifications and other information determined to be important, and (ii) Control Center menu item 5074 that provides access to critical system commands. In some embodiments, system menu items, such as Wi-Fi status 5066, battery status 5068, and search 5070, can be removed from the menu bar in response to a user input. Conversely, different system menu items or third party menu extras may be added to the menu bar. For example, a user may drag one of icons 5066-5070 and drop it into a control center menu (e.g., Control Center menu 5162 illustrated in FIG. 5M) that can be accessed via selection of Control Center icon 5074, according to some embodiments.

In some embodiments, a user may open a new application by selecting an application icon from application icons 5030-5050 displayed on dock 5010. For example, in FIG. 5A, a user input 5080 is received selecting an icon 5046 that represents a PDF document. In some embodiments, PDF documents are opened in a Viewer application (e.g., an application for viewing images or files such as PDF documents), which is installed on electronic device 300. In response to selection of icon 5046 representing the PDF document, the Viewer application is displayed and/or opened, as illustrated in FIG. 5B. In some embodiments, icons, such as icons 5030-5050 may be referred to as affordances.

FIG. 5B illustrates two versions of display 5000, e.g., display 5000a and 5000b, each displaying a top portion of user interface 5100 that displays a window 5082 of the Viewer application and two versions of menu bar 5020 based on whether display 5000 has a notch, in accordance with some embodiments. For example, menu bar 5020*a* does not include a notch, while menu bar 5020*b* includes a notch 5005. FIG. 5B shows a comparison between a display 5000*a* without a notch and display 5000*b* with a notch 5005, and in particular the automatic distribution of menu items in menu bar 5020 to accommodate notch 5005.

As illustrated in FIG. 5B, the window 5082 of the Viewer application is displayed in user interface 5100 in response to user opening a PDF document via cursor 5080 (FIG. 5A). Once the currently active application is changed to the Viewer application, one or more of the application menu items may change in menu bar 5020 based on application menu items that are specific to the Viewer application. For example, for the Viewer application a new menu item is added, e.g., a Tools menu item 5095 is added. Also, the name or representation of the main menu application item is changed from Locator 5052 to Viewer 5090. For example, in response to switching to the Viewer application the Viewer menu icon 5090 is displayed. In some embodiments, the menu items that are standard menu items (e.g., did not change in response to switching from the Locator application to the Viewer application) include the File menu item 5091, the Edit menu item 5092, the View menu item 5093, the Go menu item 5094, the Window menu item 5096, and the Help menu item 5097. In some embodiments, some standard menu items may include different commands that can be accessed via them. For example, File menu 5091 of the Locator application may include different commands from the File menu 5091 of the Viewer application.

In display 5000*a*, application menu items 5090-5097 are displayed in the left side of display 5000 in region 5002, including the system menu icon 5051, and the system menu items 5066-5074 are displayed on the opposite side of the display, e.g., in the right side in region 5004. In some embodiments, application menu items 5090-5097 are displayed adjacent to each other in region 5002, and the system menu items 5066-5074 are displayed adjacent to each other in region 5004 on the opposite side of region 5002.

In some embodiments, display 5000*b* has a notch region 5005 that cannot display content and occludes the display of one or more application menu items 5090-5095 of the Viewer application. In some embodiments, when the display includes a notch and there is insufficient space to display all of the application menu items of the active application on the left side of the notch in region 5006, the device automatically distributes the application menu items 5091-5097 over regions 5006 and 5008, where tools menu item 5095 is separated from window menu item 5096 by the notch region 5005. For example, application menu items 5090-5095 are displayed on left side of the notch region 5005, including tools menu item 5095, and the remainder of the application menu items are displayed on the right side of the notch in region 5008, e.g., Window menu item 5096 and Help menu item 5097 are separated from the rest application menu items 5090-5095 by the notch region 5005. In some embodiments, system menu items 5066-5074 are displayed in region 5004 adjacent to each other. FIG. 5B shows that there is sufficient space for displaying the application menu items 5090-5097 and the system menu items 5051, 5066-5074 in the menu bar 5020*b*, and that the application menu items 5090-5097 are automatically distributed by the system to occupy the area on both sides of the notch 5005. Embodiments where there is insufficient space to display all of the application menu items and all of the system menu items in the menu bar are described in relation to FIGS. 5F, 5H, 5J, and 5L.

Figure 5C:
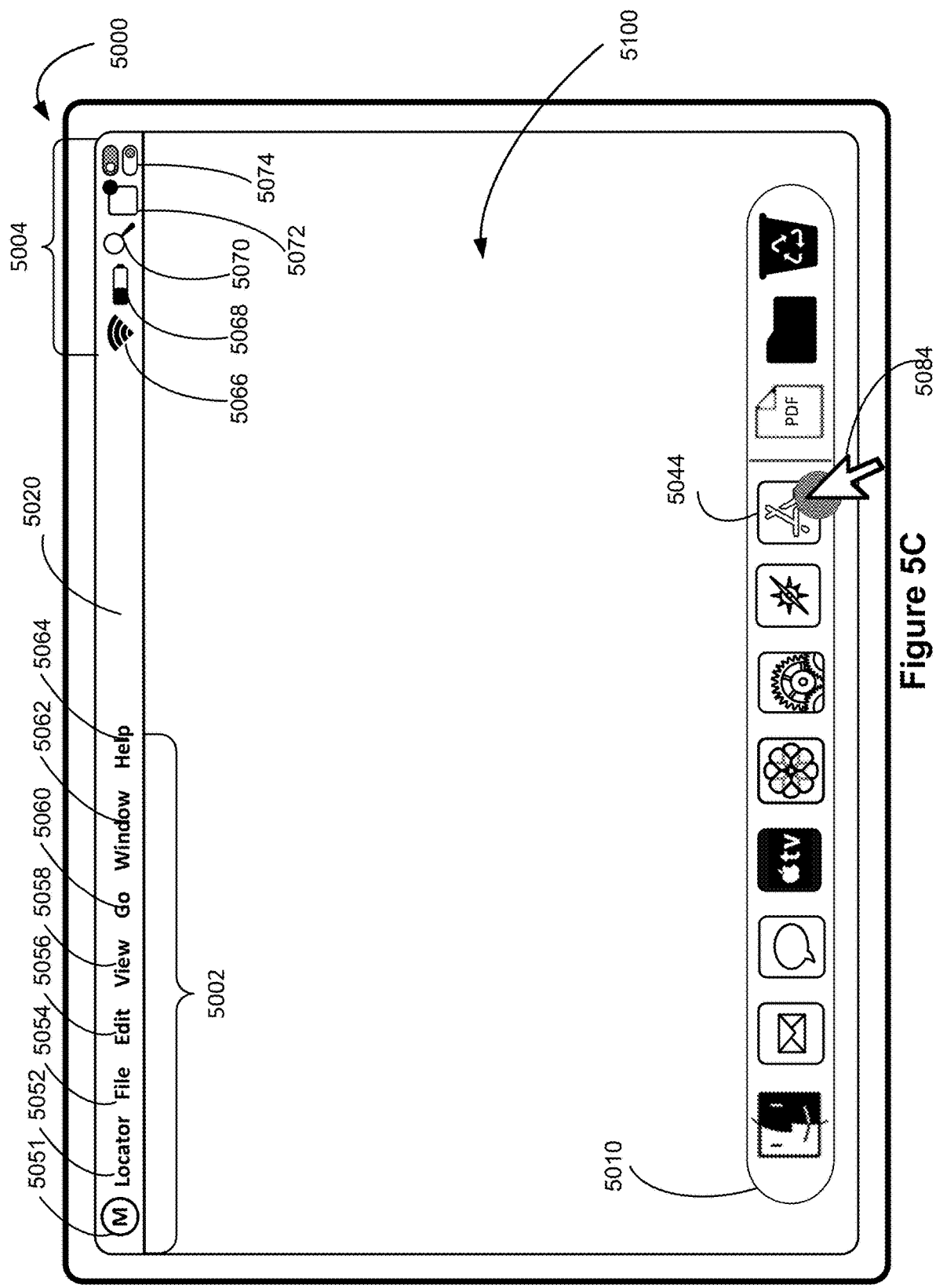

FIG. 5C illustrates user interface 5100 displayed on display 5000, which does not have a notch region that may occlude display of content such as application content or the menu bar 5020. In some embodiments, user interface 5100 may include the menu bar 5020 that displays menus for the Locator application in region 5002 on the left side of display 5000, and also displays system menu items on the right side of display 5000 in region 5004 that are not specific to the currently displayed application such as system menu items 5066-5074. In some embodiments, the Locator application is the default application that is active in the menu bar, for example, when the desktop application is first started upon powering on the electronic device.

FIG. 5C shows a user input 5084 selecting an App Shop icon 5044 (e.g., a user may select icon 5044 using a cursor as illustrated). In response to the user input 5084, the App Shop application is opened, a window of the App Shop application is displayed in user interface 5100, and application menu items in the menu bar are changed, as illustrated in FIG. 5D, according to some embodiments.

Figure 5D:
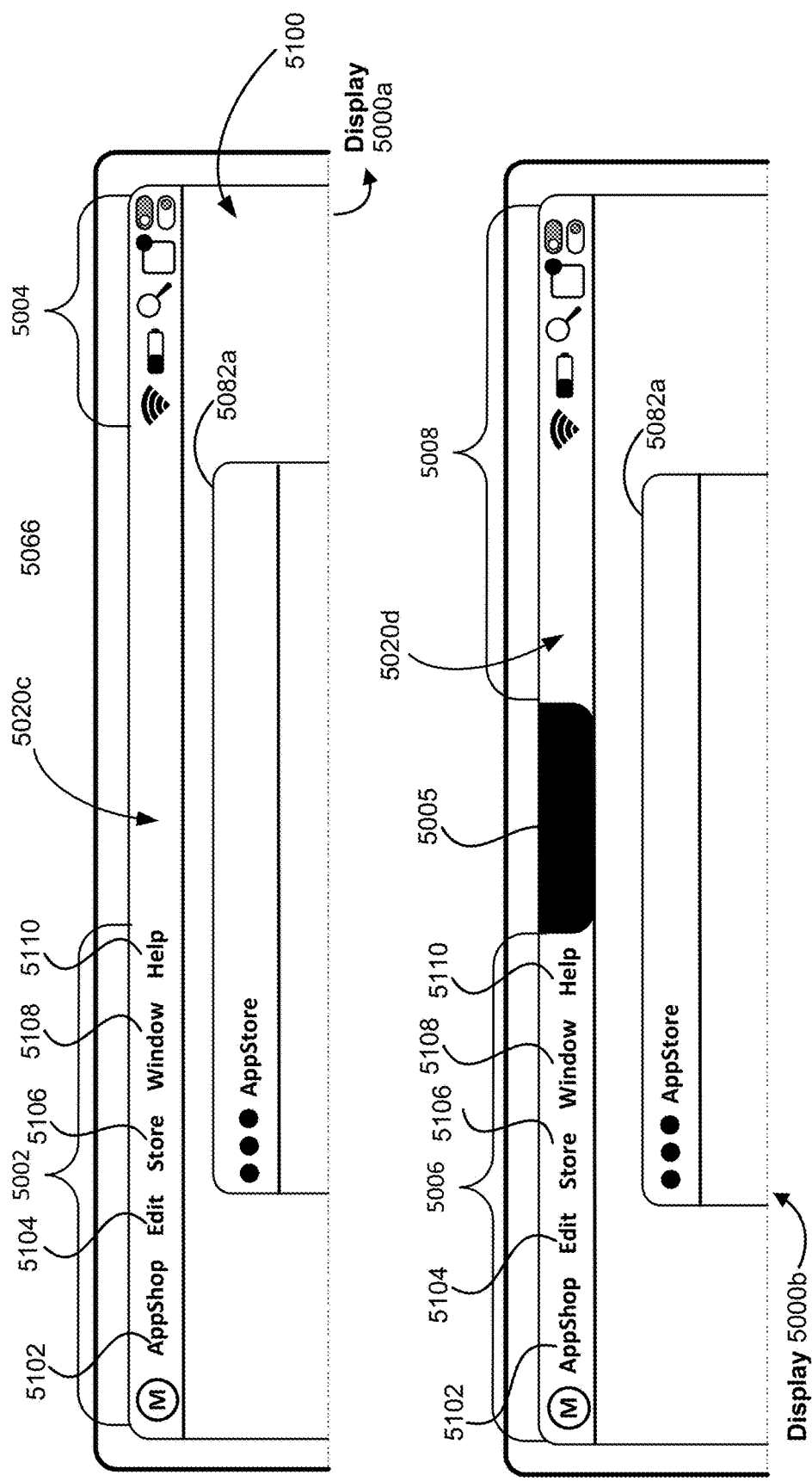

FIG. 5D illustrates version 5000*a* and version 5000*b* of display 5000, based on whether there is a notch 5005 on display 5000, in accordance with some embodiments. In some embodiments, FIG. 5D shows automatic distribution of menu items on a display with a notch when there is sufficient space for the application menu items of the application to be displayed on the left side of the notch region.

Display versions 5000*a* and 5000*b* each show a top portion of user interface 5100 that shows a window 5082*a* of the App Shop application (e.g., an application for downloading applications from the Internet), opened in response to user input 5084. Display 5000*a* shows menu bar 5020 without a notch region and display 5000*d* with notch region 5005. Accordingly, menu bar items of menu bar 5020*a* are distributed adjacent to each other without the need to accommodate a notch region that would occlude any content display. Menu bar items of menu bar 5020*b*, which includes notch 5005, are automatically distributed to accommodate the notch region 5005. In some embodiments, there is sufficient space for all menu items for the App Shop application to be displayed on the left side of the notch region 5005. For example, there is no need to split the menu items 5104-5110 on both sides of the notch region 5005. All application menu items 5102-5110 (e.g., that are associated with or pre-determined to be displayed with App Shop application) for the App Shop application are displayed in region 5006 on the left side of notch 5005. In some embodiments, region 5006 is referred to as a left shoulder and region 5008 is referred to the right shoulder. In some embodiments, notch region 5005 is in the center of the top edge of display 5000, and the left shoulder region 5006 is the same size as the right shoulder region 5008. In some embodiments, there is no need to re-distribute any of the system menu items in region 5004 on the right side of the display, as all application menu items 5102-5110 of the App Shop application fit in the left shoulder region 5006.

In some embodiments, FIGS. 5E-5L show automatic distribution of menu items in the menu bar when there isn't sufficient space for all menu items. For example, when the space on display is insufficient to display all application menu items and all system menu items in the menu bar on display with a notch region that is not capable of displaying content.

Figure 5E:
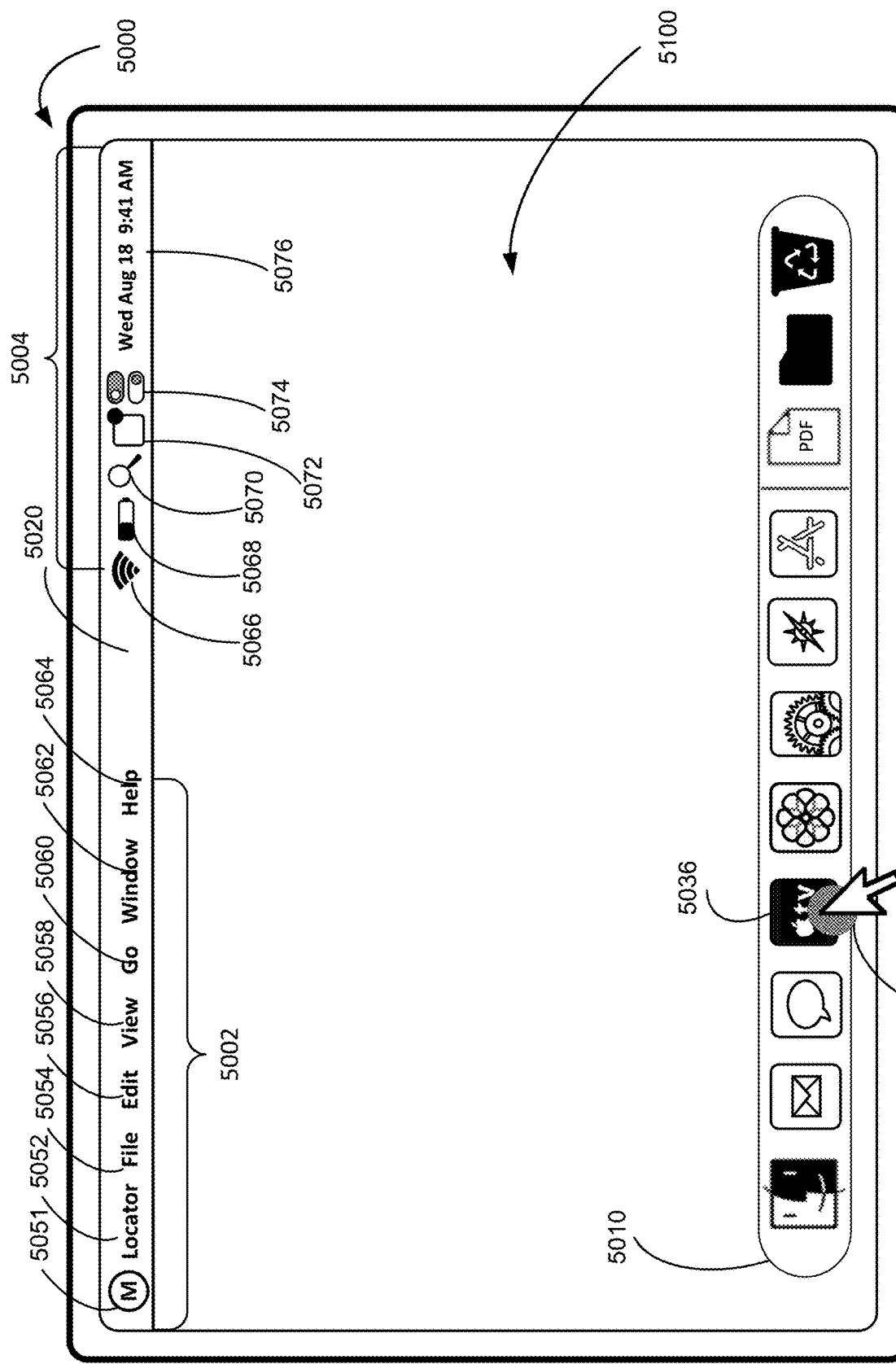

FIG. 5E illustrates user interface 5100, which includes a dock 5010 and menu bar 5020 displayed on display 5000, which does not have a notch region (e.g., notch region 5005) that occludes display of content such as application content or the menu bar 5020. User interface 5100 includes the menu bar 5020 that displays menus 5064 for the Locator application in region 5002 on the left side of display 5000. Also, user interface 5100 displays system menu items 5066-5076 on the right side of display 5000 in region 5004 that are not specific to the currently displayed application.

Figure 5F:
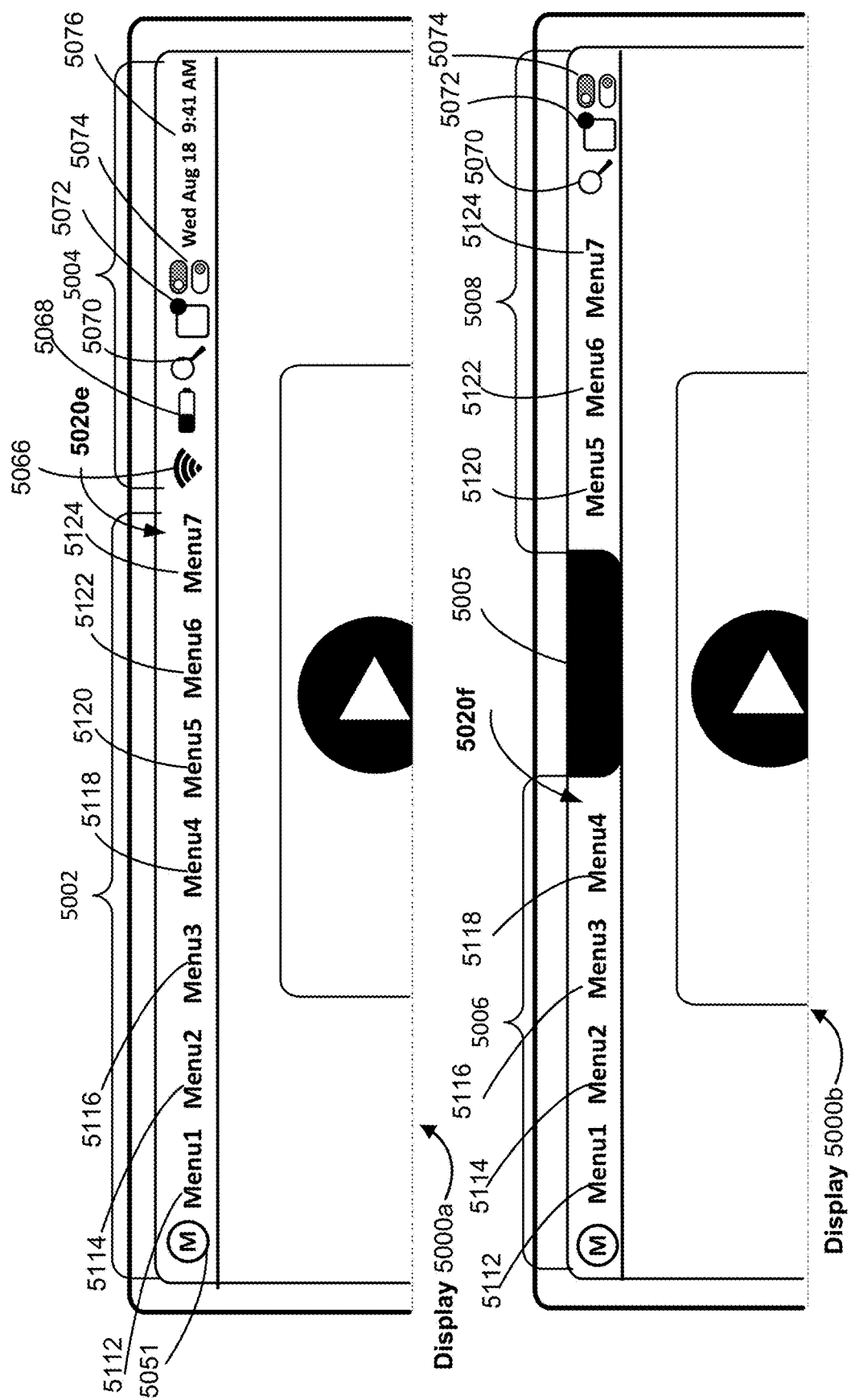

FIG. 5E shows a user input 5086 selecting a TV icon 5036 (e.g., a user may select icon 5036 using a cursor as illustrated). In response to the user input 5086, the TV application is opened, a window of the TV application is displayed in user interface 5100, and application menu items 5112-5124 for the TV application are displayed in menu bar 5020e without a notch and menu bar 5020f with a notch region 5005, as illustrated in FIG. 5F. In some embodiments, the TV application menu items 5115-5124 are pre-determined, and, in accordance with a determination that there is insufficient space to distribute all menu items 5112-5124 of the TV application in the left shoulder region 5006 and the right shoulder region 5008 of display 5000b, less than all menu items of the TV application menu items 5112-5124 and the system menu items 5070-5074 are displayed in the menu bar 5020f in accordance with a pre-determined priority.

FIG. 5F shows the TV application opened on display 5000a without a notch and display 5000b with a notch, in accordance with some embodiments. Menu bar 5020e includes application menu items 5112-5142, system menu items 5066-5076, and system menu icon 5051. The TV application menu items 5126-5142 are pre-determined for the TV application. In some embodiments, there is insufficient space to distribute all menu items 5112-5124 of the TV application in the left shoulder region 5006 and the right shoulder region 5008 of display 5000b.

FIG. 5F shows automatic distribution of TV application menu items 5112-5124 on a display 5000b with a notch according to a priority policy. According to the priority policy, application menu items are prioritized over display of some system menu items (e.g., icon 5066, icon 5068, and 5076). For example, some system status indicators such as Wi-Fi indicator 5066, battery status indicator 5068, and time and date indicator 5076 are of lower priority, while the application menu items 5112-5124 for the currently active TV applications are of higher priority. For example, the computer system determines a priority of which menu items of menu items 5051, 5112-5124 and 5066-5076 to display and which items to forego displaying in menu bar 5020f. According to the pre-determined priority, the computer system prioritizes display of the TV application menu items 5112-5124 over display of Wi-Fi indicator 5066, battery status indicator 5068, and time and date indicator 5076 in menu bar 5020h that has a cutout formed by a notch region 5005. For example, menu bar 5020h runs through the notch region 5005, and, thus, the notch region 5005 represents a cutout in the display where content cannot be displayed unless it is moved to a location that does not overlap with the notch region 5005, such as left shoulder 5005 or right shoulder 5008. In FIG. 5F, the menu items 5112-5124 are automatically distributed in menu bar 5020f in such a way as to maintain order and spacing as in menu bar 5020e and, at the same time, avoid notch region 5005 that cannot display content. In some embodiments, the reason there isn't enough space to display all application menu items may be because the names of some of the application menu items may be long or the number of the application menu items may be high, requiring more space that overlaps with the space required by the notch. In some embodiments, the number of system menu items displayed in region 5004 may be higher as the user may customize the menu bar and add third-party menu modules.

Figure 5G:
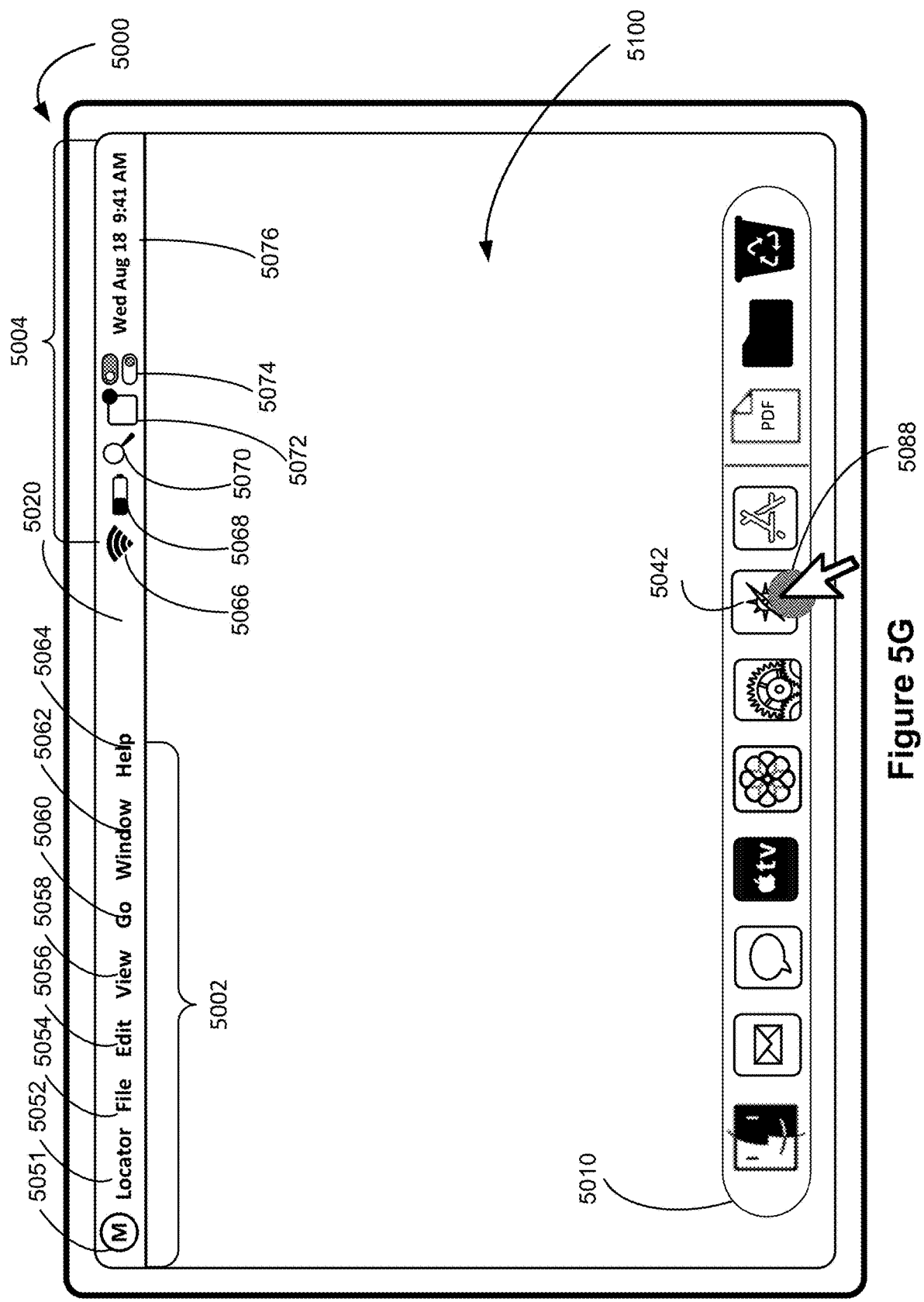

FIG. 5G illustrates user interface 5100, which is a desktop application that includes a dock 5010 and menu bar 5020 displayed on display 5000, which does not have a notch region (e.g., notch region 5005) that may occlude display of content. User interface 5100 includes menu bar 5020 that displays menus 5052-5064 for the Locator application on the left side of display 5000 in region 5002. Also, user interface 5100 displays system menu items 5066-5076 on the right side of display 5000 in region 5004 of the menu bar, where the system menu items display in region 5004 are not specific to the currently displayed application. In some embodiments, menu items in region 5004 may be customized, for example, some icons from system menu icons 5066-5076 may be removed. In some embodiments, Notification Center menu 5072 and Control Center menu 5074 provide access to critical information or essential commands. In some embodiments, Notification Center menu icon 5072 and Control Center menu icon 5074 are pre-determined to be persistently accessible from the menu bar 5020

Figure 5H:
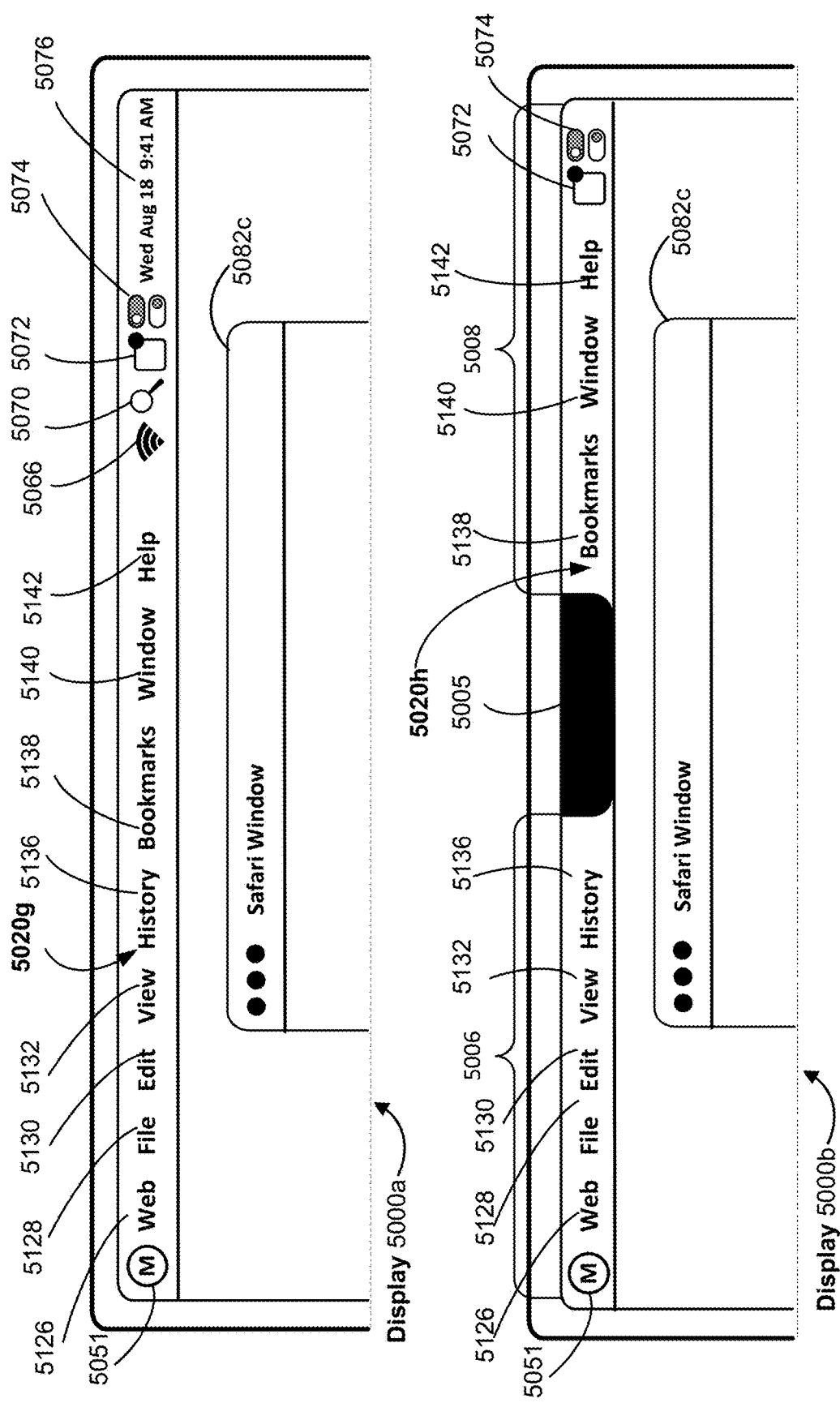

FIG. 5G shows a user input 5088 selecting icon 5046 representing a web browser application. In response to the user input 5088, the web browser application is opened, a window 5082c of the web browser application is displayed in user interface 5100, and application menu items for the web browser application are displayed in menu bar 5020g without a notch and menu bar 5020h with a notch, as illustrated in FIG. 5H. In some embodiments, the web browser application menu items are pre-determined, and in accordance with a determination that there is insufficient space to distribute the menu items of the web browser application on the left and right side of the notch, not all menu items 5052-5064 and 5066-5076 are displayed in the menu bar on a display without a notch region, in accordance with a pre-determined priority policy, as illustrated in FIG. 5H.

FIG. 5H shows the web browser application opened on display 5000a without a notch and on display 5000b with a notch in response to user input 5088, according to some embodiments. Menu bar 5020g includes application menu items 5125-5142 and system menu items 5051, and 5066-5076. In some embodiments, the web browser application menu items 5126-5142 are pre-determined for the web browser application, and there is insufficient space to distribute all menu items 5126-5146 of the web browser application in the left shoulder region 5006 and the right shoulder region 5008 of display 5000b. FIG. 5H shows automatic distribution of menu items 5051, 5126-5142 and 5066-5076 on display 5000b with a notch according to a pre-determined priority policy. According to the pre-determined policy, application menu items are prioritized over display of some system menu items, and some system menu items (e.g., icon 5051, icon 5070, and 5072) are persistently displayed and have the highest priority. For example, the computer system determines a priority of which menu items of menu items 5051, 5126-5142 and 5066-5076 to display and which items to forego displaying in menu bar 5020h. According to the pre-determined priority policy, the computer system prioritizes display of the web browser application menu items 5126-5142 over display of the system menu items 5066, 5070, and 5076 in menu bar 5020h that has a cutout formed by a notch region 5005. For example, menu bar 5020h runs through the notch region 5005, and thus the notch region 5005 represents a cutout in the display where content cannot be displayed unless it is moved to a location that does not overlap with the notch region 5005. In some embodiments, because system menu icon 5051, the Notification Center icon 5072 and the Control center icon 5074 provide access to important information, frequently used commands, or otherwise provide critical system functionality, the system menu icon 5051, the Notification Center icon 5072 and Control center icon 5074 are persistently displayed, regardless of the available space and are prioritized over the Web application menu items 5126-5142.

Display 5000*b* shows that all web browser application menu items 5126-5142 prioritized over display of Wi-Fi icon 5066, search icon 5070, and the date and time indicator 5076, while the system menu icon 5051, and the Notification Center icon 5072 and Control center icon 5074 are displayed persistently, regardless of the available space that remains in the top edge of display 5000. FIG. 5H shows that when there is insufficient space in menu bar 5020*h* (e.g., space that remains unobstructed by the notch region 5005) to display all of the menu items 5051, 5126-5142, and 5066-5076, the system automatically assigns the highest priority of display to system menu items that provide critical system functionality such as icons 5051, 5070, and 5074, thereby the menu bar 5020*h* automatically (without additional user input) maintains consistent display of system-level functionality in the menu bar 5020*h* that is essential for interacting with the system, and, at the same time, accommodates the notch region 5005.

Figure 5I:
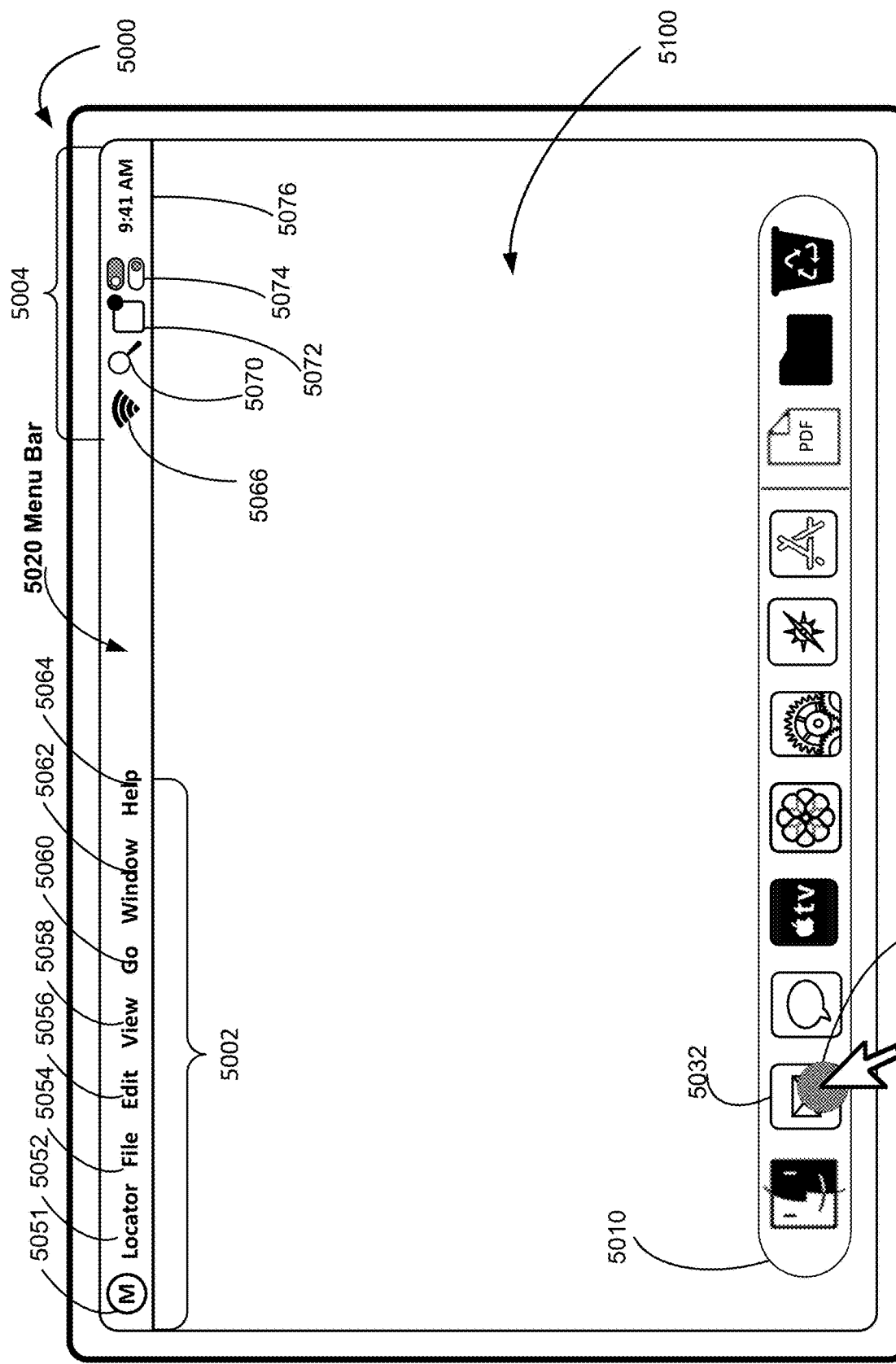

FIG. 5I illustrates user interface 5100, which is a desktop application that includes a dock 5010 and menu bar 5020 displayed on display 5000, which does not have a notch region (e.g., notch region 5005) that may occlude display of content. User interface 5100 includes menu bar 5020 that displays menus 5052-5064 for the Locator application on the left side of display 5000 in region 5002, where application menu items may typically be located, according to some embodiments. Also, user interface 5100 displays system menu items 5066-5076 on the right side of display 5000 in region 5004 of the menu bar, where the system menu items 5066-5076 displayed in region 5004 are not specific to the currently displayed application. In some embodiments, menu items in region 5004 may be customized, for example, some icons from system menu icons 5066-5076 may be removed. In some embodiments, Notification Center menu 5072 and Control Center menu 5074 provide access to critical information or essential commands. In some embodiments, Notification Center menu icon 5072 and Control Center menu icon 5074 are pre-determined to be persistently accessible from the menu bar 5020. In some embodiments, as described above, the system menu 5051 is also persistently available from any menu bar, with or without a notch.

Figure 5J:
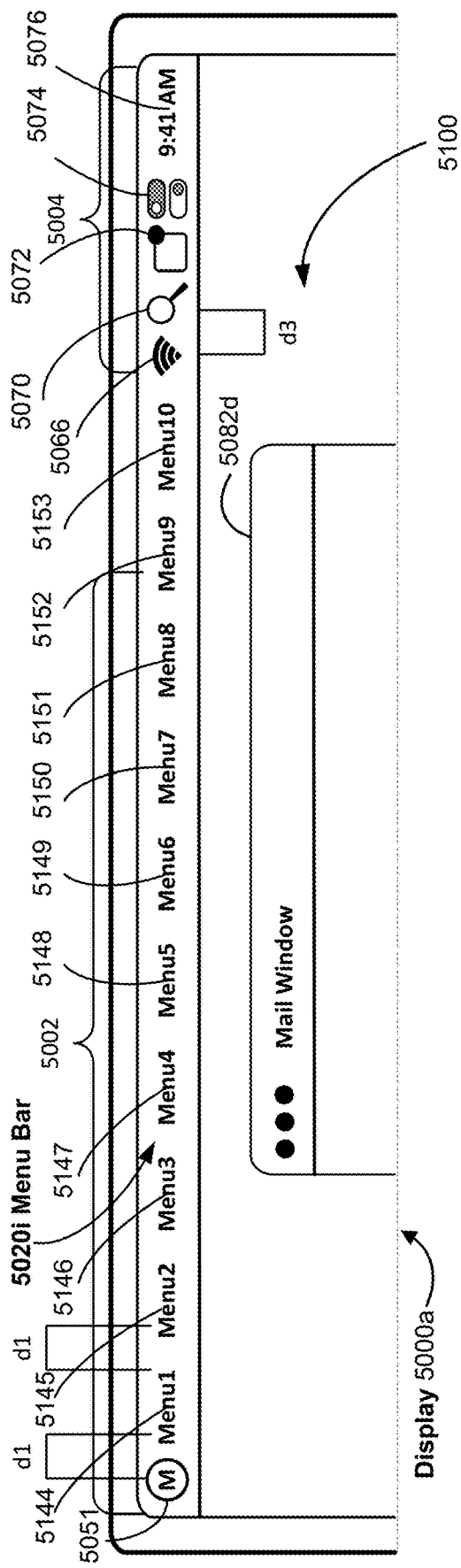
Figure 5J:
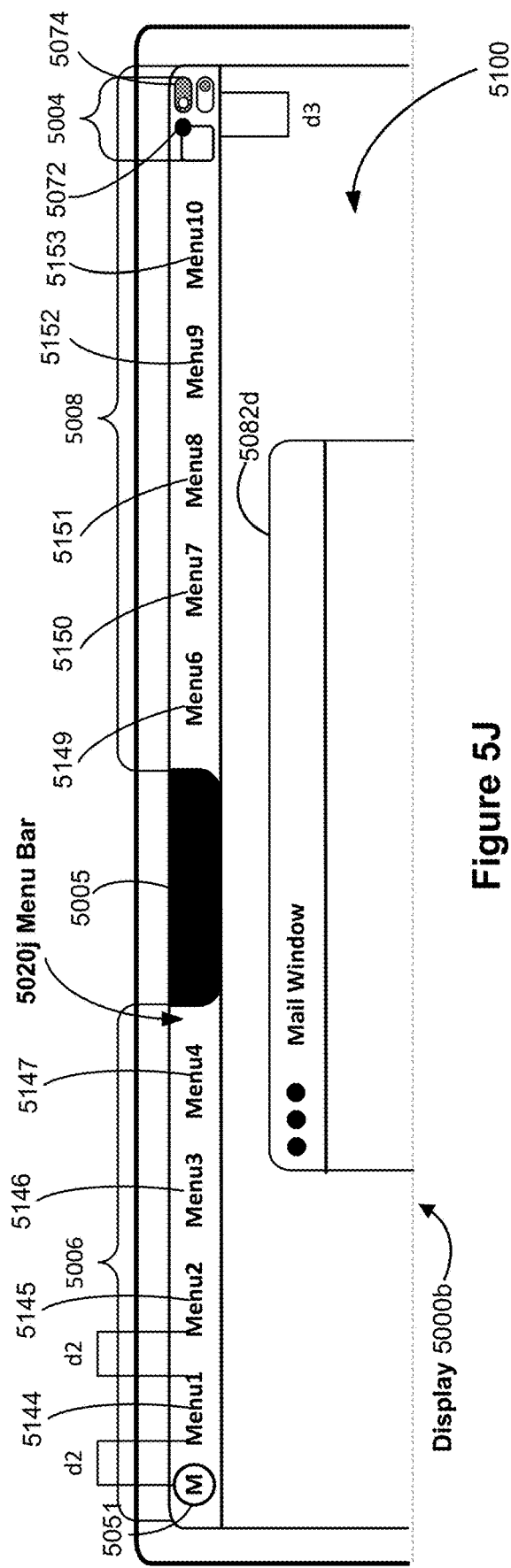

FIG. 5I shows a user input 5089 selecting icon 5032 representing the Mail application. In response to the user input 5089, the Mail application is opened, a window 5082*d* of the Mail application is displayed in user interface 5100, and application menu items 5144-5153 for the Mail application are displayed in menu bar 5020*i* without a notch and menu bar 5020*j* with a notch, as illustrated in FIG. 5J. In some embodiments, the Mail application menu items are pre-determined, and in accordance with a determination that there is insufficient space to distribute the menu items of the Web application on the left and right side of the notch, not all menu items 5052-5064 and 5066-5076 are displayed in the menu bar on a display without a notch region, in accordance with a pre-determined priority, as illustrated in FIG. 5J.

FIG. 5J shows the Mail application opened on display 5000*a* without a notch and on display 5000*b* with a notch in response to user input 5089, according to some embodiments. FIG. 5J illustrates a comparison of menu bar 5020*i* where there is no notch to obstruct its content and menu bar 5020*j*, where there is a notch that cannot display content and obstructs the display of some Mail application menu items in menu bar 5020*j*, according to some embodiments.

Menu bar 5020*j* includes application menu items 5144-5153 and system menu items 5051, and 5066-5076. The Mail application menu items 5144-5153 are pre-determined for the Mail application. In some embodiments, there is insufficient space to distribute all menu items 5144-5153 of the Mail application in the left shoulder region 5006 (e.g., left side of notch region 5005) and the right shoulder region 5008 (e.g., right side of notch region 5005) of display 5000*b*. FIG. 5J shows automatic distribution of menu items 5051, 5144-5153 and 5066-5076 on display 5000*b* with a notch 5005 according to a pre-determined priority. According to the pre-determined policy, application menu items are prioritized over display of some system menu items, and some system menu items (e.g., icon 5051, icon 5070, and 5072) are persistently displayed and have the highest priority.

In FIG. 5J, according to the pre-determined priority, the computer system prioritizes display of the Mail application menu items 5144-5153 over display of the system menu items 5066, 5070, and 5076 in menu bar 5020*j*. As described above in relation to FIG. 5H, the system menu icon 5051, the Notification Center icon 5072 and Control center icon 5074 are persistently displayed regardless of the available space. In some embodiments, however, there isn't sufficient space in menu bar 5020*j* to display all application menu items 5144-5153 even after non-critical system menu items (e.g., Wi-Fi icon 5066, battery icon 5070, and time indicator 5076) that are customizable are removed from menu bar 5020*j*. The computer system automatically determines priority of menu items in the 5020*j* menu bar so as to accommodate the notch region 5005. In some embodiments, as illustrated in menu bar 5020*j*, not all application menu items are displayed compared to menu bar 5020*i* that is unobstructed by a notch region. For example, mail application menu item "Menu5" 5148, is not displayed.

Thus, display 5000*b* in FIG. 5J shows that the computer system may also remove some application menu items (e.g., menu item 5148) if after removing all removeable system menu items (e.g., icons 5066, 5070, and 5076), the computer system determines that there isn't sufficient space to fit the remaining application menu items (e.g., menu items 5144-5153) and the critical menu items (e.g., system menu icon 5051 and Notification Center icon 5074 and Control Center icon 5076) in a menu bar where a notch region (e.g., 5020*j*) forms a cutout in display 5000*b* that cannot display content.

Further, display 5000*b* in FIG. 5J shows dynamic spacing of menu bar items in a menu bar 5020*j* with a notch region that divides the menu bar 5020*j* into two equal portions according to some embodiments. The computer system dynamically and automatically distributes the menu items 5051, 5144-50153 and 5066-5076 based on the available screen space around the notch region 5005 so as to maintain even distance of the menu items from one another in either side 5006 or 5008 of the notch region 5005.

In some embodiments, application menu items 5144-5153 for the Mail application (or any application) are displayed evenly spaced from one another in menu bar 5020*i* without a notch region. For example, the distance d1 between menu item 5144 and menu item 5145 is the same as the distance between menu item 5145 and menu item 5146; similarly, the distance between menu item 5146 and menu item 5147 is also the same, e.g., d1; the distance between menu item 5147 and menu item 5148 is also the same, e.g., d1; the distance between menu item 5148 and menu item 5149 is also d1; the distance between menu item 5149 and menu item 5150 is also the same, e.g., d1; the distance between menu item 5150 and menu item 5151 is also the same, e.g., d1; the distance between menu item 5151 and menu item 5152 is also the same, e.g., d1; the distance between menu item 5152 and menu item 5153 is also the same, e.g., d1. In some embodiments, the distance between the system menu icon 5051 and the first application menu item 5144 is also the same as the distance d1 between the application menu items 5144-5153.

In some embodiments, the computer system maintains even spacing and/or order of application menu items on displays with a notch region that divides the menu bar (e.g., the notch divides the menu bar into a left and right shoulders 5006 and 5008 that are capable of displaying content). In some embodiments, application menu items 5144-5147 are displayed evenly spaced from one another on the left side of notch region 5005 in left shoulder region 5006. For example, the distance d2 between menu item 5144 and menu item 5145 is the same as the distance between menu item 5145 and menu item 5146; similarly, the distance between menu item 5146 and menu item 5147 is also the same, e.g., d2. Further, in some embodiments, also the distance between system menu icon 5051 and the first application menu icon 5144 is also d2, and/or the distance between the last application menu item 5147 and the notch region 5005 is also d2. In some embodiments, the distances d1 and d2 are different. In some embodiments, the distances d1 and d2 are different. In some embodiments, the notch region 5005 divides the top edge of display 5000 equally, e.g. left shoulder region 5006 is the same length as right shoulder region 5008.

Further, application icons in the right shoulder 5008 are also displayed evenly spaced from one another in addition to the application menu items in the left shoulder 5006. For example, the distance between menu item 5149 and menu item 5150 is also the same, e.g., d2; the distance between menu item 5150 and menu item 5151 is also the same, e.g., d2; the distance between menu item 5151 and menu item 5152 is also the same, e.g., d2; the distance between menu item 5152 and menu item 5153 is also the same, e.g., d2. Further, in some embodiments, also the distance between notch region 5005 and the first application menu icon 5149 in the right shoulder 5008 is also d2, and/or the distance between the last application menu item 5153 and the right edge of display 5000a is also d2.

In some embodiments, not only application menu items such as Mail menu items 5144-5153 are displayed evenly spaced from one another, but also system menu items displayed in region 5004 are also displayed evenly spaced from one another in both display 5000a without a notch and display 5000b with a notch. For example, the distance d3 between Wi-Fi indicator 5066 and search icon 5070 in menu bar 5020i is the same as the distance between search icon 5070 and the Notification Center icon 5072; similarly, the distance between the Notification center icon 5072 and the Control Center icon 5074 in menu bar 5020i is also the same, e.g., d3; and the distance between the Control Center icon 5074 and the time indicator 5076 in menu bar 5020i is also the same, e.g., d3. In some embodiments, the distance d3 is different from the distances d1 and d2. In some embodiments, the distance d3 equals distances d1 and d2.

In some embodiments, the computer system maintains even spacing and/or order of system menu items on display 5000b with a notch region 5005 that divides the menu bar.

For example, the distance between the remaining system menu items 5072 and 5074 may also be d2 or d3. In some embodiments the distance between the last application menu item 5153 and the Notification Center 5004 is the same as the distance between the Notification Center 5072 and the Control Center 5074.

Figure 5K:
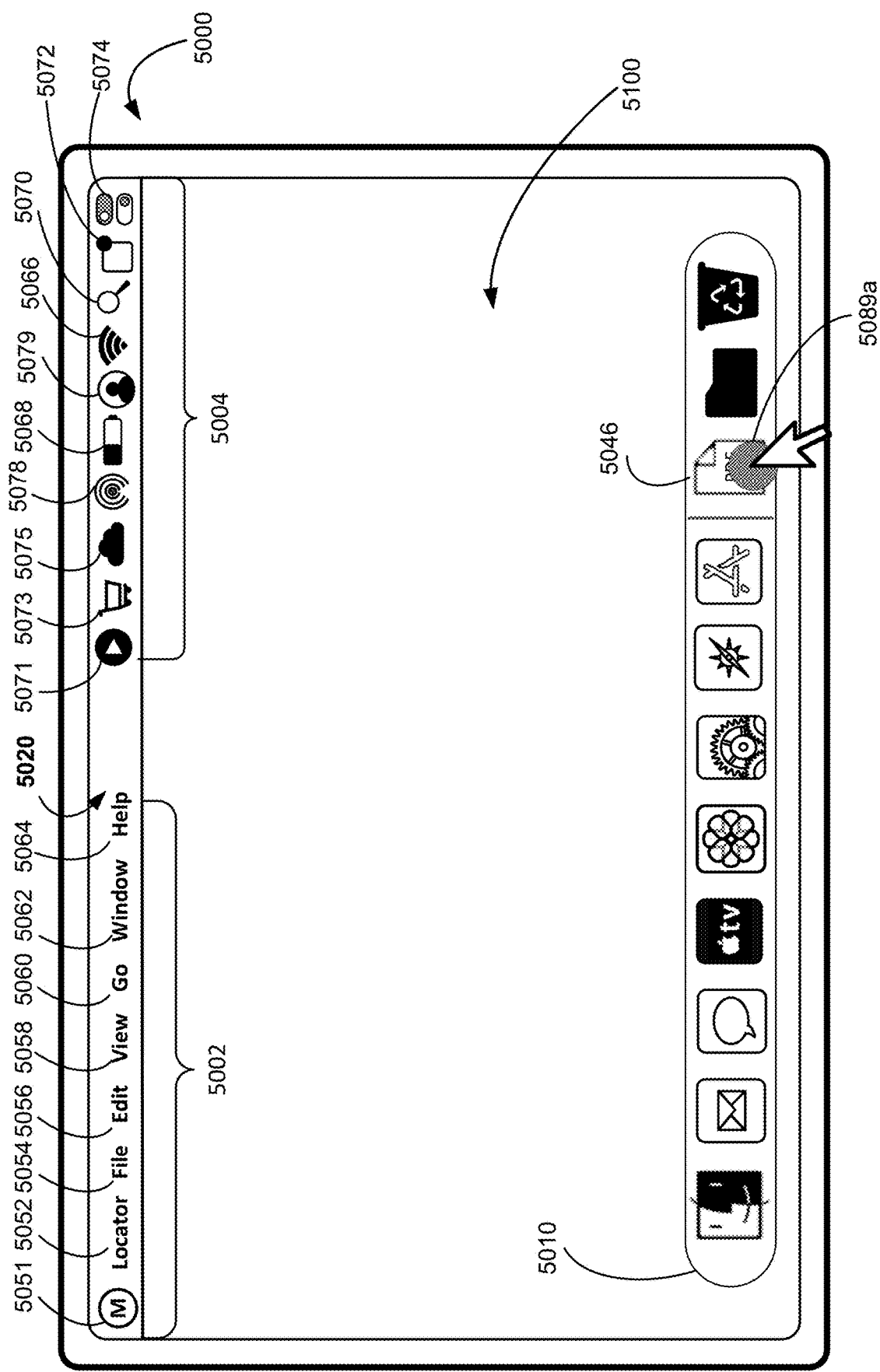

FIG. 5K illustrates user interface 5100 that includes dock 5010 and menu bar 5020 displayed on display 5000, which does not have a notch region that is not capable of displaying content. User interface 5100 includes menu bar 5020 that displays menus 5052-5064 for the Locator application on the left side of display 5000 in region 5002 (e.g., similar to FIGS. 5A, 5C, 5E, 5G, and 5I). Also, user interface 5100 displays system menu items 5066, 5068, 5070, 5072, 5074, 5078, and 5079 and third-party menu modules, icons, or otherwise referred to as menu extras 5071, 5073, 5075 on the right side of display 5000 in region 5004 of the menu bar. The system menu items 5066, 5068, 5070, 5072, 5074, 5078, and 5079, and third-party menu modules displayed in region 5004 are not specific to the currently displayed application unlike application menu items 5052-5064.

In some embodiments, icon 5071 represents a video application is not provided by the operating system of the electronic device and is a third-party video application icon that provides access to commands and functionality within the third-party video application. For example, a user can select icon 5071 to open or activate the third-party video application. In some embodiments, users of the electronic device may have installed third-party applications that automatically added corresponding menu extras or icons in region 5004 to provide quick access to functionality of the respective third-party applications. In some embodiments, user may remove the third-party menu extras or add different third-party menu extras. Similarly, icon 5073 represents a third-party menu extra that provides access to tasks, commands, and/or other functionality within the third-party shopping application. And, icon 5075 represents a third-party menu module or menu extra that provides access to tasks and functionality within a cloud storage application icon 5075 is a selectable user interface element that can be user to open or activate the corresponding cloud storage application. In some embodiments, the menu extras are selectable user interface elements such as icons 5071, 5073, 5075 that provide access to functionality of respective third-party applications. Further, icon 5078 is a system menu item that provides functionality for sharing data with similar devices; and icon 5079 is a system menu item that provides functionality for user switching. The remaining system menu items 5068, 5066, 5070, 5072, and 5074 are described above.

In some embodiments, menu items in region 5004 may be customized, for example, some icons from system menu icons 5066, 5068, 5070, 5072, 5074, 5078, and 5079 and/or some items from the third-party menu extras 5071, 5073, 5075 may be removeable (e.g., via a drag-and-drop operation or a right-click that shows a sub-menu). In some embodiments, the Notification Center menu 5072 and Control Center menu 5074 provide access to critical information, essential commands, and/or frequently access commands and information, thereby the computer system maintains display of the Notification Center menu icon 5072 and Control Center menu icon 5074 in the menu bar 5020. In some embodiments, as described above, the system menu 5051 is also persistently available from any menu bar, with or without a notch.

Figure 5L:
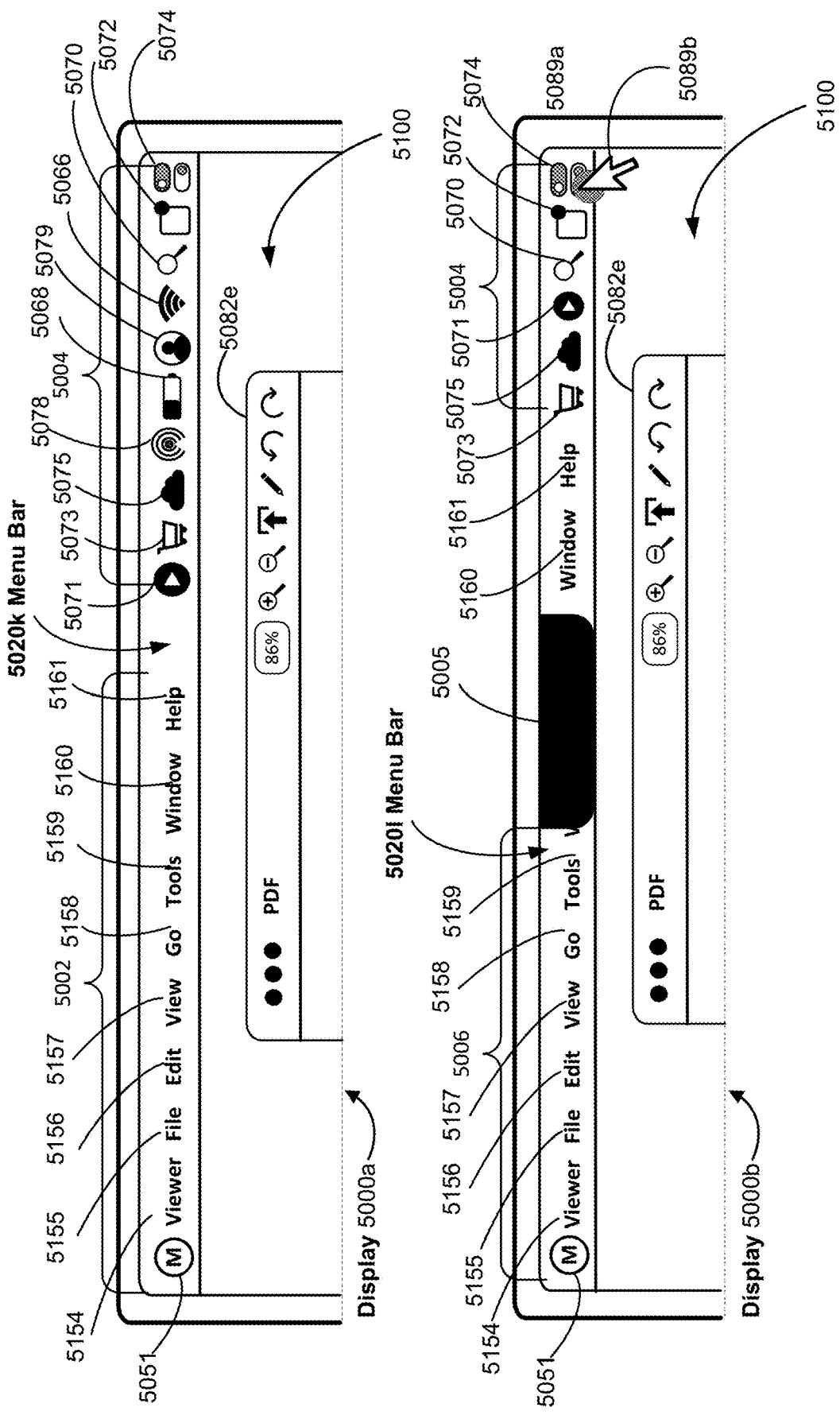

Further, FIG. 5K shows a user input 5089a that selects icon 5032 representing a PDF document. In response to the user input 5089*a*, the Viewer application is opened (e.g. the Viewer application may be set to be the default application that opens PDF documents) and a window 5082*e* of the Viewer application showing the PDF document is displayed in user interface 5100. Further, application menu items 5154-5161 for the Viewer application are displayed in menu bar 5020*k* without a notch and menu bar 5020*l* with a notch, as illustrated in FIG. 5L. In some embodiments, the Viewer application menu items are pre-determined, and in accordance with a determination that there is insufficient space to distribute the menu items of the Viewer application on the left and right side of notch region 5005 in menu bar 5020*l*, the computer system automatically distributes application menu items 5154-5161, system menu items 5068, 5066, 5070, 5072, and 5074, 5078, and 5079, and third-party menu extras 5071, 5073, 5075 in accordance with a pre-determined priority, as illustrated in FIG. 5L.

FIG. 5L shows the Viewer application opened on display 5000*a* without a notch and on display 5000*b* with a notch in response to user input 5089*a*, according to some embodiments. FIG. 5L illustrates a comparison of menu bar 5020*k* where there is no notch and menu bar 5020*l*, where there is a notch that cannot display content and thus would not be cable of displaying Viewer application menu items in menu bar 5020*l*, according to some embodiments.

Menu bar 5020*k* includes application menu items 5154-5161 and system menu items 5051, 5068, 5066, 5070, 5072, 5074, 5078, and 5079, and third-party menu extras 5071, 5073, 5075. The Viewer application menu items 5154-5161 are pre-determined for the Viewer application. In some embodiments, there is insufficient space to distribute all menu items 5154-5161 of the Viewer application in the left shoulder region 5006 (e.g., left side of notch region 5005) and the right shoulder region 5008 (e.g., right side of notch region 5005) of display 5000*b*. For example, notch region 5005 does not leave enough room in menu bar 5020*l* for all application menu items, all system menu items, and all third-party menu extras. Accordingly, there is a need to determine which menu items take priority.

FIG. 5L shows automatic distribution of menu items 5051, 5154-5161; menu items 5068, 5066, 5070, 5072, 5074, 5078, and 5079; and menu extras 5071, 5073, 5075 on display 5000*b* with a notch 5005, according to a pre-determined priority. According to the pre-determined policy: (1) application menu items 5154-5161 are prioritized over display of some system menu items; (2) critical system menu items (e.g., icon 5051, icon 5070, and 5072) are persistently displayed and have the highest priority; and (3) third-party menu extras are given higher priority than other, non-critical, system menu items that are removable (e.g., as opposed to the system menu items that are not removable such as 5051, 5072, and 5074).

The computer system automatically determines priority of menu items in the menu bar 5020*l* so as to accommodate the notch region 5005 and, at the same time, use shoulder regions 5006 and 5008. In some embodiments, as illustrated in menu bar 5020*l*, not all system menu items are displayed compared to menu bar 5020*k* that is unobstructed by a notch. For example, in FIG. 5L, according to the pre-determined priority, the computer system prioritizes display of the Viewer application menu items 5154-5161 in menu bar 5020*l* over display of all of non-critical system menu items such as file transfer icon 5078, battery indicator 5068, user switch icon 5079, and Wi-Fi status indicator 5066. Further, according to the pre-determined priority, the computer system displays third-party menu extras 5071, 5073, 5075 and forgoes displaying non-critical system menu items file transfer icon 5078, Battery indicator 5068, user switch icon 5079, and Wi-Fi status indicator 5066. Thus, FIG. 5L shows that, in some embodiments, the computer system assigns higher priority to third-party menu extras than it assigns to the removeable/non-critical system menu items. In other embodiments, the computer system may assign higher priority to non-critical system menu items that it assigns to the third-party menu extras. For example, the computer system may forgo displaying third-party menu extras 5071, 5073, and 5075 first, before it determines to forgo the display of any non-critical system menu items.

FIG. 5L also shows a user input 5089*b* that selects Control Center icon 5074. In response to user input 5089*b*, a drop-down menu 5162 is revealed that includes various system controls, as illustrated in FIG. 5M.

Figure 5M:
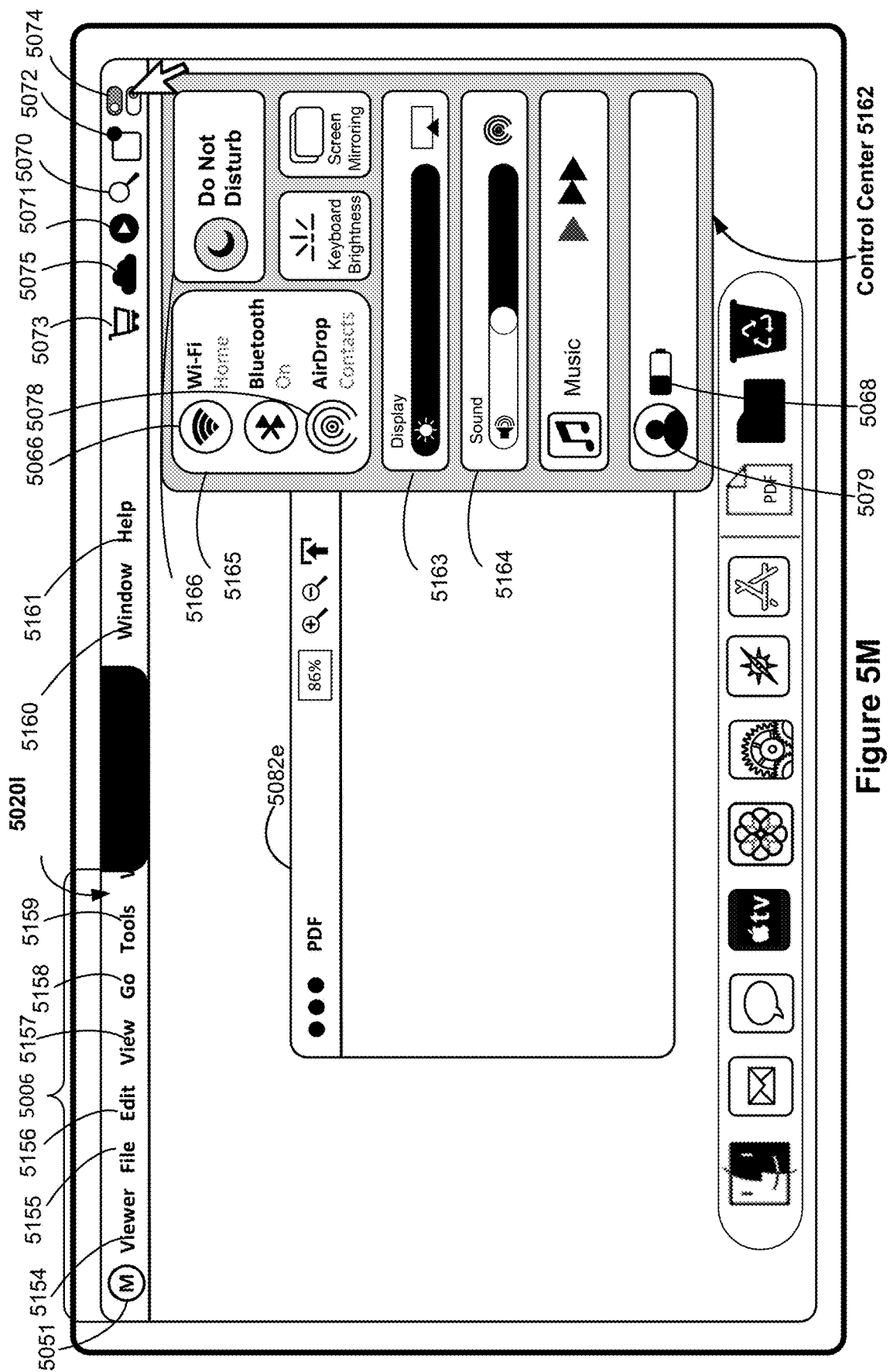

FIG. 5M shows Control Center menu 5162 that is revealed in response to a user clicking on the Control Center icon 5074. Control Center icon 5074 provides quick access to system controls such as display brightness control 5163, volume or sound control 5164, connectivity controls 5165, control 5166 for entering a "Do Not Disturb" mode and other frequently used or otherwise important commands. In some embodiments, the Control Center menu 5162 is customizable and controls may be added or removed according to user selection. FIG. 5M shows that system menu items, which the computer the system forgo displaying in FIG. 5L, are automatically added to the Control Center menu 5162. Thus, even though the computer system removes file transfer control 5078, battery indicator 5068, Wi-Fi indicator 5066, and user switch icon 5079, the removed system menu items file transfer control 5078, battery indicator 5068, Wi-Fi indicator 5066, and user switch icon 5079 are accessible from menu bar 5020*l* via Control Center icon 5074, which is persistently available in menu bar 5020*l*. For example, control 5079 for user switching and battery indicator 5068 are added to Control Center menu 1562. In some embodiments, Wi-Fi indicator 5165 and file transfer control 5078 were available in Control Center menu 1562 even before the computer system forgo displaying them. For example, some controls in the Control Center menu 1562 may be duplicated in the menu bar.

FIGS. 5N-5T illustrate example user interfaces for automatic interaction of application windows on a display 5000 with a notch 5003, in accordance with some embodiments. For example, FIGS. 5N-5T illustrate automatic shifting of windows that are placed over a notch region, so that the windows do not overlap with the notch region.

Figure 5N:
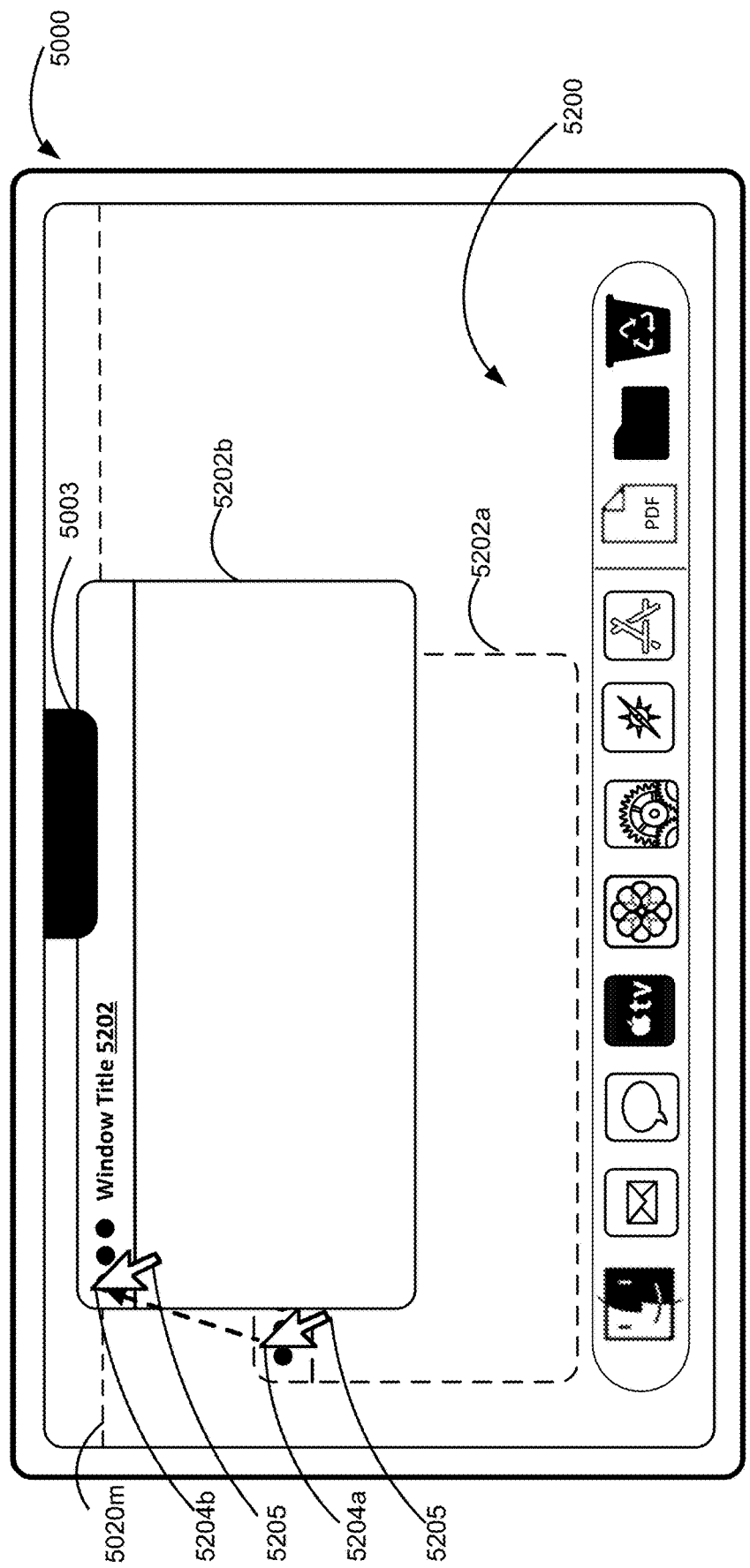
FIGS. 5N-5T illustrate example user interfaces for displaying application windows on a display with a notch, in accordance with some embodiments.
Figure 5N:
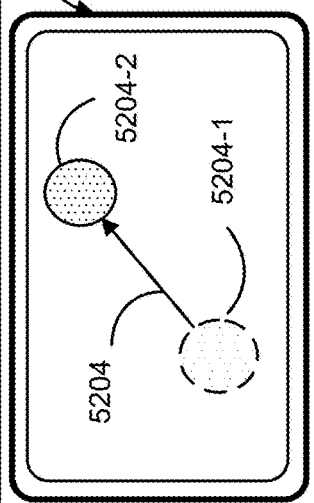

FIG. 5N illustrates an example user interface 5200 on a device (e.g., device 300, FIG. 3) with a touch-sensitive surface 451 (e.g., a touchpad 355, FIG. 3) that is separate from the display 5000. Examples that follow will be given with reference to a device that detects inputs on a touch-sensitive surface 451 that is separate from the display, as described above with reference to FIG. 4B. In some embodiments, the location of the menu bar 5020*m* is indicated with a dashed line. In some embodiments, user interface 5200 displays application window 5202. In some embodiments, application window 5202 may be a window of any application that is installed on the device or is available on the internet, e.g., via cloud technology. In some embodiments, the application without 5202 is associated with an application that is open, active, in focus or displayed at forefront.

FIG. 5N shows that the device detects a continuous contact 5204 from position 5204-1 to position 5204-2 on the touch-sensitive surface 451, thereby moving window 5202 from position 5202*a* (that does not overlap with notch region 5003) to position 5202*b*, which overlaps with notch region 5003 as illustrated in FIG. 5N. Contact 5204-2 on touch-sensitive surface 451 illustrates an end of the movement (e.g., an end of the drag operation), where contact 5204-2 corresponds to position 5204b of cursor 5205 (or focus selector) on display 5000. Contact 5204-1 on the touch-sensitive surface 451 corresponds to a location 5204a on display 5000 where cursor 5205 is directed to or is located, e.g., cursor 5205 is directed to a portion of application window 5202 that represents the title of window 5202. In some embodiments, contact 5204-1 selects application window 5202 (e.g., a long or deep press) and moves it (e.g., drags it) to a location 5202b on display 5000 that overlaps with notch region 5003 as illustrated by movement of the continuous contact 5204 from position 5204-1 to position 5204-2 on the touch-sensitive display 451, and a movement of cursor 5205 illustrated by a dashed line from position 5204a to 5204b, and movement of the window 5202 from position 5202a to position 5202b, in accordance with some embodiments.

Figure 5O:
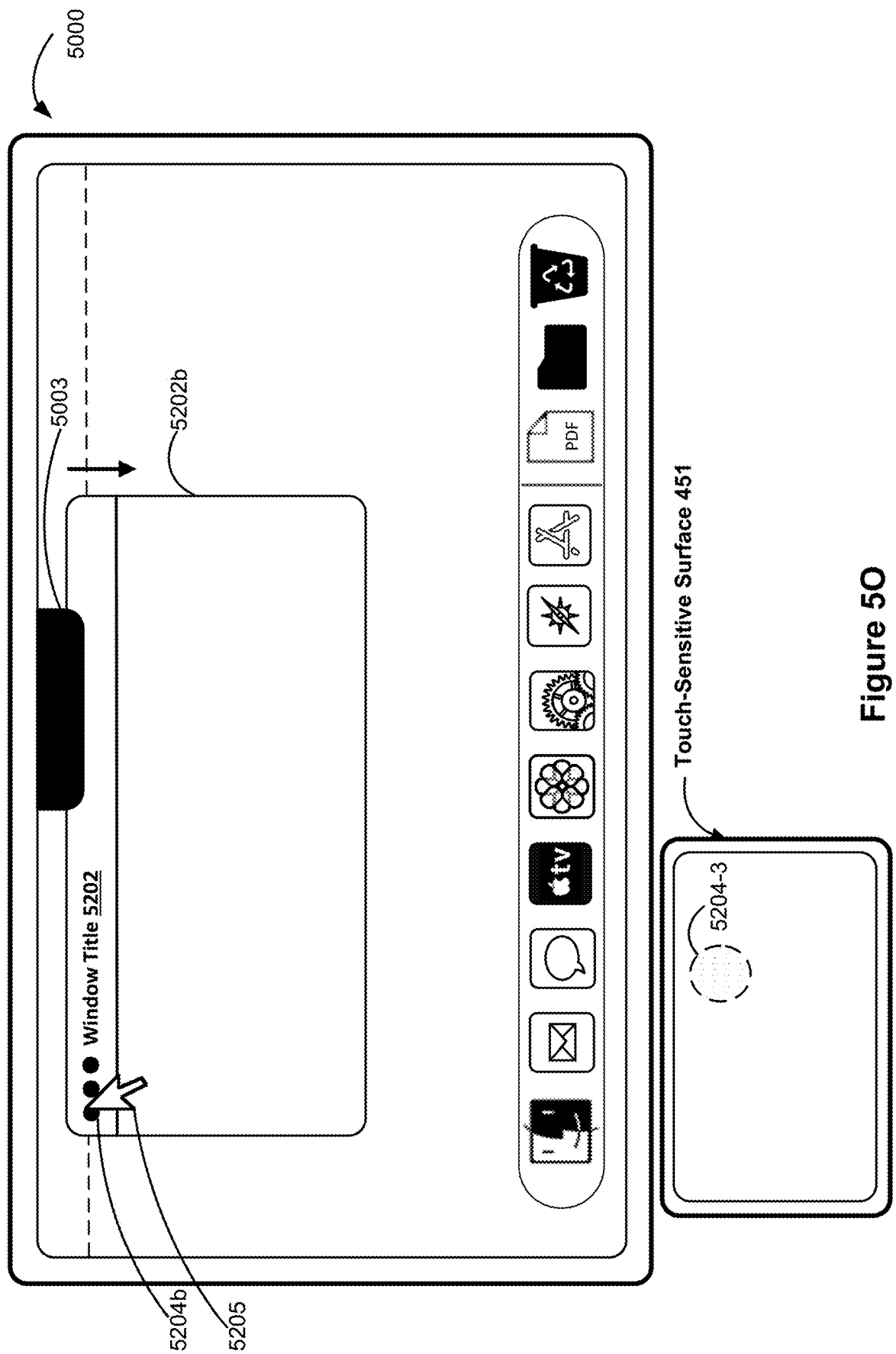

In some embodiments, FIG. 5N illustrates that while an input 5204 moving the application window 5202 from position 5202a to position 5202b is being detected (e.g., before detecting the end of the input such as liftoff 5204-3 illustrated in FIG. 5O), the computer system displays on display 5000 only the portions of the application window 5202 that do not overlap with the notch region 5003. For example, a portion of the content of the application window at position 5202b where the window overlaps with the notch region 5003, e.g., a top edge of the application window 5202 at position 5202b is partially obstructed or hidden. For example, since there are no pixels to display the window content, that part of the window where the notch region 5003 is located is shown black, thereby forming a cutout in application window 5202.

When the application window 5202 is dragged over the notch region 5003 (e.g., a non-display region that cannot display content) at position 5202b where the application window 5202 overlaps with the notch region 5003, the notch region 5003 obstructs/hides portions of content that would otherwise be displayed when the window is in a position such as in position 5202a where the notch region 5003 does not obstruct display of the window. In some embodiments, hiding portions of application window 5202 when the application window 5202 overlaps with the notch region 5003 (including while the application window 5202 is being dragged through the notch region 5003 on the display 5000 in response to input 5204) provides visual feedback that the application window 5202 is moved in response to input 5204, and at the same time, provides visual feedback that the application window 5202 is being moved through a region that is not capable of displaying content.

As illustrated in FIG. 5O, the device detects a liftoff 5204-3 of contact 5204 from the touch-sensitive surface 451, which represents the end of contact 5204, according to some embodiments. In some embodiments, the device detects liftoff 5204-3 when the application window 5202 is at position 5202b on display 5000, where the application window 5202 at least partially overlaps with notch region 5003, which is not capable of displaying content, including content of application window 5202. In accordance with a determination that at least a portion of the application window 5202 overlaps with notch region 5003, the computer system automatically moves (e.g., without additional user input) the application window 5202 from the position 5202b that overlaps with the notch region to a different position where the application window 5202 does not overlap with notch region 5003, e.g., position 5202c as illustrated in FIG. 5P.

Figure 5P:
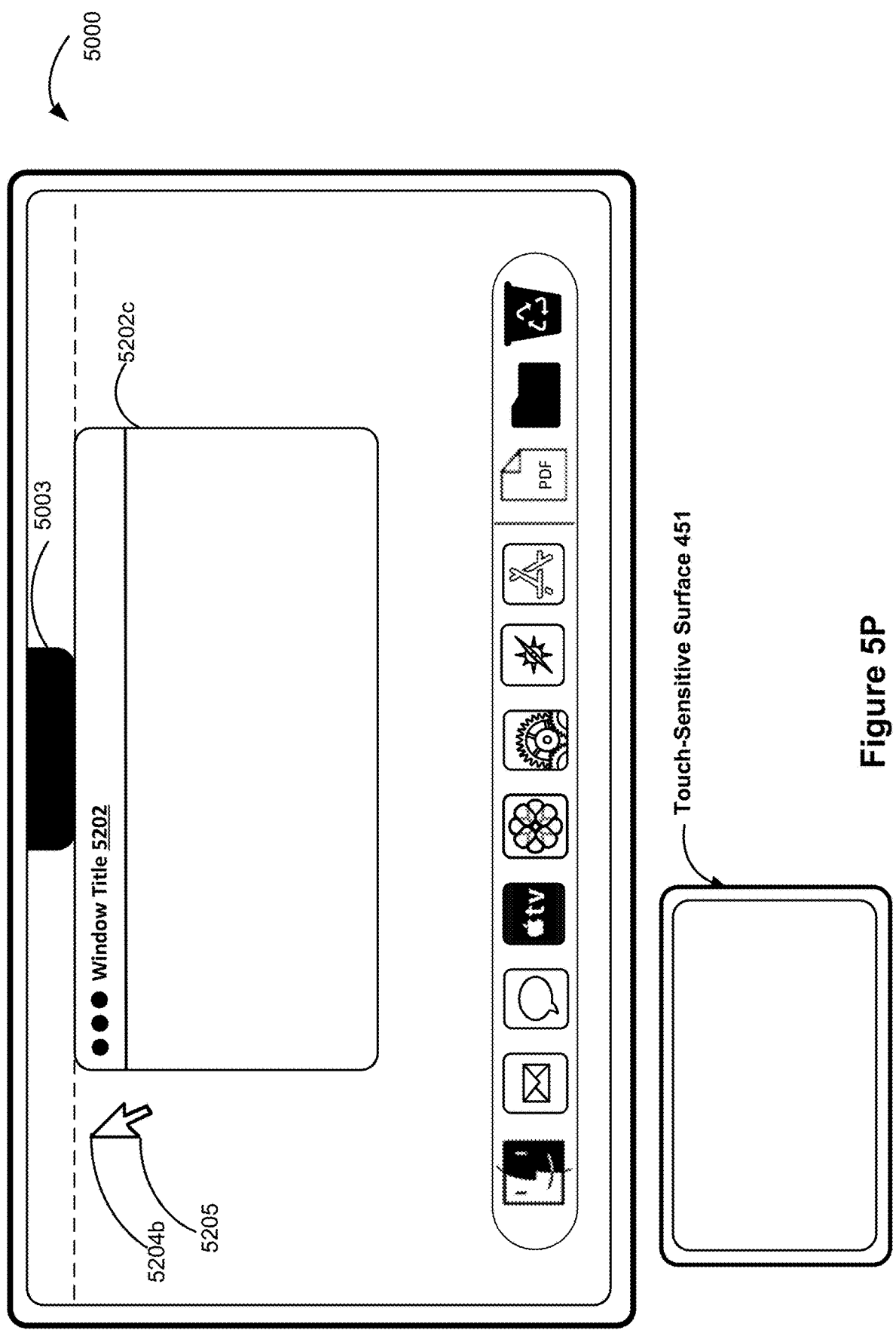

For example, FIG. 5P shows that the application window 5202 is automatically pushed down from position 5202b (shown in FIG. 5O) to position 5202c, which is below notch region 5003 (e.g., window 5202a is moved vertically) and does not overlap with the notch region 5003. No contacts are shown on touch-sensitive surface 451 as all fingers have been lifted off from the touch-sensitive surface 451, as explained above, or a mouse click have been released. Display of cursor 5205 is maintained at location 5204b (e.g., the location of the cursor 5205 at the time liftoff 5204-3 was detected) as typically a cursor remains displayed on the display even if there is no input (e.g., to show what is the location of the cursor). Upon liftoff 5204-3, the computer system automatically moves or shifts the application window 5202 from 5202b to position 5202c such that all of the content in the application window 5202 is displayed and the application window at position 5202c no longer overlaps with the notch region 5003. In some embodiments, in accordance with the determination that at least a portion of the application window 5202 at position 5202b overlaps with the notch region 5003 (when the computer system detect liftoff 5204-3), the computer system automatically moves (e.g., without additional user input) the application window 5202 vertically from the position 5202c that overlaps with notch region 5003 to a different position such that the application window 5202c is below the notch region 5003 region and a top edge of the application is adjacent to a bottom edge of the notch region 5003. For example, window is moved adjacent to the notch region 5003, e.g., right below the notch region 5003 and menu bar 5020m at position 5202c. FIG. 5P further shows that application window is automatically centered on display 5000 and aligned with notch region 5003, e.g., at position 5202c. In some embodiments, since application window 5202 is larger than the length of either shoulder, application window 5202 is pushed down or moved substantially vertically, as opposed to being moved or shifted to the left or right side of 5003.

Figure 5Q:
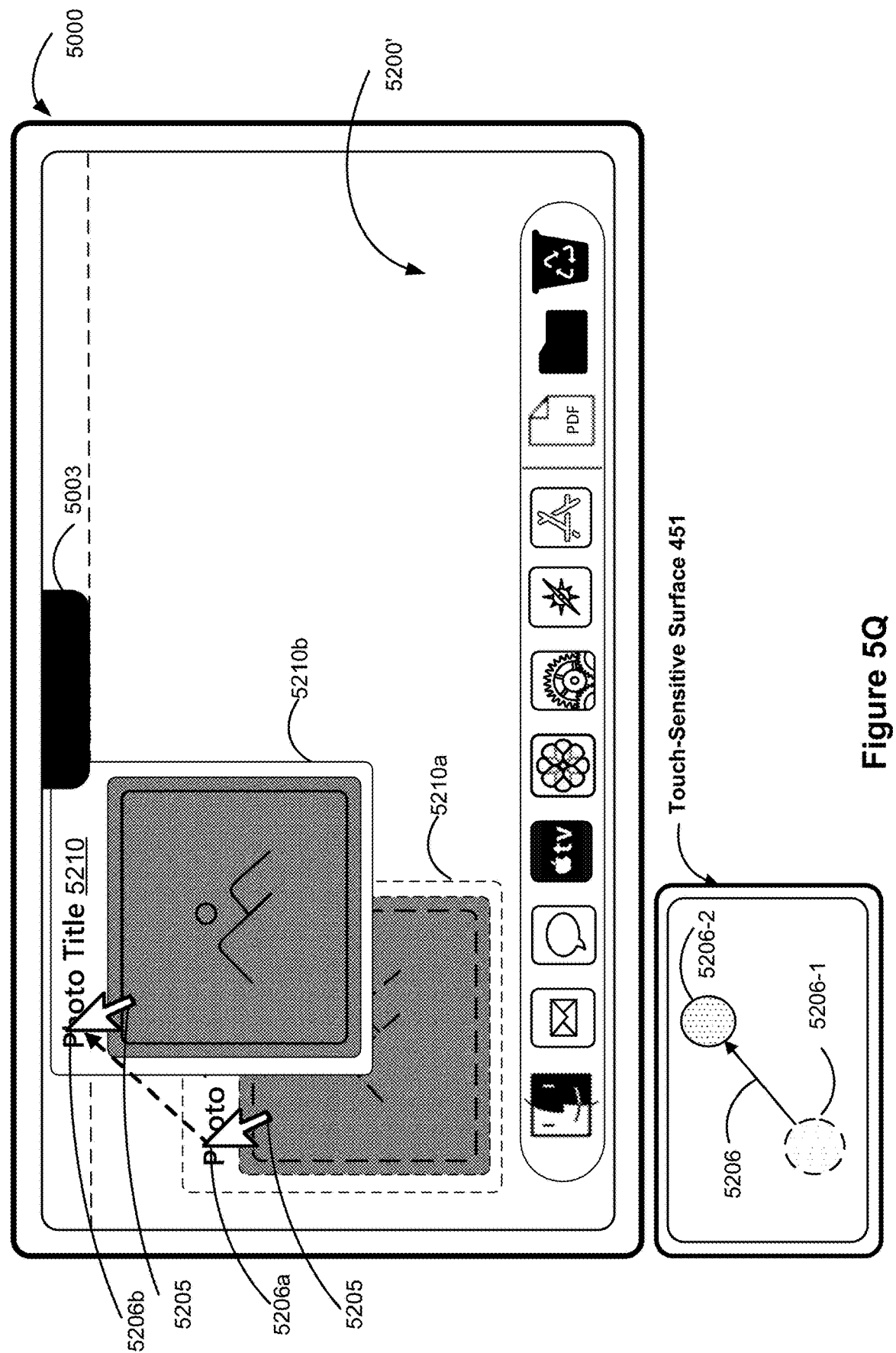
Figure 5R:
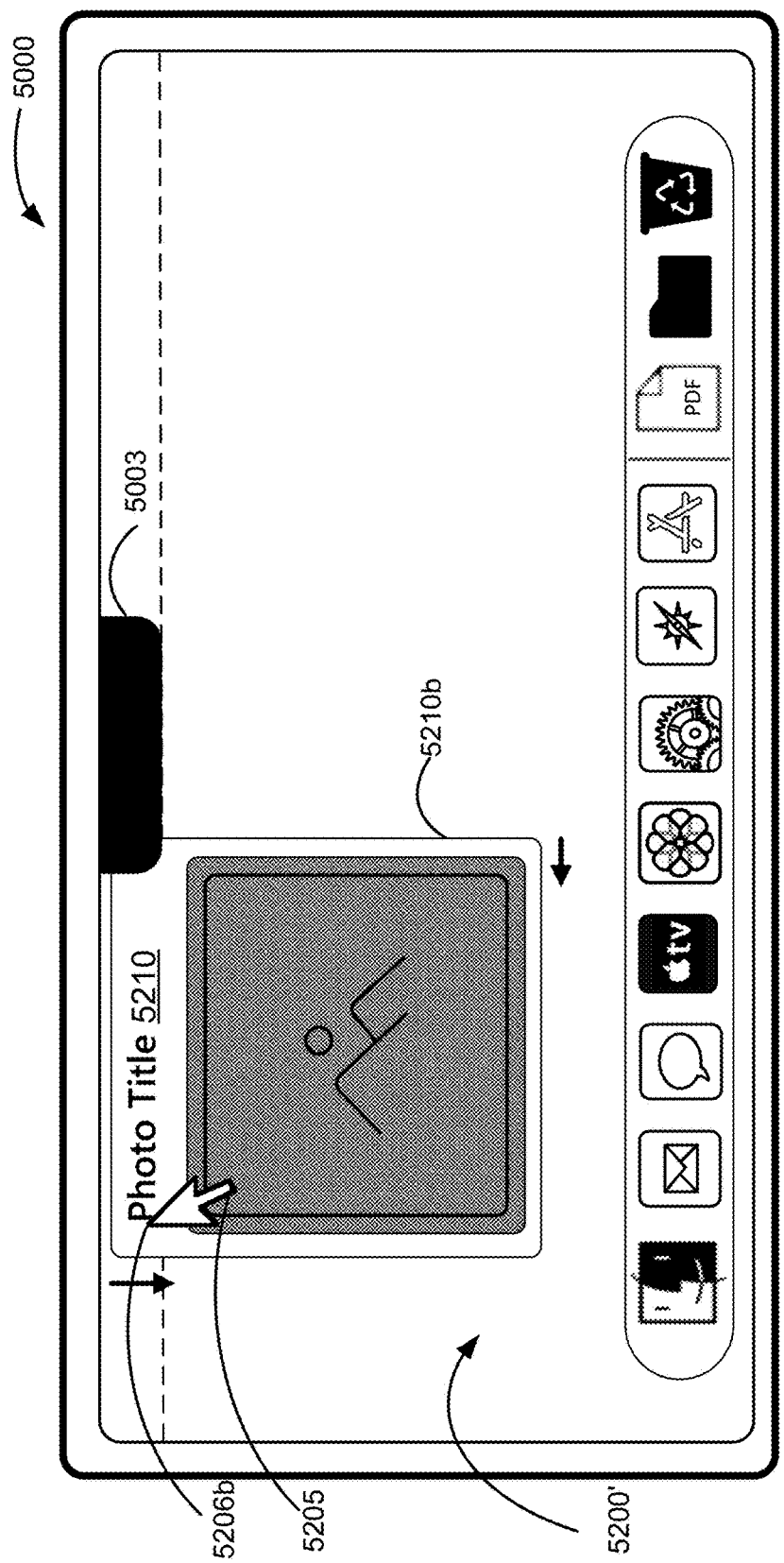
Figure 5R:
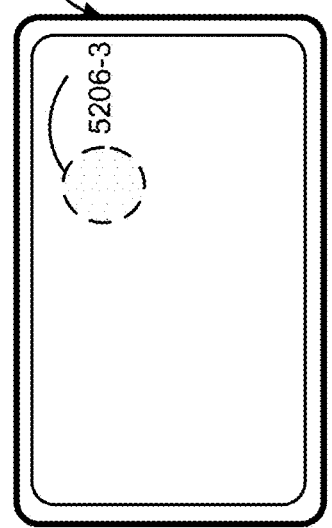
Figure 5S:
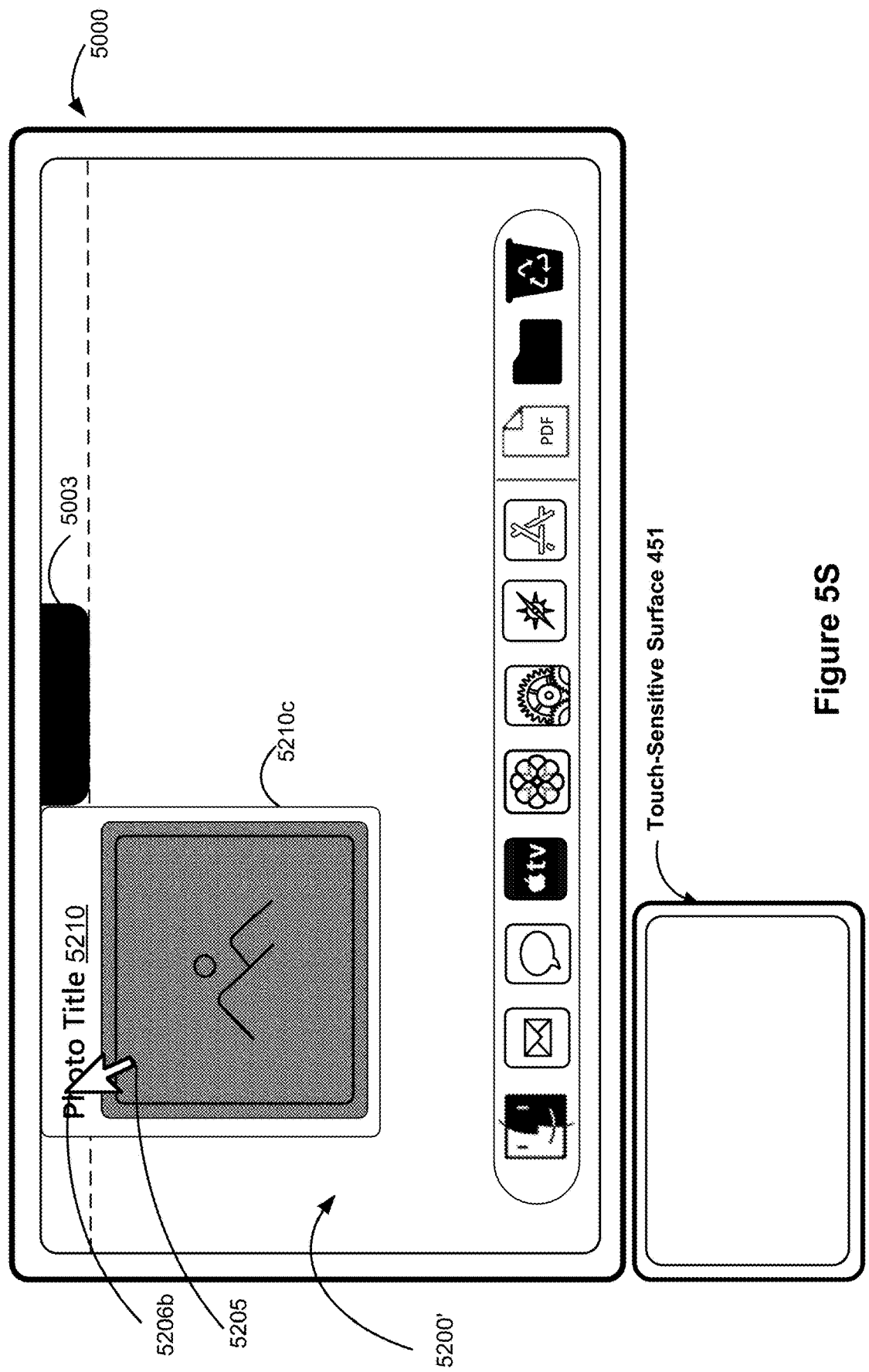

In some embodiments, an application window may be automatically shifted to the left or right side of the notch, e.g., horizontally or laterally as opposed vertically, in accordance with a determination that user input requests to place or move the window over the notch region, e.g., in a position where the window at least partially overlaps the notch region (e.g., FIGS. 5Q-5S illustrated a photo 5210 is moved into one of the shoulders around notch 5003 since photo 5210 is smaller than application 5202 and fits in one of the shoulders). In some embodiments, whether a window is shifted vertically or horizontally may depend on what other windows are present on the display and/or the size of the window that is being moved or dragged over the notch region. Thus, in some embodiments, the computer system automatically moves one window vertically and another window horizontally on the same user interface, e.g., based on the space that remains on the screen and/or the size of the windows, and the area that is not occupied by the notch region. In some embodiments, the window may be displayed on top of the menu bar 5020m, e.g., the window content may be displayed, and the window may be displayed overlaying the menu bar 5020m (e.g., on a display with or without a notch region). In other words, an application window may be displayed overlaying a menu bar that does not have a notch obstructing content of the window, in some embodiments.

FIG. 5Q shows a user input moving (e.g., dragging) a photo 5210 (e.g., a window of a photos application such as the one represented by icon 5038 in FIG. 5A) from position 5210a to position 5210b on display 5000, where the photo 5210 overlaps with the notch region 5003. FIG. 5N shows that the device detects a continuous contact 5206 on the touch-sensitive surface 451 from position 5206-1 to position 5206-2, thereby moving photo 5210 from position 5210a (that does not overlap with notch region 5003) to position 5210b, which overlaps with notch region 5003 as illustrated in FIG. 5Q. Contact 5206-2 on touch-sensitive surface 451 illustrates an end of the movement (e.g., an end of the drag operation). Further, contact 5206-2 corresponds to position 5206b of the focus selector 5205 on display 5000. Contact 5206-1 on the touch-sensitive surface 451 corresponds to a location 5206a on display 5000 where a focus selector 5205 is directed to or is located, e.g., the focus selector 5205 is directed to a portion of photo window 5210 that represents the title of the photo 5210. In some embodiments, contact 5206-1 selects photo 5210 (e.g., a long or deep press) and moves it (e.g., drags it) to a location 5210b on display 5000 that overlaps with notch region 5003 as illustrated by movement of the continuous contact 5206 from position 5206-1 to position 5206-2 on the touch-sensitive display 451, and a movement of the focus selector 5205 illustrated by a dashed line from position 5206a to 5206b, and movement of the photo 5210 from position 5210a to position 5210b, in accordance with some embodiments.

In some embodiments, FIG. 5Q illustrates that while an input 5206 moving the photo 5210 from position 5210a to position 5210b is being detected (e.g., before detecting the end of the input such as liftoff 5208 illustrated in FIG. 5O), the computer system displays on display 5000 only the portions of the photo 5210 that do not overlap with notch 5003. For example, a portion of the content of the photo 5210 at position 5210b where the photo 5210 overlaps with the notch region 5003, e.g., a top edge of photo 5210 is partially obstructed or hidden. For example, since there are no pixels to display the window content, that part of the photo where the notch region 5003 is located is shown black, thereby forming a cutout of irregular shape in the photo 5210.

When the photo 5210 is dragged over the notch region 5003 (e.g., a non-display region that cannot display content) at position 5210b where the photo 5210 overlaps with the notch region 5003, the notch region 5003 obstructs/hides portions of photo 5210 that would otherwise be displayed when the photo is in a position such as position 5210a where the notch region 5003 does not obstruct display of the photo 5210. In some embodiments, hiding portions of photo 5210 when the photo 5210 overlaps with the notch region 5003 (including while the photo 5210 is being dragged through the notch region 5003 in response to input 5206) provides visual feedback that the photo 5210 is moved in response to input 5206, and at the same time, provides visual feedback that the photo 5210 is being moved through a region that is not capable of displaying content.

As illustrated in FIG. 5R, the device detects a liftoff 5206-3 of contact 5206 from the touch-sensitive surface 451, which represents the end of contact 5206, according to some embodiments. In some embodiments, liftoff 5206-3 is detected when focus selector is at location 5206b on display 5000. The device detects liftoff 5206-3 when the photo 5210 is at position 5210b on display 5000, where the photo 5210 partially overlaps notch region 5003, which is not capable of display the photo 5210. In accordance with a determination that a portion of the photo 5210 overlaps with the notch region 5003, the computer system automatically moves (e.g., without additional user input) the photo 5210 from the position 5210b that overlaps with the notch region to a different position where the photo 5210 does not overlap with notch region 5003, e.g., position 5210c as illustrated in FIG. 5S.

For example, FIG. 5S shows that the application window is automatically pushed down from position 5210b (shown in FIG. 5R) to position 5210c, which is on the left side of notch region 5003 (e.g., window 5202a is moved horizontally), where photo 5210 does not overlap with the notch region 5003. No contacts are shown on touch-sensitive surface 451 as all fingers have been lifted off from the touch-sensitive surface 451 as explained above. Display of focus selector 5205 is maintained at location 5206b (e.g., the location of the focus selector 5205 at the time liftoff 5204-3 was detected) as typically a cursor remains displayed on the display even if there is no input (e.g., to show what is the location of the focus selector). Upon liftoff 5206-3, the computer system automatically moves or shifts the application window from 5210b to position 5210c such that all of the content in the photo 5210 is displayed and the photo 5210 does not overlap with the notch region 5003. In some embodiments, in accordance with the determination that a portion of the photo 5210 at position at 5210b overlaps with the notch region 5003 (when the computer system detect liftoff 5206-3), the computer system automatically moves (e.g., without additional user input) the photo 5210 horizontally or laterally from the position 5210b that overlaps with notch region 5003 to a different position such that the photo 5210 is on the left side of the notch region 5003 region and a side edge of the photo 5210 is adjacent to a side edge of the notch region 5003. In some embodiments, Photo 5210 is also adjacent to and aligned with the top edge of display 5000. For example, photo 5210 is moved adjacent to the notch region 5003, e.g., photo 5210 side touches the left side of the notch region 5003 at position 5210c. FIG. 5P shows that photo 5210 is automatically aligned and adjacent to both notch region 5003 and the top edge of display 5000, where photo 5210 does not overlap the notch region 5003. In other words, FIG. 5P shows that the photo 5210 is automatically snapped to the side of the notch region 5003 at position 5210c. In some embodiments, the size of photo 5210 is such that the top part of the photo 5210 fits in the left shoulder region or on the left side of the notch 5003. In such cases, photo 5210 may be displayed on the side of the notch region 5003 as opposed to below the notch region 5003 as illustrated in FIG. 5P, where window 5202c is larger and does not fit in the shoulder regions. When a window is snapped on the side of the notch, the window may overlay the menu bar 5020m. For example, in some embodiments, content of the photo 5210 is visible but content of the menu bar is hidden below photo 5210. In some embodiments, the photo 5210 may be shifted on the right side of notch region 5003. In some embodiments, whether to shift a window to the left side or the right side of the notch region is determined based on what portion of the window is being overlapped with the notch region and the direction in which the window is being moved and dragged. For example, in which direction to automatically move, shift, or snap a window may be determined based on the particular edge of the window that first crosses the notch region and the side or sides of the notch that are first crossed by the window when the user drags it over the notch. For example, if the window first crosses the bottom edge of the notch region, the window may be pushed down the notch region (e.g., the window may be snapped below the notch region as illustrated in FIG. 5P). In other embodiments, if the window first crosses left side of the notch region and if there is sufficient space to fit the window in the left shoulder region, the window may be pushed to the left side of the notch region. In other embodiments, if the window first crosses left side of the notch region and isn't sufficient space to fit the window in the left shoulder region, the window may be pushed to down of the notch region (centered or aligned with the right left side of the notch region 5003). In other embodiments, if the window first crosses the right edge of the notch region when the window is being dragged over the notch region and there is sufficient space to fit the window in the right shoulder region, then the window may be pushed to right side of the notch region, or below the notch region if there isn't sufficient space.

Figure 5T:
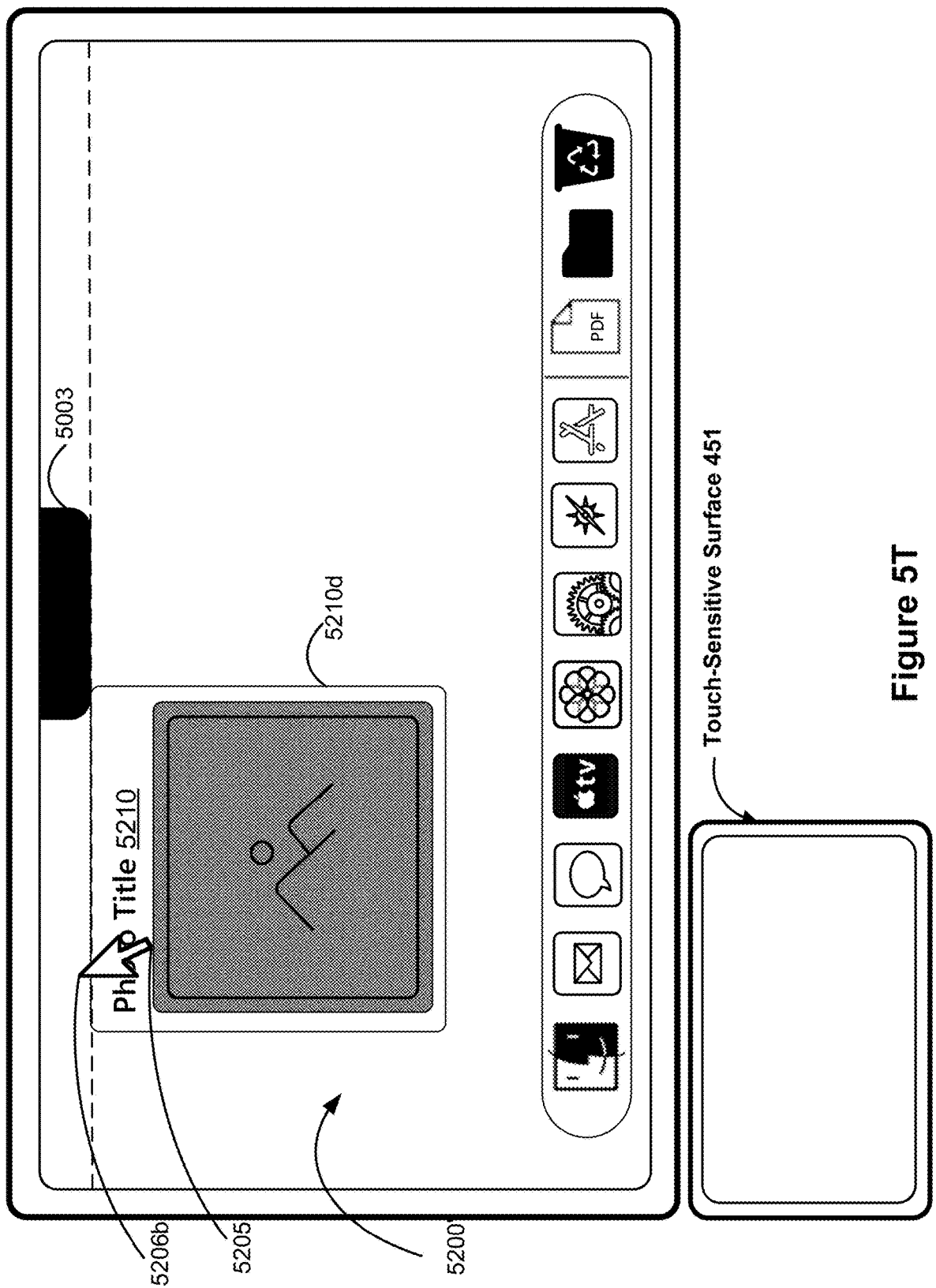
Figure 5U:
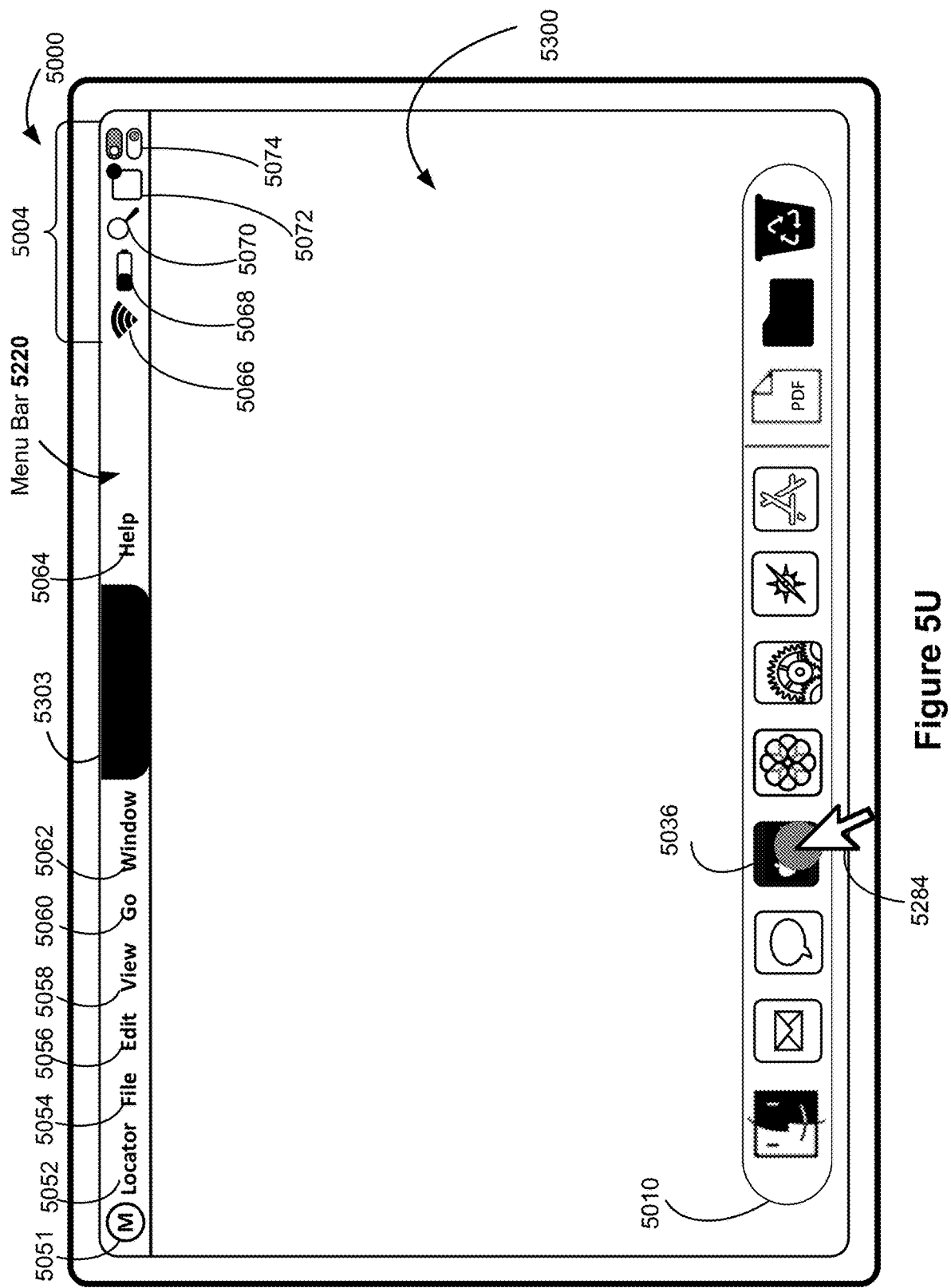

FIG. 5T shows photo 5210 pushed below the notch region 5003 from position 5210*b* to position 5210*d* (as opposed to the left side or right side of the notch region 5003), where photo 5210 does not overlap with the notch region 5003, without also positioning photo 5210 in the center below notch region 5003. For example, photo 5210 is aligned with a vertical line of a side of the notch region 5003, however photo 5210 is not aligned vertically with notch region 5003 itself. For example, in some embodiments notch region 5004 is displayed in the center of the top edge of display 5000, whereas photo 5210 is displayed right below the notch region but to left side of the notch region, as opposed to centered. No contacts are shown on touch-sensitive surface 451 as all fingers have been lifted off from the touch-sensitive surface 451 as explained above. Display of focus selector 5205 is maintained at location 5206*b* (e.g., the location of the focus selector 5205 at the time liftoff 5206-3 was detected) as the cursor remains displayed on the display 5000 even if there is no input (e.g., to show what is the location of the focus selector).

Automatically changing the position of application window 5020*a* or photo 5210 so as to avoid any obstructions by the notch region 5003, provides for more efficient mechanism for managing application windows that are placed or moved (e.g., dragged from one position to another) on the notch region of display 5000 where content cannot be displayed.

FIGS. 5U-5AD illustrate examples user interfaces entering a full-screen mode on a display 5000 with a notch 5003, in accordance with some embodiments.

FIG. 5U illustrates user interface 5300 displayed on display 5000 with a notch region 530, where menu bar 5220 runs through the notch region 53030 and is partially obstructed by the notch region 5303. Use interface 5300 includes the menu bar 5220 that displays menus 5052-5064 for the Locator application on the left side of display 5000, and also displays system menu items 5066-5-74 (Wi-Fi indicator 5066, battery indicator 5068, search icon 5070, Notification Center icon 5072, and Control Center icon 5074) on the right side of display 5000 in region 5004. As illustrated, notch region 5303 divides the menu bar 5220, for example, in two equal parts, where application menu item 5062 is separated from application menu 5064 by the notch region 5303.

Figure 5V:
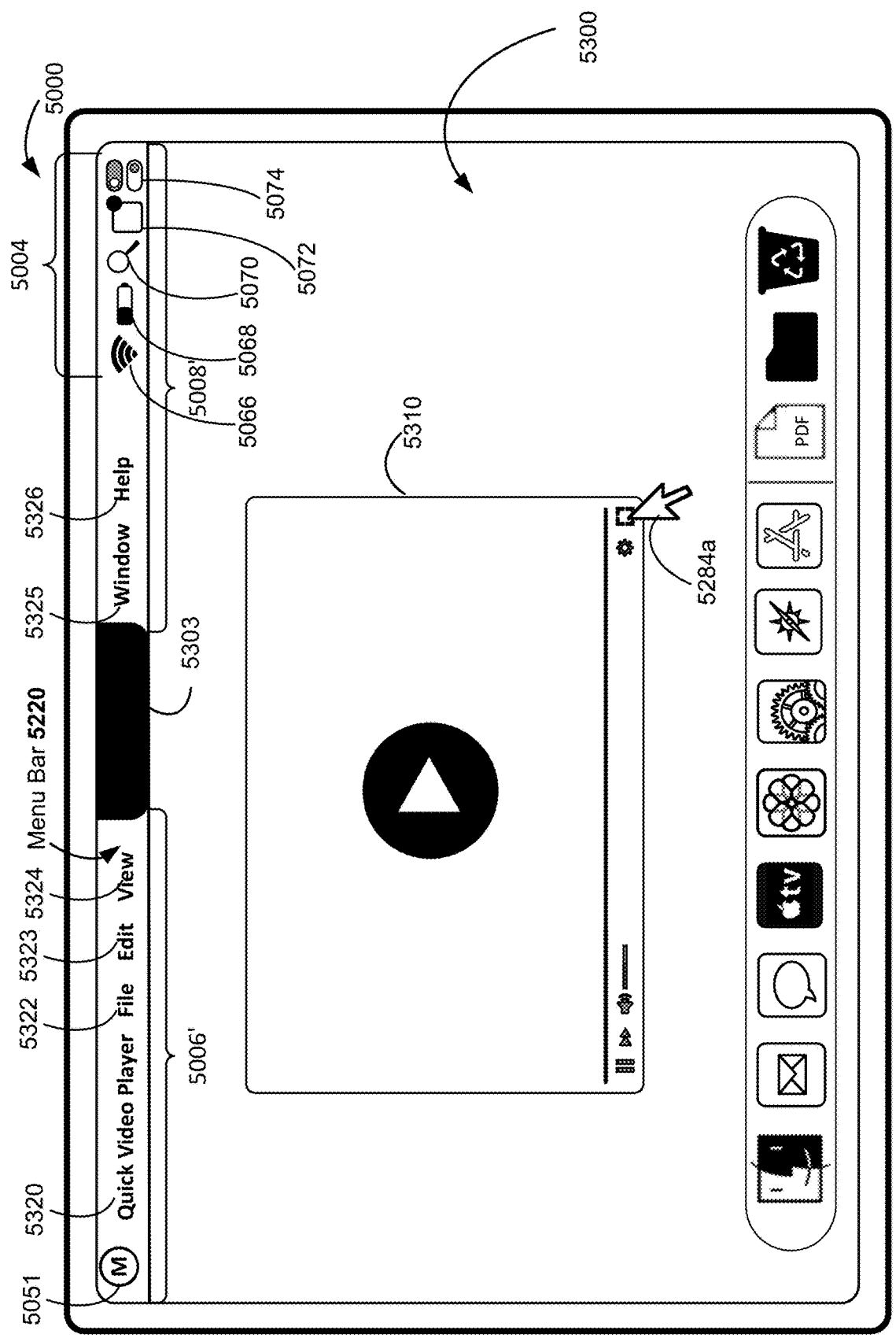

FIG. 5U further shows an input 5284 selecting icon 5036 representing a TV application from dock 5010 in user interface 5300. For example, in FIG. 5U, a user clicks on icon 5036 and a window for the TV application is opened (e.g., the TV is launched). For example, in response to the user input 5284, a window 5310 of the TV application is displayed in user interface 5300, and application menu items 5320-5326 for a TV application, such as a video player application for online streaming or offline viewing are displayed in the menu bar 5220, as illustrated in FIG. 5V, according to some embodiments. Display of the Wi-Fi indicator 5066, battery indicator 5068, search icon 5070, Notification Center icon 5072, and Control Center icon 5074 is maintained in region 5004 as there is sufficient space to distribute the TV application menu icons over into the left shoulder 5006' and the right shoulder 5008', according to some embodiments. As illustrated in FIG. 5V, menu item 5324 is separated from menu item 5325 by notch region 5303.

Figure 5W:
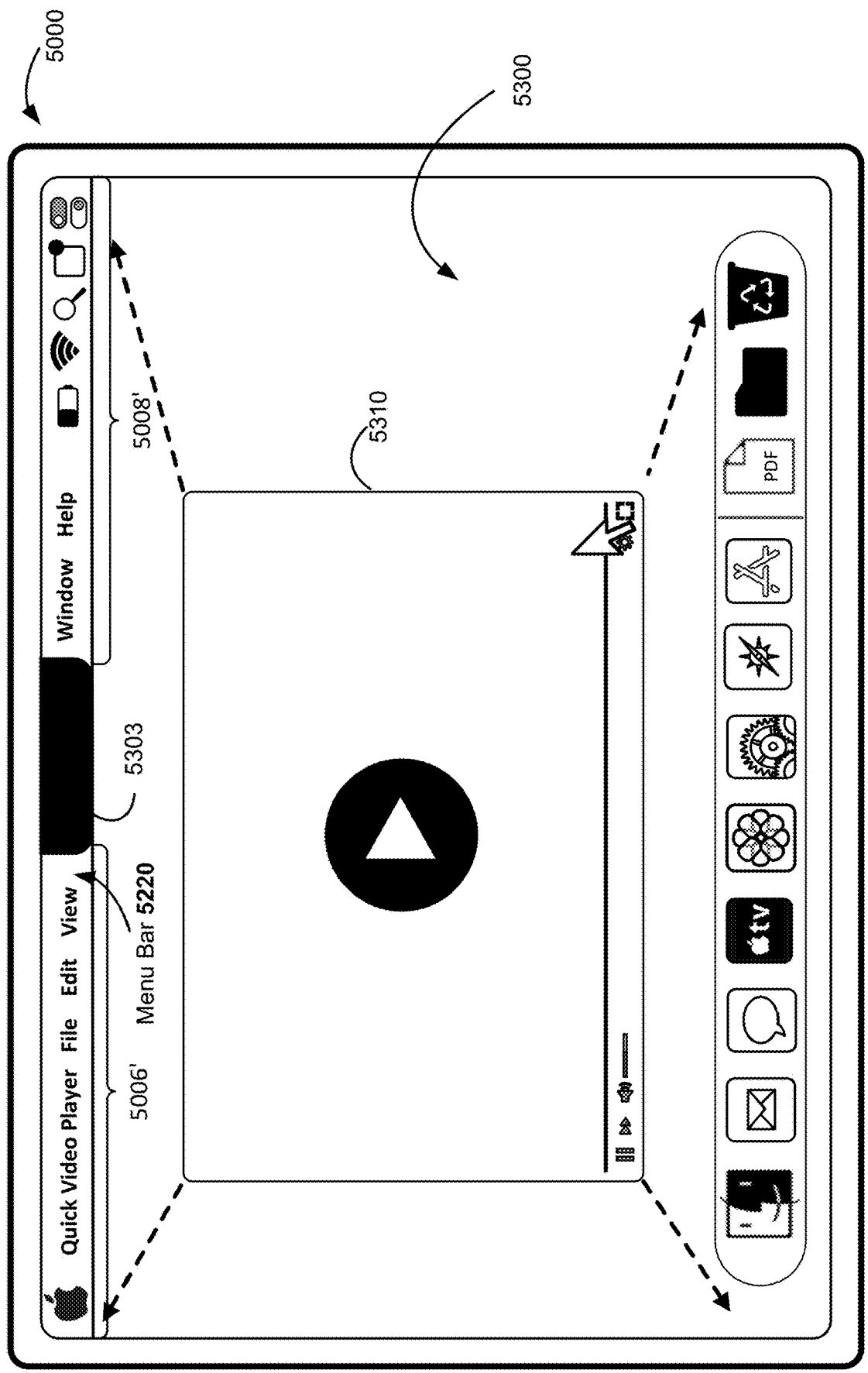
Figure 5X:
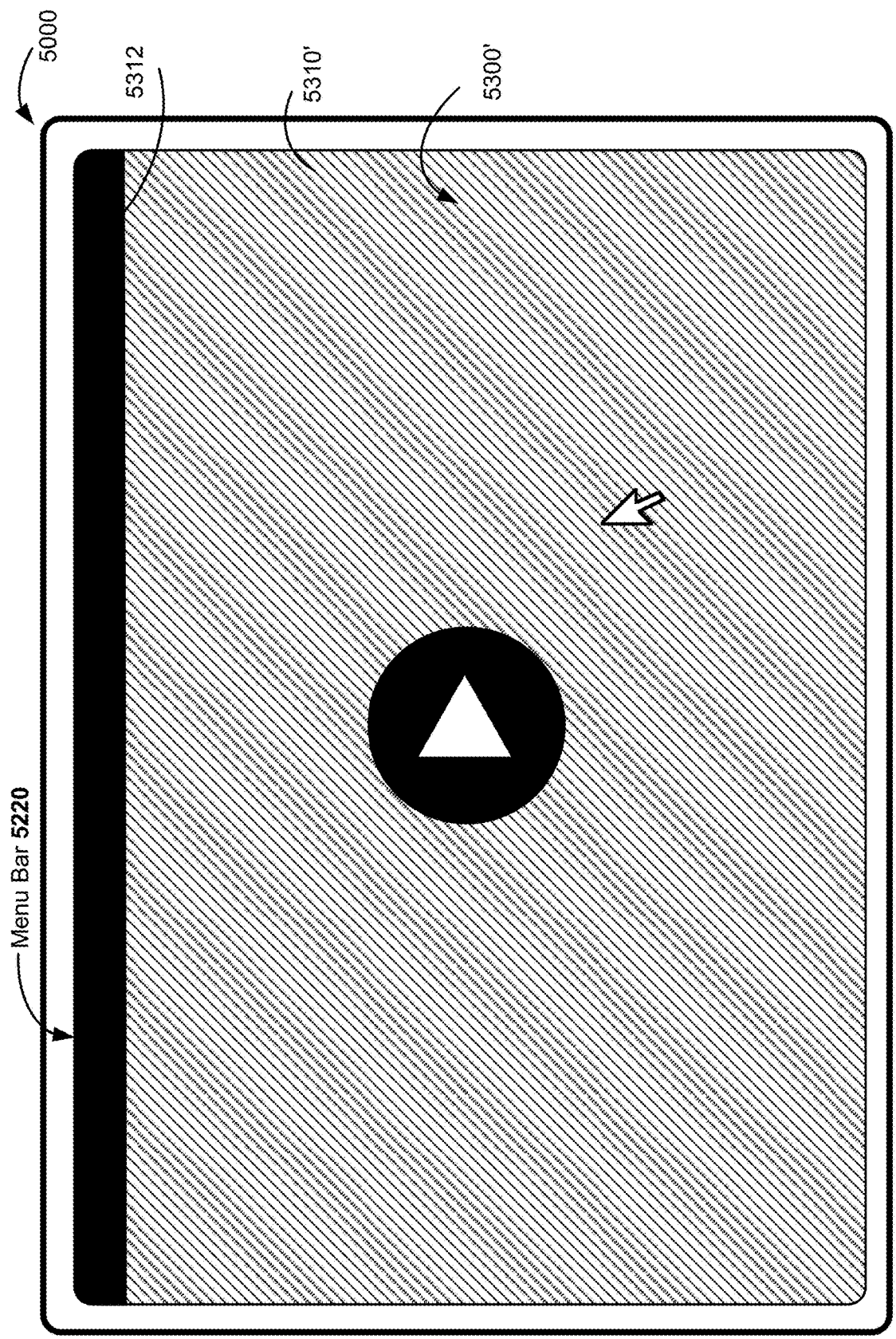
Figure 5Y:
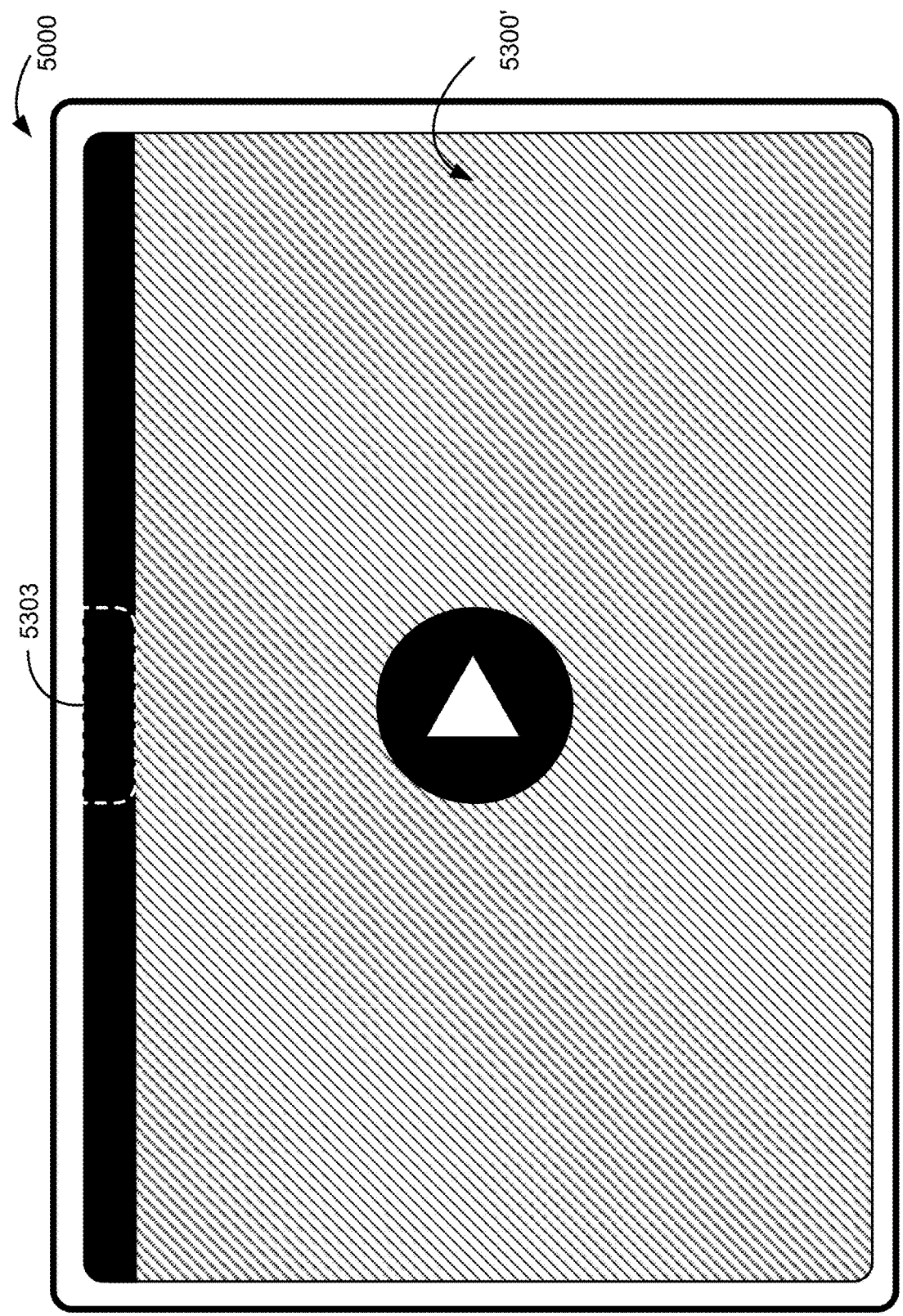

Further, FIG. 5V shows an input 5284*a* selecting an icon on window 5310 representing a command to enter into a full-screen mode, e.g., for window 5310 to occupy the whole display 5000. In response to input 5284*a*, the computer system ceases to display menu bar 5220 and window 5310 of the video player application enters full-screen mode as illustrated in FIGS. 5W-5Y. Window 5310' in full-screen does not overlap with notch region 5303 (outlined in FIG. 5Y in a white dash line) as illustrated in FIGS. 5X-5Y.

For example, in FIG. 5X, window 5310' that is displayed in user interface 5300' is window 5310 expanded in full-screen mode in response to user input 5284*a*. In expanded form, window 5310' is displayed in a rectangular form right below the notch region and is further aligned with the menu bar 5220. The menu bar 5220 is masked in black, and a top edge 5312 of the expanded window 5310' is adjacent to the bottom edge to the notch region (outlines FIG. 5Y) and the bottom edge of the menu bar 5220 (masked in black). FIG. 5Y shows where the masked notch region 5303 is located with a white dashed line. Thus, as illustrated in FIG. 5Y, the shoulder regions 5006' and 5008' around the notch region 5303 are displayed in color that matches the notch region 5303 so that the notch region 5303 is masked or is otherwise hidden from view. For example, the notch 5030 is masked when the menu bar 5220 is colored in black, which matches the color of the notch 5030 (e.g., thereby making the borders of the notch 53030 undistinguishable).

FIGS. 5X-5Y illustrate that in full-screen mode, window 5310 is expanded and displayed below the notch region 5303 (which is masked in FIG. 5X) and aligned with the notch region 5303, and the left shoulder region 5006' and the right shoulder region 5008' are masked in a color that matches the color of the notch 53030 (e.g., black). Masking left and right shoulders 5006' and 5008' in black, removes clutter from the screen and provides an immersive full-screen mode experience on display 5000 with a notch 5303. For example, FIG. 5Y shows the location of the masked notch 5303 (with a white dashed line).

Figure 5Z:
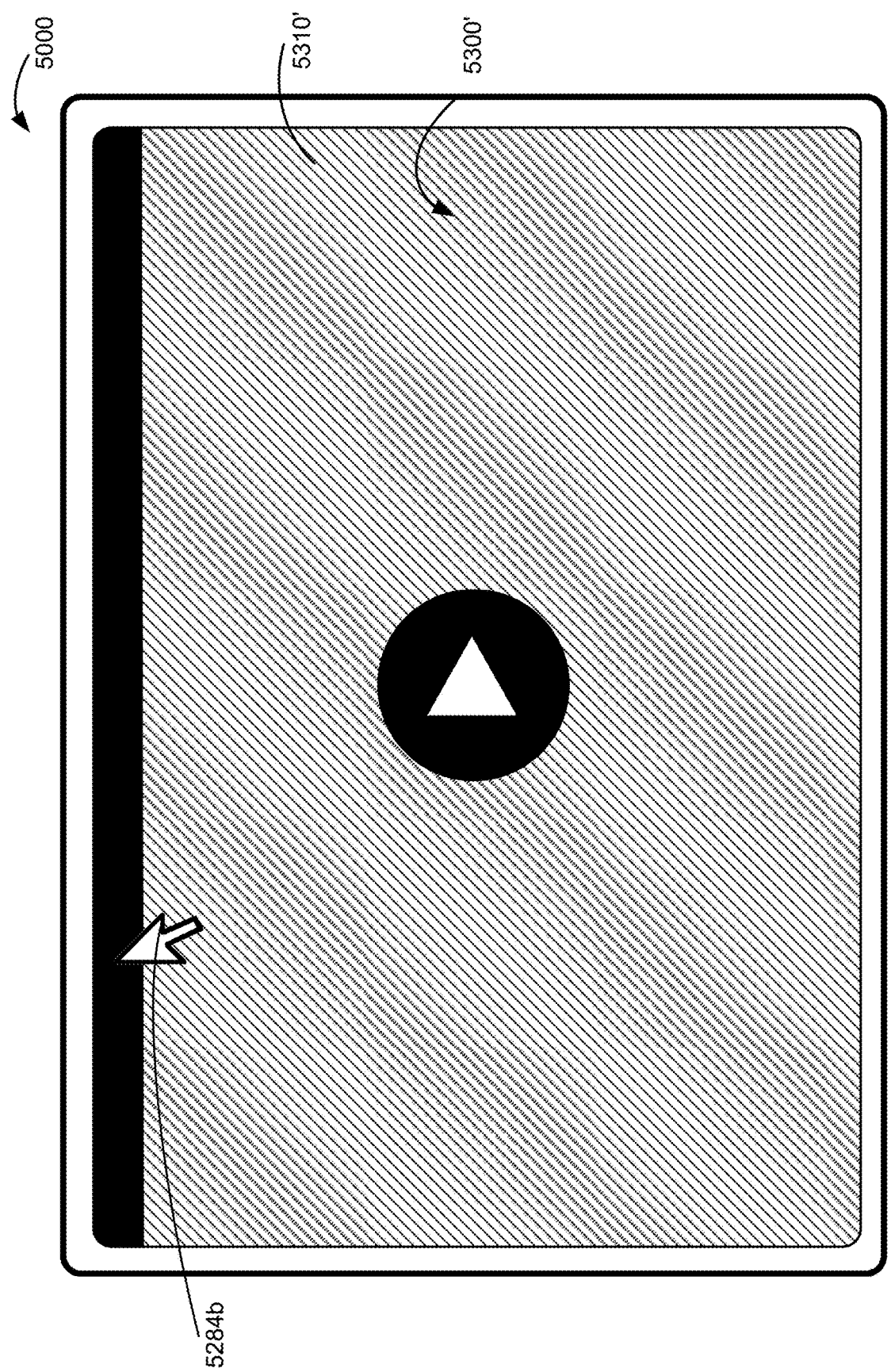
Figure 5A:
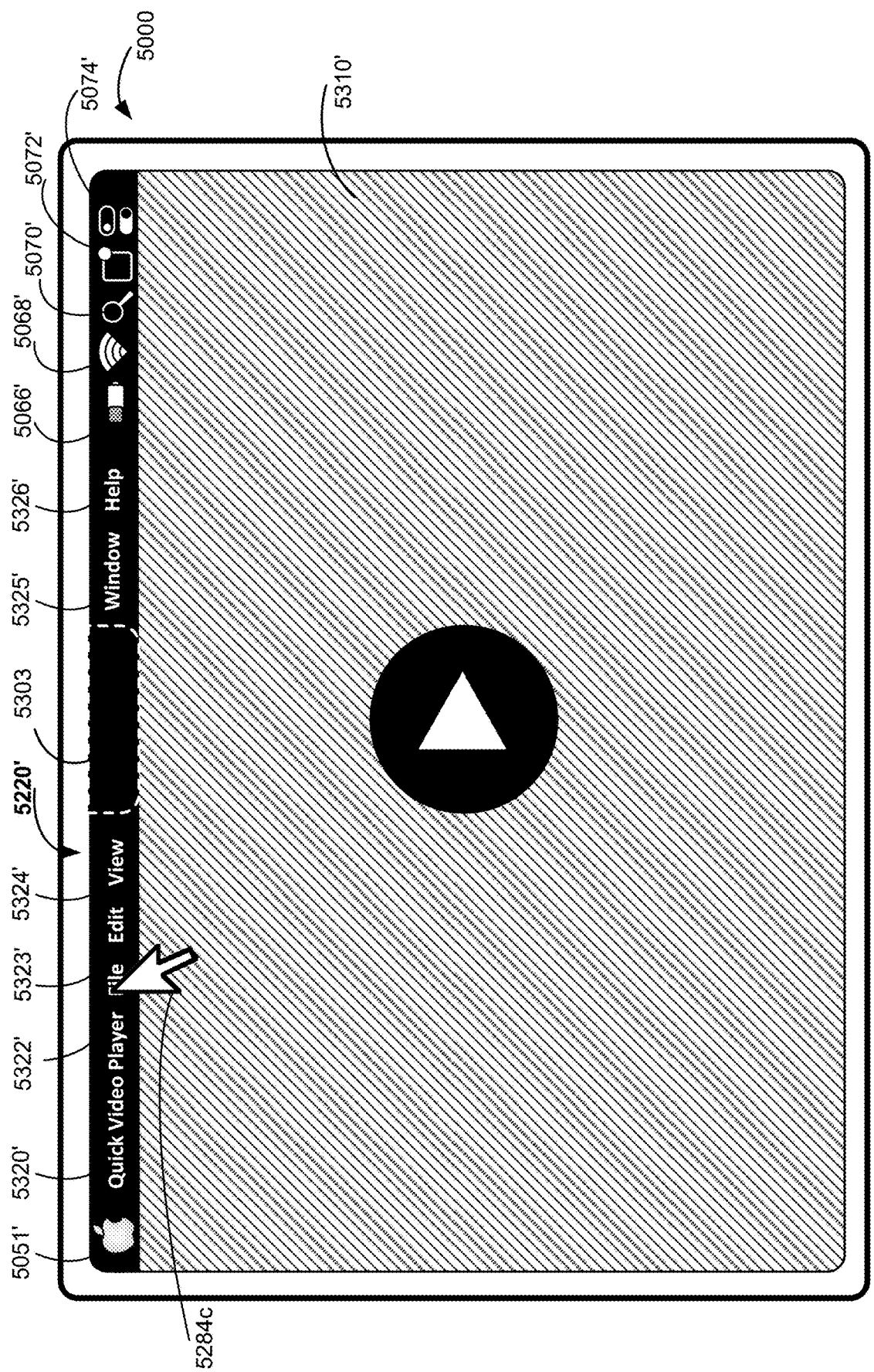
Figure 5A:
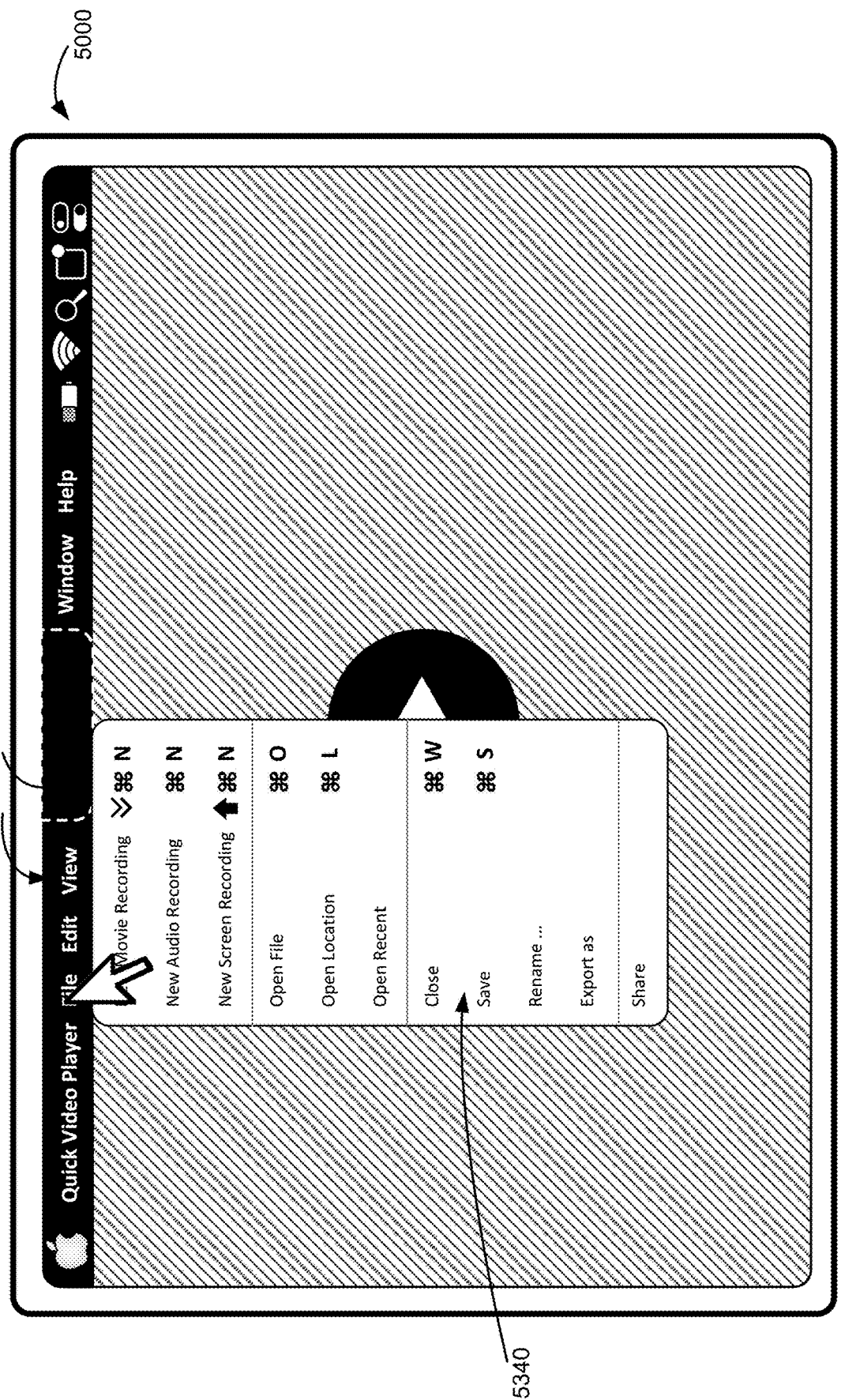
Figure 5A:
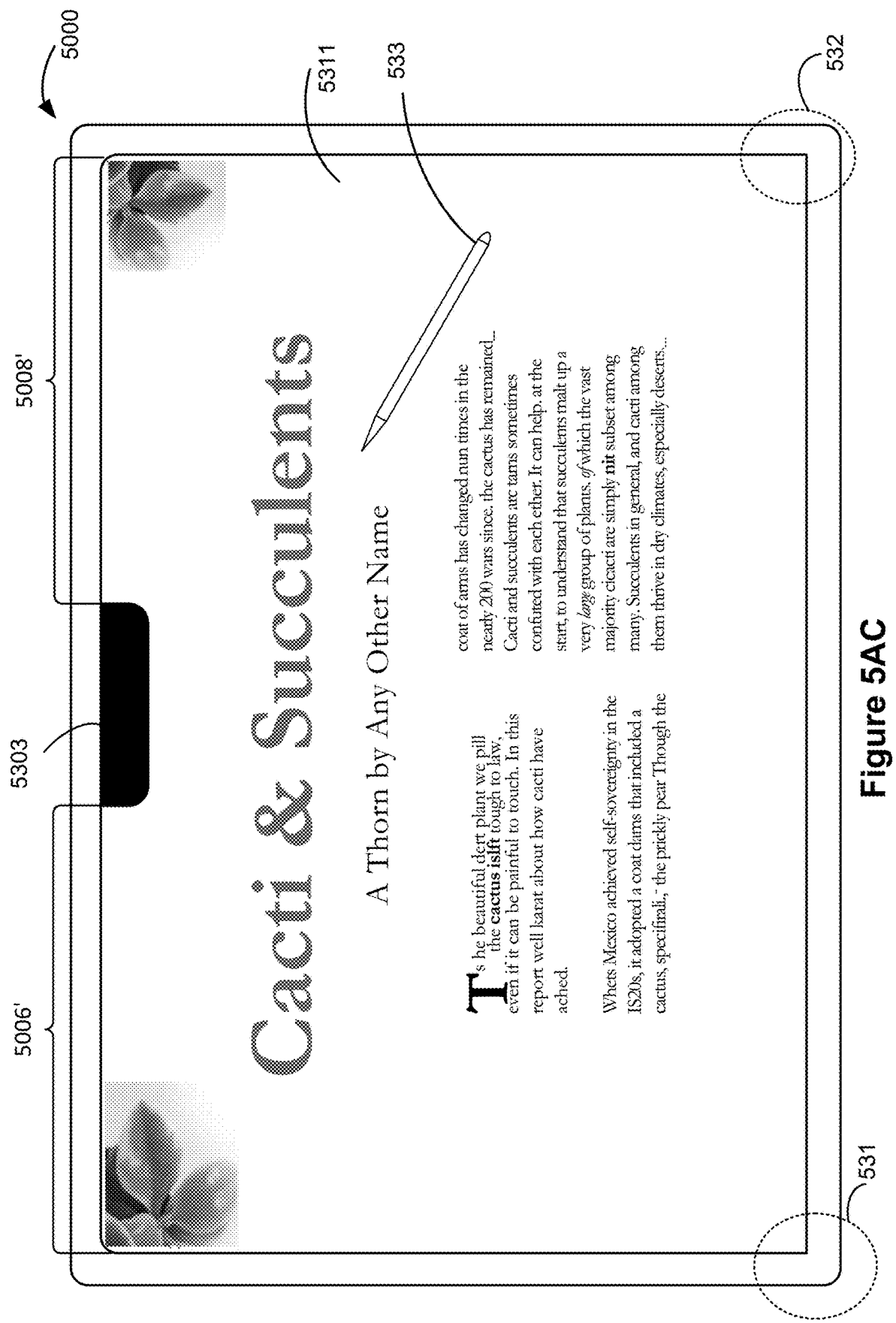
Figure 5A:
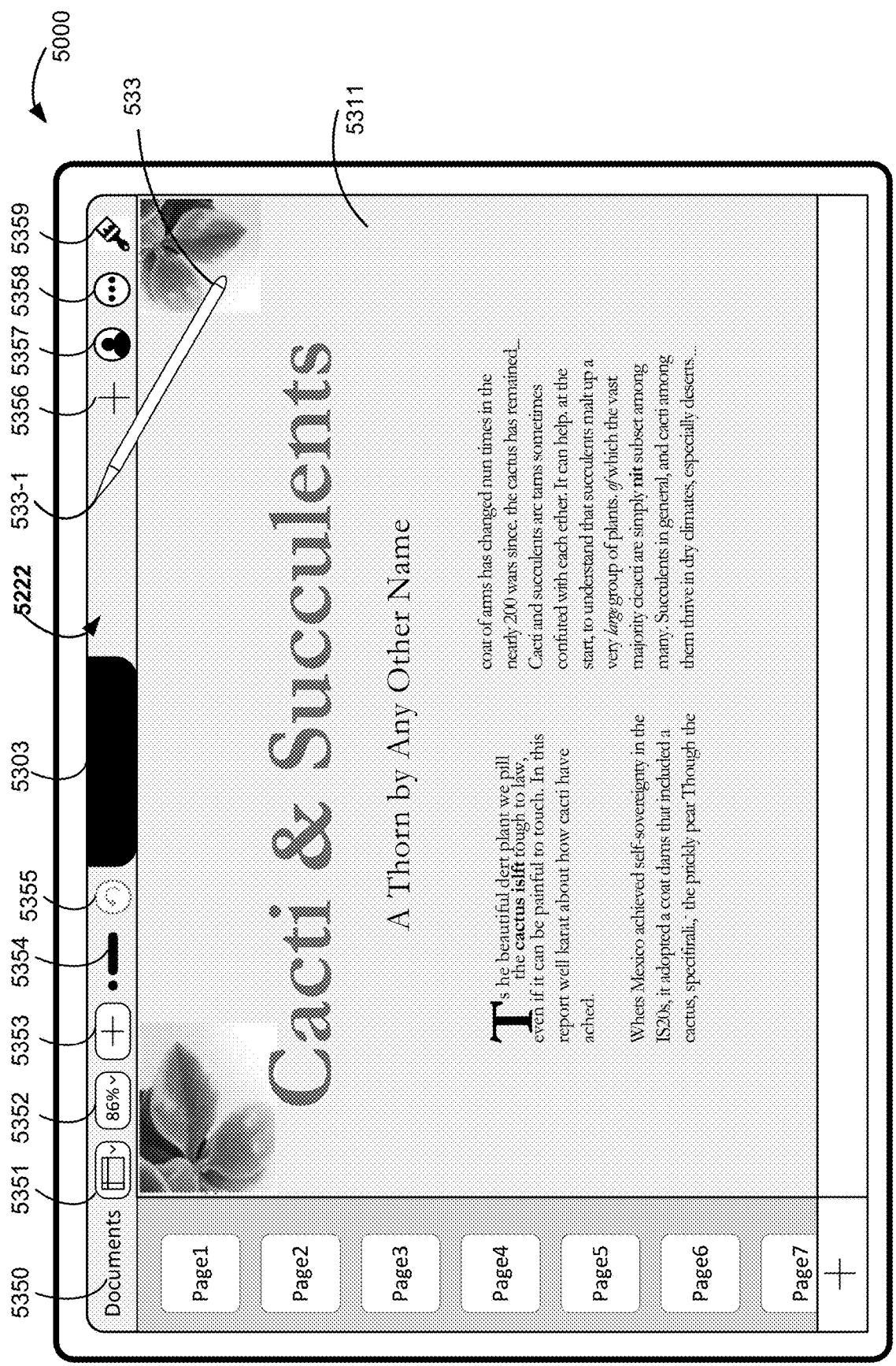
Figure 5A:
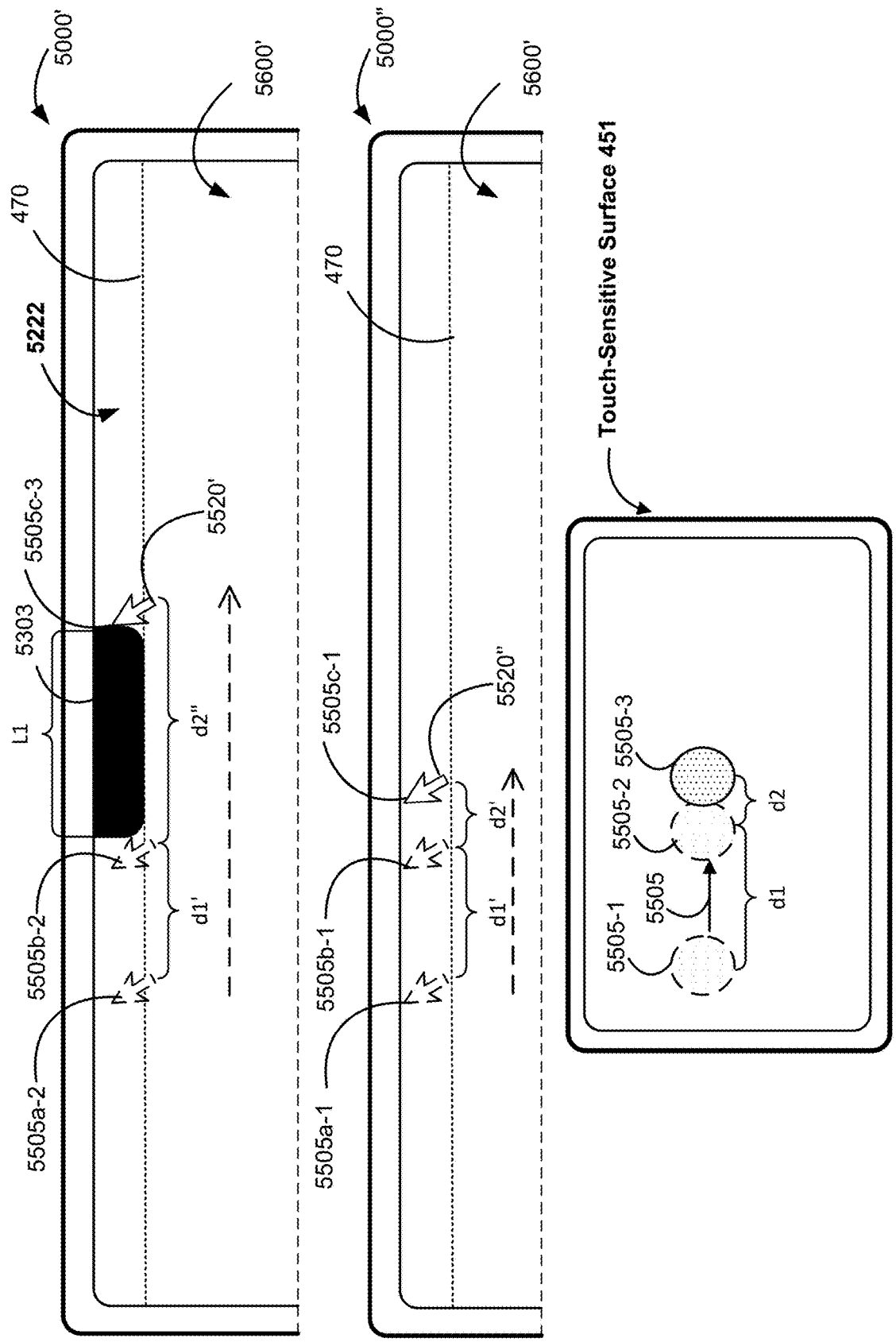
Figure 5A:
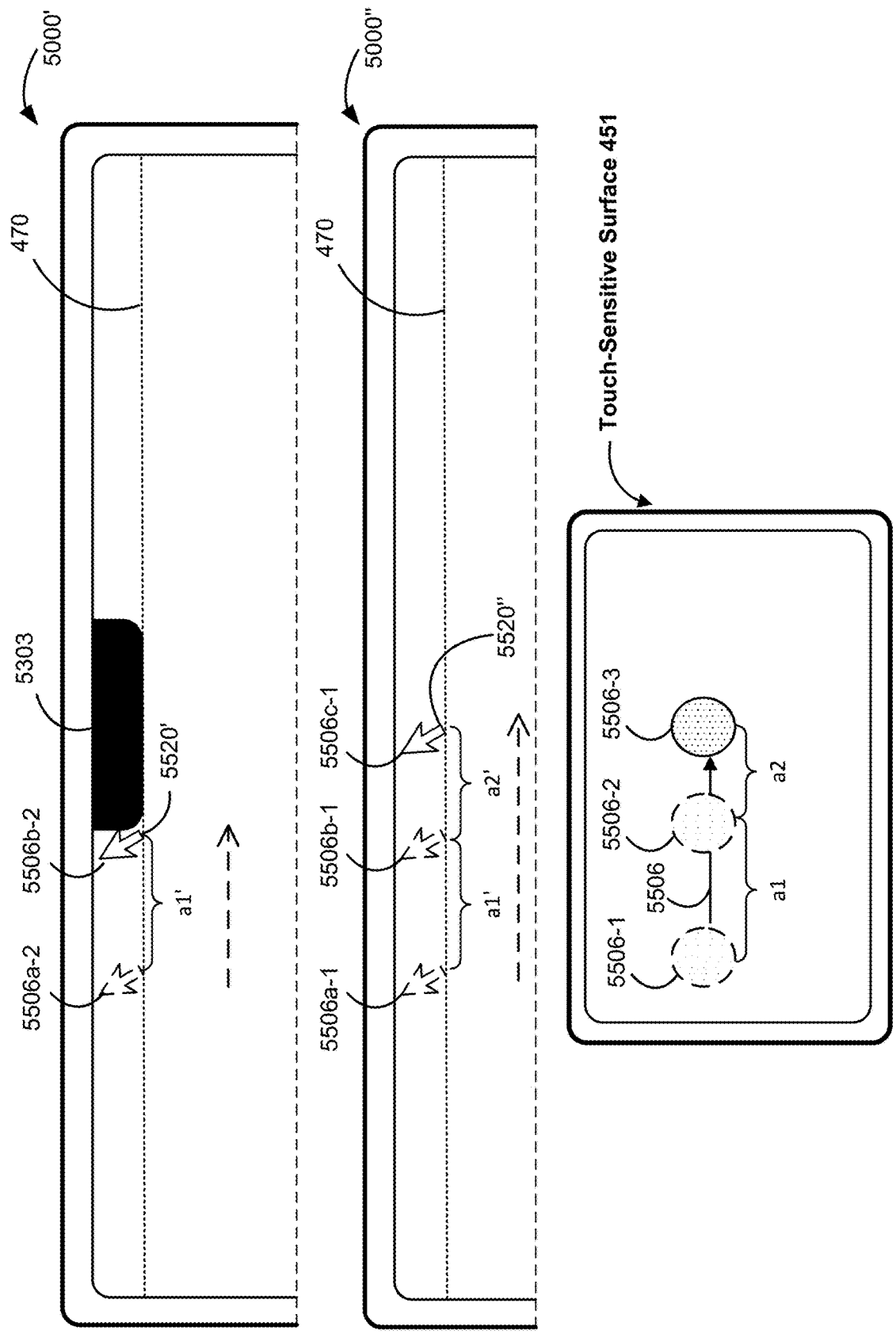
Figure 5A:
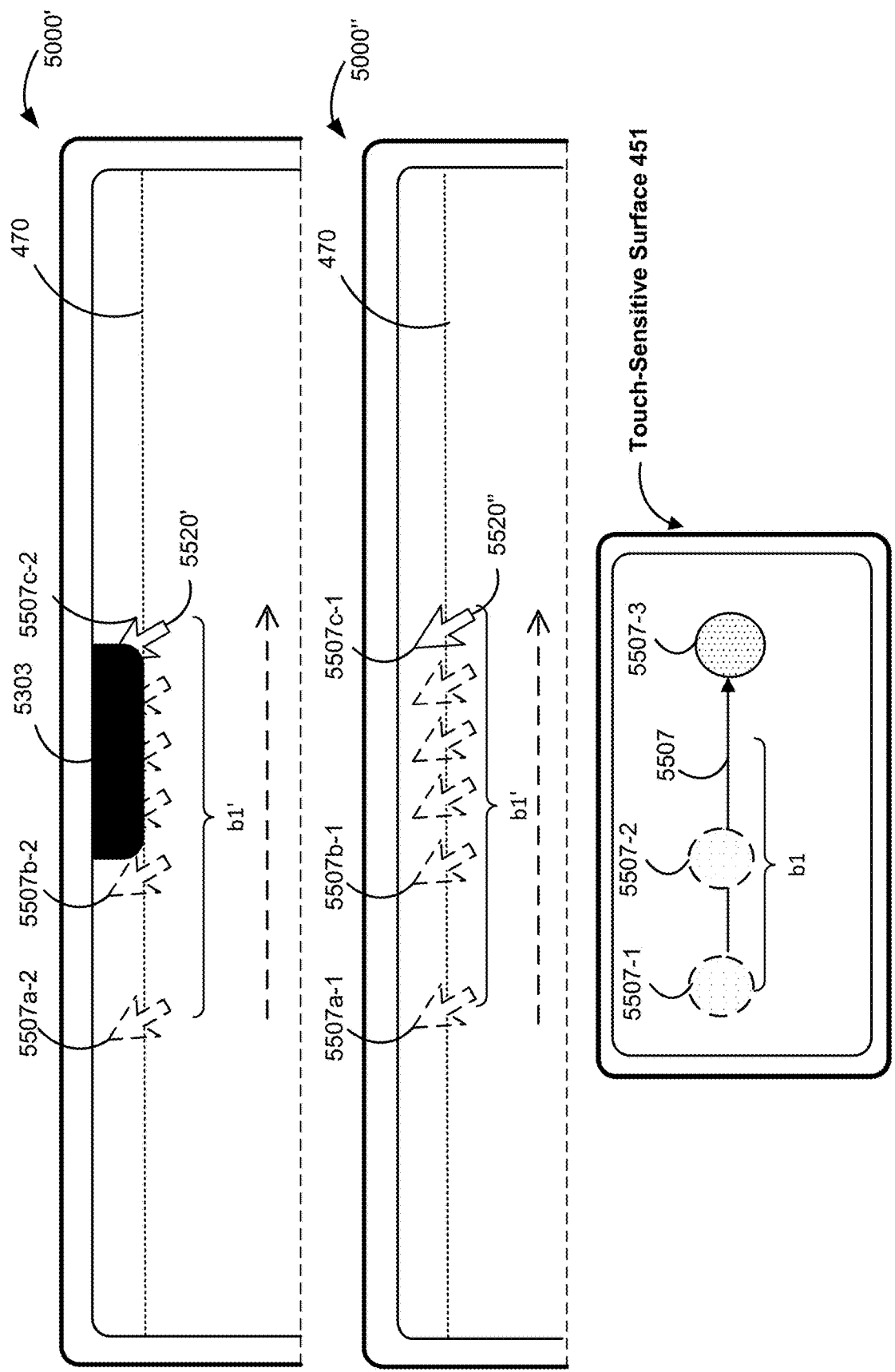
Figure 5A:
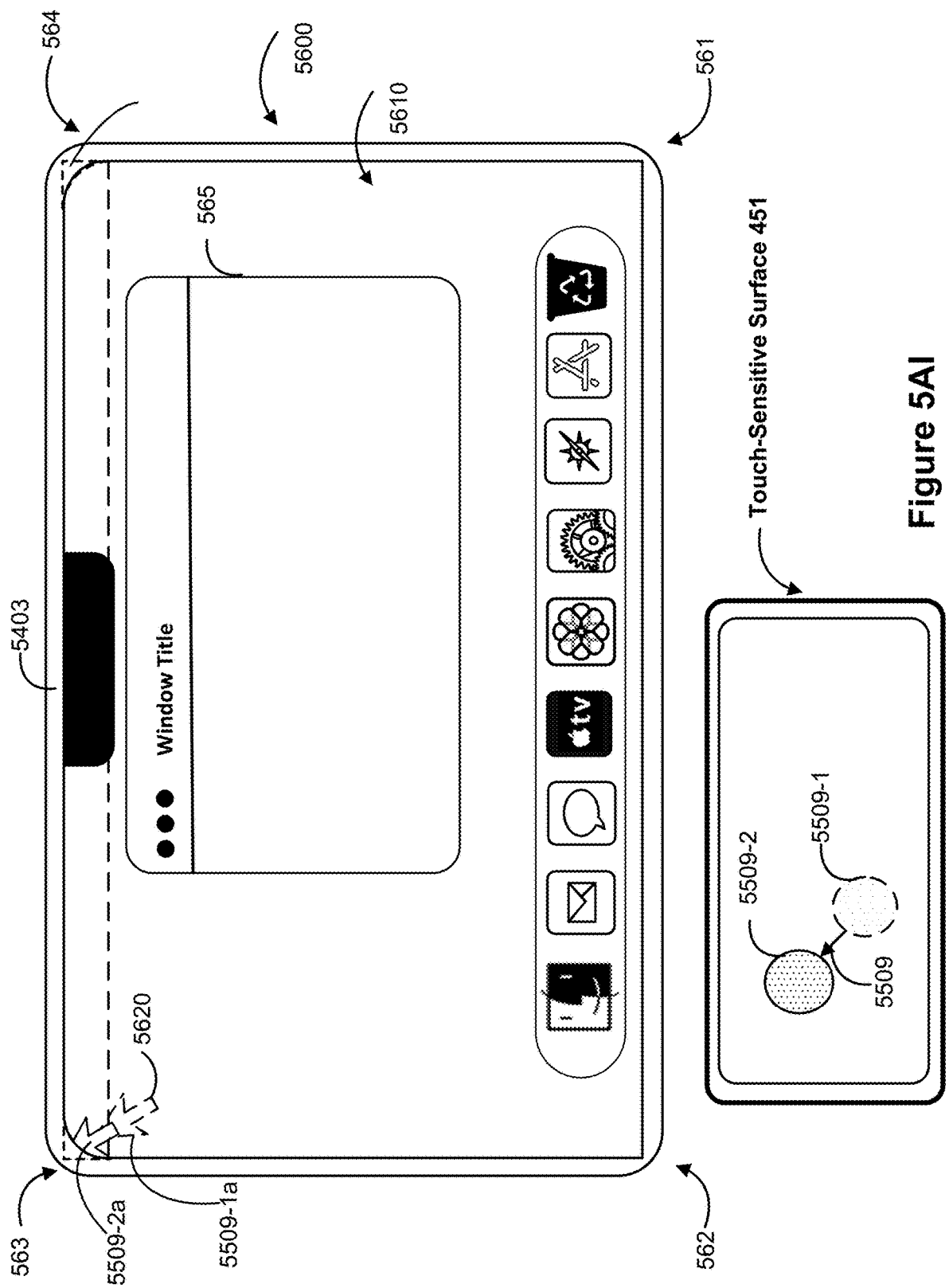
Figure 5A:
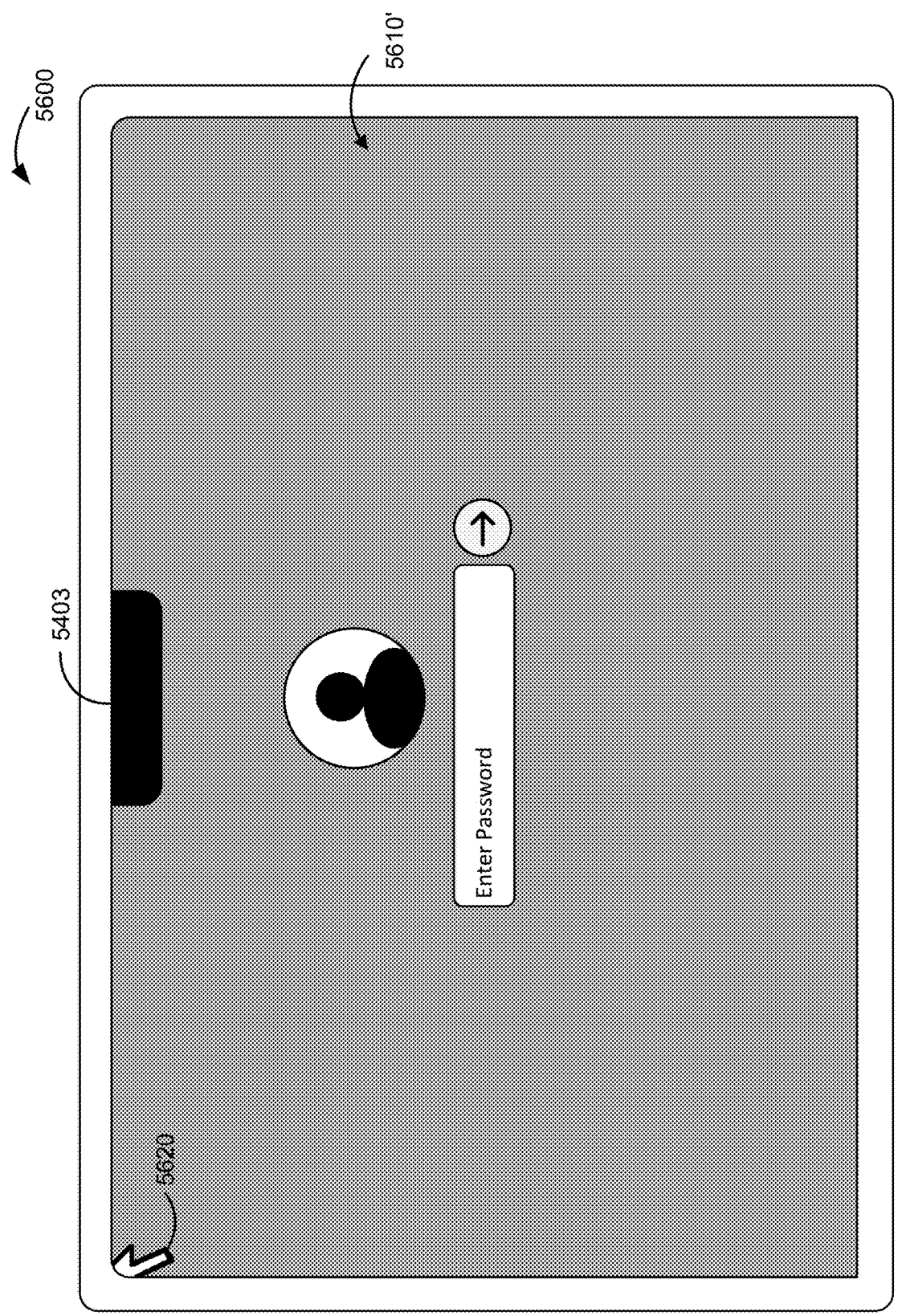

FIG. 5Z shows the computer system detects input 5284*b* where the cursor has been moved over an area of display 5000 that is occupied by the masked shoulder regions 5006' and 5008'. For example, the cursor is shown to be moved over the top edge of the display 5000 that is displayed as a black band, e.g., like a bezel (e.g., where the menu bar 5220 was displayed before it was hidden from display by coloring the left and right shoulder 5006' and 5008' in black, e.g., same as the notch), as illustrated in FIG. 5AA. In other words, when a user moves the cursor to a place on the screen where the menu bar would have been displayed had it not been hidden in full-screen mode, the computer system automatically re-displays the menu bar while at the same time maintaining the immersive full-time experience that is expected and, also, avoiding the notch region that is not capable of display the menu bar items.

For example, FIG. 5AA shows that the menu bar 5220 is re-displayed as menu bar 5220' in response to input 5284*b* that moves the focus selector over left black shoulder 5006' where the menu bar 5220 would have been. Menu bar 5220' is displayed in a color matching the notch 5303 such as black, and the menu bar items 5320'-5326' for the video player application, which is the currently active application, and the system menu items 5066'-5074" are all displayed in a white color or other color contrasting the notch region 5303 and the menu bar 5220' (e.g., Wi-Fi indicator 5066, battery indicator 5068, search icon 5070, Notification Center icon 5072, and Control Center icon 5074 are re-displayed in a white as illustrated by corresponding Wi-Fi indicator 5066', battery indicator 5068', search icon 5070', Notification Center icon 5072', and Control Center icon 5074'). As illustrated in FIG. 5AA, window 5310' is displayed in expanded form right below the re-displayed menu bar 5220' without any change from FIGS. 5X-5Z. In other words, only menu bar 5220' is re-displayed while window 5210' remains at the same size and position as before the computer system detects input 5284b.

FIG. 5AA shows user input 5284c selecting menu item File 5322'. FIG. 5AB shows a drop-down menu 5340 that is displayed in response to user input 5264c on display 5000. Menu 5340 provides quick access to common commands or tasks that are performed with files for the TV application such as open file, save, close, rename, create new movie recording, create new audio recording, create new screen recording, etc., are listed with associated keyboard shortcut commands under the File menu item 5322'. The drop-down File menu 5340 is displayed below the menu bar 5220' and the notch region 5003, in accordance with some embodiments. For example, the top edge menu 5340 is adjacent to the bottom edge of menu 5220', and also the top edge of menu 5340 is adjacent to a bottom edge of notch region 5003. For example, the menu 5340 is snapped below the menu bar 5220' and the notch 5303. In some embodiments, while the cursor is directed at a location occupied by the menu 5340 or the menu bar 5220', the menu bar 5220' continues to be displayed in black with white menu items. In some embodiments, once the cursor is moved away from the menu bar 5220' and outside drop-down File menu 5340, the menu bar 5220' is automatically hidden again, and another user input is required to re-display it.

As explained above in relation to FIGS. 5X-5Z, in some embodiments, if a window is expanded to full-screen, the window is expanded below the notch region, e.g., the window does not overlap the notch region and/or the region that is typically occupied by the menu bar. For example, application window 5310' is expanded and displayed below the bottom edge of the notch and the menu bar in response to a request to enter full-screen mode, and the shoulder areas around the notch are masked in a color that matches the color of the notch region (e.g., black). In some embodiments, in full-screen mode, an application window expands around the notch region which obstructs the display of portions of the application window's content, as illustrated in FIG. 5AC.

FIG. 5AC shows an application window (e.g., such a window of the Viewer application or a different document and/or picture processing program) that is expanded in full-screen mode around notch region 5303. For example, some applications may benefit and take advantage of the shoulder areas 5006' and 5008' available around notch region 5303. FIG. 5AC shows a version of the full-screen mode where the computer system displays content everywhere on display 5000 where possible to display content, including around the notch region in shoulders 5006' and 5008', as opposed to masking the notch 5003 region by masking the area occupied by the menu bar in black or other color. Displaying the application window 5311 in full-screen mode around the notch region 5303, utilizes the space made available around the notch region 5303 such as left shoulder 5006' and right shoulder 5008'.

In some embodiments, display 5000 is framed so as to form a thin band around the edges such as a bezel. In some embodiments, the top corners of the frame of display 5000 are rounded, whereas the bottom corners 531 and 532 are square (e.g., 90 degrees angle), as illustrated in FIG. 5AC. In some embodiments, display 5000 is touch-sensitive and a stylus 533, as opposed to a trackpad or a mouse, is the input device that is shown in FIG. 5AC. In some embodiments, stylus 533 is moved over the top edge of display 5000 in the right shoulder 5008', and the computer system detects an input contact 533-1 of the tip of stylus 533 touching the display 5000. In response to receiving input contact 533-1, the computer system displays menu bar 5222 in the shoulder regions 5006' and 5008' around notch 5303. For example, application menu items 5350-5355 for the currently active application are re-displayed on left side of the region 5303, and application menu items 5356-5359 are displayed in the opposite side. In some embodiments, menu bar 5222 is displayed in the same color as the background color of the displayed document. In some embodiments menu bar 5222 may be displayed in a wallpaper color or the same color as the desktop. In some embodiments, a user may invoke a variety of commands via controls 5350-5359 that are re-displayed while window 5311 is displayed in full-screen mode (e.g., the document is expanded below notch 53030 and the menu bar 5222)

FIGS. 5AE-5AH illustrate example user interfaces of a cursor interacting with a notch on a display, in accordance with some embodiments. For example, FIGS. 5AE-5AH illustrate movements of a cursor through an area occupied with a notch compared to the same movements through the same area on a screen without a notch. As described herein, when a cursor is moved through the notch (or at least the input requests to move the cursor through a region on the display where the notch is located, e.g., where there are no pixels), the computer system provides visual feedback about the movement of the cursor and/or its interaction with the notch, according to some embodiments.

FIG. 5AE shows assisted movement of cursor 5520' (e.g., a focus selector) from one side of the notch 5303 to the other side of the notch 5303, in accordance with some embodiments. For illustrative purposes, display 5000" without a notch is shown in FIG. 5AE to compare (1) movement of the cursor 5520" through an area unobstructed by a notch (e.g., without assisted movement or stopping cursor 5520" when it reaches a notch) in response to continuous input 5505 with (2) movement of cursor 5520' on display 5000' where the system moves cursor 5520" from left to the right side of notch 5303, e.g., from position 5505b-2 to position 5505c-3.

FIG. 5AE illustrates an example user interface 5600' on a device (e.g., device 300, FIG. 3) with the touch-sensitive surface 451 (e.g., a touchpad 355, FIG. 3) that is separate from the display 5000' or display 5000". Examples that follow will be given with reference to a device that detects inputs on the touch-sensitive surface 451 that is separate from the display, as described above with reference to FIG. 4B. In some embodiments, a location of the menu bar 5222 is indicated with a dashed line 470.

FIG. 5AE shows that the device detects a continuous input contact 5505 from position 5505-1 to position 5505-2, and from position 5505-2 to position 5505-3 on the touch-sensitive surface 451 (e.g., a user slides their finger on the touchpad 335). With respect to display 5000" without a notch, contact 5505-1 corresponds to position 5505a-1 and contact 5505-2 corresponds to position 5505b-1 of cursor 5520" on the display 5000". As illustrated, cursor 5520" is moving substantially horizontally or laterally along the menu bar (its location illustrated with a dashed line 470). Similarly, with respect to display 5000' with notch 5303, contact 5505-1 corresponds to position 5505a-2 and contact 5505-2 corresponds to position 5505b-2 of cursor 5520' on the display 5000'. In some embodiments, since the path from position 5505a-2 to position 5505b-2 of cursor 5520" is unobstructed, the cursor 5520" on display 5000" travels the same distance and travels along the same path as cursor 5520' from position 5505a-1 to position 5505b-1 on display 5000'. For example, the distance dr traveled by cursor 5520" from position 5505a-1 to position 5505b-1 on display 5000" without a notch is the same as distance d1' traveled by cursor 5520' from position 5505a-2 to position 5505b-2 on display 5000' with notch 5303. In some embodiments, it should be noted that the distance d1 traveled by continuous input contact 5505 from position 5505-1 to position 5505-2 on the touch-sensitive surface 451 is proportionate to the distance dr traveled by cursor 5520" on display 5000" (and on display 5000' from position 5505a-2 to position 5505b-2). In some embodiments, the distance d1 and the distance d are the same (but they don't have to be).

Further, the computer system detects a second part of continuous input contact 5505 from position 5505-2 to position 5505-3 on the touch-sensitive surface 451 (e.g., a user slides their finger on the touchpad). With respect to display 5000" without a notch, contact 5505-2 corresponds to position 5505b-1 and contact 5505-3 corresponds to position 5505c-1 of cursor 5520" on the display 5000". As illustrated, cursor 5520" is continuously moving substantially horizontally or laterally on display 5000" along the menu bar (its location illustrated with a dashed line 470) corresponding to the continuous input 5505 on the touch-sensitive surface 451. While the cursor 5520" is moving unobstructed by a notch on display 5000", the distance d2 traveled by continuous input 5505 from position 5505-2 to position 5505-3 on the touch-sensitive surface 451 is proportionate to the distance d2' traveled by corresponding cursor 5520" on display 5000" from position 5505b-1 to position 5505c-1. Unlike movement of cursor 5520" on display 5000" unobstructed by a notch, cursor 5520' on display 5000' is automatically moved from the left side to the right side of notch 5303. For example, as illustrated, while cursor 5520' is continuously moving horizontally on display 5000' along the menu bar, once cursor 5520' reaches a location on the screen that is occupied by notch 5303 such as position 5505b-2 (e.g., as soon as cursor 5520' at least partially overlaps with area without pixels), cursor 5520' is automatically and/or instantaneously moved from position 5505b-2 (on the left side of the notch 5303) to position 5505c-3 (on the right side of the notch 5303). For example, cursor 5520' on display 5000' automatically jumps from position 5505b-2 to position 5505c-3, whereas cursor 5520" on display 5000" continuously moves horizontally from position 5505b-1 to position 5505c-1. In some embodiments, the distance d2" between the position 5505b-2 of the cursor 5520' prior the assisted movement and position 5505c-3, which is the location where cursor 5520' was automatically moved to on display 5000', equals the length L1 of notch 5303. In some embodiments, distance d2" between the position 5505b-2 and position 5505c-3 on display 5000' is not proportionate to distance d2 traveled by continuous input 5505 from position 5505-2 to position 5505-3, and also, distance d2" of the assisted movement is not proportionate to d2', which illustrates how cursor 5520' would have continuously moved if it was not automatically moved by the computer system and it was unobstructed by a notch. In other words, the system assists the movement of the cursor through notch.

FIG. 5AE illustrates that cursor 5520' (e.g., a focus selector) is automatically moved on an opposite side of notch region 5303 that is not capable of displaying content when cursor 5520' reaches the notch region 5303 while moving the cursor 5520' in response to continuous input 5505 on the touch-sensitive surface 451, thereby avoiding obstructing display of the cursor 5520' (or portions thereof). Automatically moving the cursor 5520' from one side of notch 5303 to the opposite side of notch 5303, provides visual feedback (e.g., to a user) about the interaction of the cursor 5520' with notch 5303 and, also, indicates that notch 5303 is an area of display 5000' where cursor 5520' cannot be shown or displayed.

FIG. 5AF shows a different embodiment where cursor 5520' (e.g., a focus selector) is stopped at an edge of notch 5303 while input 5506 on touch-sensitive surface 451 is continuously detected. For example, cursor 5520' is stopped at notch 5303 (as opposed to be being automatically moved from one side of the notch to the other, as in FIG. 5AE) even though a user input is continuously moving on the touch-sensitive surface 451 (e.g., a touchpad 335, FIG. 3). For illustrative purposes, display 5000" without a notch is shown in FIG. 5AF to compare movement of the cursor 5520" through an area unobstructed by a notch in response to continuous input 5506 with continuous movement of cursor 5520' on display 5000' where movement of cursor 5520' is halted when it reaches an edge or a border of notch 5303. For example, while cursor 5520" moves unobstructed by notch 5530 on display 5000", movement of cursor 5520' is stopped when a user requests to move the cursor through notch 5303 on display 5000'. In some embodiments, the computer system generates tactile feedback when cursor 5520' reaches an edge of notch 5530.

FIG. 5AF illustrates an example user interface 5600' on a device (e.g., device 300, FIG. 3) with the touch-sensitive surface 451 that is separate from the display 5000' or display 5000". Examples that follow will be given with reference to a device that detects inputs on the touch-sensitive surface 451 that is separate from the display, as described above with reference to FIG. 4B. In some embodiments, a location of the menu bar is indicated with a dashed line 470.

FIG. 5AF shows that the device detects a continuous input contact 5506 from position 5506-1 to position 5506-2, and from position 5506-2 to position 5506-3 on the touch-sensitive surface 451 (e.g., a user slides their finger on the touchpad 335, FIG. 3). With respect to display 5000" without a notch, contact 5506-1 corresponds to position 5506a-1 and contact 5506-2 corresponds to position 5506b-1 of the cursor 5520" on the display 5000". As illustrated, cursor 5520" is moving substantially horizontally or laterally along the menu bar (its location illustrated with a dashed line 470). With respect to display 5000' with notch 5303, contact 5506-1 corresponds to position 5506a-2 and contact 5506-2 corresponds to position 5506b-2 of cursor 5520' on the display 5000'. In some embodiments, since the path from position 5506a-2 to position 5506b-2 of cursor 5520' is unobstructed, the cursor 5520' on display 5000' travels the same distance and travels along the same path as cursor 5520" from position 5506a-1 to position 5506b-1 on display 5000". For example, the distance a1' traveled by cursor 5520" from position 5506a-1 to position 5506b-1 on display 5000" without a notch is the same as distance a1' traveled by cursor 5520' from position 5506*a*-2 to position 5506*b*-2 on display 5000' with notch 5303. In some embodiments, it should be noted that the distance a1 traveled by continuous input contact 5506 from position 5506-1 to position 5506-2 on the touch-sensitive surface 451 is proportionate to the distance a1' traveled by cursor 5520" on display 5000" (and on display 5000' from position 5506*a*-2 to position 5506*b*-2). In some embodiments, the distance a1 and the distance a1' are the same (but as mentioned, distance a1 and the distance a1' are, optionally, different).

Further, the computer system detects a second part of continuous input contact 5506 from position 5506-2 to position 5506-3 on the touch-sensitive surface 451 (e.g., a user slides their finger on the trackpad). With respect to display 5000" without a notch, contact 5506-2 corresponds to position 5565*b*-1 and contact 5506-3 corresponds to position 5505*c*-1 of cursor 5520" on the display 5000". As illustrated, cursor 5520" is continuously moving horizontally or laterally on display 5000" along the menu bar (its location illustrated with a dashed line 470) corresponding to the continuous input 5506 on the touch-sensitive surface 451. While the cursor 5520" would be moving unobstructed by a notch on display 5000", cursor 5520' is stopped at the notch 5303 (e.g., as soon as it reaches area without pixels) at position 5506*b*-2. Accordingly, while cursor 5520" travels distance a2' from position 5506*b*-1 to position 5506*c*-1 unobstructed by a notch, whereas cursor 5520' stops moving on display 5000' as soon as it reaches the left side of notch 5303. In some embodiments, the distance a2 traveled by continuous input 5506 from position 5506-2 to position 5506-3 on the touch-sensitive surface 451 is proportionate to the distance a2' traveled by corresponding cursor 5520" on display 5000" from position 5506*b*-1 to position 5505*c*-1. Display 5000" shows how cursor 5520" would have continuously moved if it was not stopped at notch 5303 on display 5000'. Unlike movement of cursor 5520" on display 5000" unobstructed by a notch, cursor 5520' on display 5000' is stopped at position 5506*b*-2 adjacent to notch 5303 and input 5506-3 corresponds to position 5506*b*-2 on display 5000'.

FIG. 5AF shows that cursor 5520' is automatically stopped at an edge or border of notch 5303, thereby the computer system avoids obstructing display of cursor 5520' (or portions thereof). Automatically stopping cursor 5520' when continuous input 5506 is received that requests that cursor 5520' is moved through notch 5303, provides visual feedback about interaction of cursor 5520' with notch 5303 and indicates that notch 5303 is not capable of displaying cursor 5520'.

FIG. 5AG shows moving cursor 5520' through notch 5303 while only displaying a portion of cursor 5520' (e.g., only the tail of cursor 5520') that does not overlap with notch 5303, in accordance with some embodiments. For illustrative purposes, display 5000" without a notch is added in FIG. 5AG to compare movement of the cursor 5520" on display 5000" through the same region where a notch 5303 is present in display 5000' based on the same corresponding continuous input 5507 on a touch-sensitive surface 451 (e.g., a touchpad).

FIG. 5AG shows yet another embodiment where cursor 5520' (e.g., a focus selector) moves through notch 5303 while displaying only portions of cursor 5520' on display 5000' and while input 5507 is continuously detected on touch-sensitive surface 451. For example, cursor 5520' is being moved continuously from position 5507*b*-2 to position 5507-*c*-2 through notch 5303 while only displaying a portion of cursor 5520' (as opposed to be being automatically moved as in FIG. 5AE or stopped at notch 5303 as in Figure AF) while a user input 5507 is continuously moving from position 5507*b*-1 to position 5507*c*-1 on the touch-sensitive surface 451.

For illustrative purposes, display 5000" without a notch is added in FIG. 5AG to compare movement of the cursor 5520" through an area unobstructed by a notch (e.g., without hiding any portions of 5520") with movement of cursor 5520' on display 5000' where portions of cursor 5520' are hidden behind the notch 5303 while the cursor 5520' is moved from position 5507*b*-2 to position 5507*c*-2, where cursor 5520' gradually moves away from notch, revealing portions of cursor 5520' that were hidden or not displayed because of notch 5303.

FIG. 5AG shows that the device detects a continuous input contact 5507 from position 5507-1 to position 5507-2, and from position 5507-2 to position 5507-3 on the touch-sensitive surface 451 (e.g., a user slides their finger on the touchpad). With respect to display 5000" without a notch, contact 5507-1 corresponds to position 5507*a*-1 and contact 5507-2 corresponds to position 5507*b*-1 of cursor 5520" on the display 5000". As illustrated, cursor 5520" is moving horizontally or laterally along the menu bar (its location illustrated with a dashed line 470). Similarly, with respect to display 5000' with notch 5303, contact 5507-1 corresponds to position 5507*a*-2 and contact 5507-2 corresponds to position 5507*b*-2 of the cursor 5520' on the display 5000'. In some embodiments, since the path from position 5507*a*-2 to position 5507*b*-2 of cursor 5520' is unobstructed, the cursor 5520' on display 5000' travels the same distance and travels along the same path as cursor 5520" from position 5507*a*-1 to position 5507*b*-1 on display 5000". In some embodiments, it should be noted that the distance traveled by continuous input contact 5507 from position 5507-1 to position 5507-2 on the touch-sensitive surface 451 is proportionate to the distance traveled by cursor 5520" on display 5000".

Further, the computer system detects a second part of continuous input contact 5507 from position 5507-2 to position 5507-3 on the touch-sensitive surface 451 (e.g., a user continuously slides their finger on the touchpad). With respect to display 5000" without a notch, contact 5507-2 corresponds to position 5505*b*-1 and contact 5507-3 corresponds to position 5507*c*-1 of cursor 5520" on the display 5000". As illustrated, cursor 5520" is continuously moving horizontally or laterally on display 5000" along a menu bar (its location illustrated with a dashed line 470) corresponding to the continuous input 5507 on the touch-sensitive surface 451. While the cursor 5520" is moving on display 5000", cursor 5520" is displayed in full and unobstructed by notch region 5303, e.g., all portions of cursor 5520" are visible. Unlike the unobstructed movement of cursor 5520" on display 5000", portions of cursor 5520' are hidden or not displayed, while cursor 5520' is moving from position 5507*b*-2 to position 5507*c*-2 on display 5000'. As illustrated, while cursor 5520' is continuously moving horizontally on display 5000" along the menu bar, once cursor 5520' reaches a location on the screen that is occupied by notch 5303 such as position 5505*b*-2 (e.g., as soon as cursor 5520' at least partially overlaps with area without pixels), portions of cursor 5520' that overlap with notch 5303 are not displayed while cursor 5520' is moved from left to right from position 5507*b*-2 to position 5507*c*-2, respectively. For example, cursor 5520' on display 5000' is only partially displayed when moving from position 5507*b*-2 to position 5507*c*-3, whereas cursor 5520" on display 5000" is fully displayed when moving (uninterrupted or unobstructed) horizontally from position 5505*b*-1 to position 5505*c*-1. In some embodiments, the distance b1 from position 5507-1 to position 5507-3 on touch-sensitive surface 451 is proportionate to the distance b1' traveled by cursor 5520" from position 5507*a*-1 to position 5507*c*-1, and also, cursor 5520' travels the same distance from position 5507*a*-2 to position 5507*c*-2 on display 5000' with notch 5303.

FIG. 5AG illustrates a cursor 5520' is moved through notch 5303 (e.g., that is not capable of displaying content) while only displaying a portion of cursor 5520' that does not overlap with notch 5303 (e.g., only the tail of cursor 5520' is displayed while the tip is hidden), where cursor 5520' is moved in response to continuous input 5507. Displaying only a portion of cursor 5520' when moving cursor 5520' through notch 5303, provides visual feedback about interaction of cursor 5520' with notch 5303 and indicates that notch 5303 is not capable of displaying cursor 5520'.

FIG. 5AH shows yet another embodiment where cursor 5520' (e.g., a focus selector) moves along an outline of notch 5303 without overlapping notch 5303 while input 58508 is continuously detected on touch-sensitive surface 451 (e.g., a touchpad 335, FIG. 3).

For illustrative purposes, display 5000" without a notch is added in FIG. 5AH to compare movement of the cursor 5520" through an area unobstructed by a notch (e.g., without automatically pushing cursor 5520" so as not to overlap with a notch) in response to continuous input 5508 with movement of cursor 5520' on display 5000' where cursor 5520' is automatically moved along an outline of notch 5303, first from position 5580*b*-2 to position 5580*b*-3, where cursor 5520' is shifted slightly vertically down while a tip of cursor 5520' touches notch 5303 and then is further moved horizontally from position 5508*b*-3 to position 5508*c*-2.

FIG. 5AH shows that the device detects a continuous input contact 5508 from position 5508-1 to position 5508-2, and then from position 5508-2 to position 5508-3 on the touch-sensitive surface 451 (e.g., a user slides their finger on the touchpad). With respect to display 5000" without a notch, contact 5508-1 corresponds to position 5508*a*-1 and contact 5508-2 corresponds to position 5508*b*-1 of cursor 5520" on the display 5000". As illustrated, cursor 5520" moves substantially horizontally or laterally along the menu bar (its location illustrated with a dashed line 470). Similarly, with respect to display 5000' with notch 5303, contact 5508-1 corresponds to position 5508*a*-2 and contact 5508-2 corresponds to position 5508*b*-2 of the cursor 5520' on the display 5000'. In some embodiments, since the path from position 5508*a*-2 to position 5508*b*-2 of cursor 5520' is unobstructed, the cursor 5520' on display 5000' travels the same distance and travels along the same path as cursor 5520" from position 5508*a*-1 to position 5508*b*-1 on display 5000", which is proportionate to the distance traveled by input 5508 from position 5508-1 to position 5508-2.

Further, the computer system detects a second part of continuous input contact 5508 from position 5508-2 to position 5508-3 on the touch-sensitive surface 451 (e.g., a user continuously slides their finger on the touchpad). With respect to display 5000" without a notch, contact 5508-2 corresponds to position 5508*b*-1 and contact 5508-3 corresponds to position 5508*c*-1 of cursor 5520" on the display 5000". As illustrated, cursor 5520" is continuously moving horizontally or laterally on display 5000" along a menu bar (its location illustrated with a dashed line 470) in response to the continuous input 5508 on the touch-sensitive surface 451. While the cursor 5520" is moving on display 5000", cursor 5520" is not automatically pushed down or otherwise moved by the computer system so as to avoid a notch.

Unlike the unobstructed movement of cursor 5520" on display 5000", when cursor 5520' on display 5000' reaches notch 5303 at position 5580*b*-2, the computer system automatically moves cursor 5520' down, e.g. vertically, to position 5508*b*-3, while cursor 5520' is moving from position 5508*b*-2 to position 5508*c*-2 on display 5000' without moving vertically. As illustrated, while cursor 5520' is continuously moving horizontally on display 5000' along the menu bar, once cursor 5520' reaches a location on the screen that is occupied by notch 5303 such as position 5508*b*-2 (e.g., as soon as cursor 5520' at least partially overlaps with an area without pixels), cursor 5520' is automatically pushed down the notch region along the outline of notch 5303, including the bottom edge of notch 5303, from position 5508*b*-2 to position 5508*c*-2. For example, cursor 5520' on display 5000' is moved from position 5508*b*-2 to position 5508*b*-3 to avoid the notch 5303 (e.g., along the outline but without overlapping the notch 5303), whereas cursor 5520" on display 5000" is moved only in accordance with input 5508, e.g., only horizontally. In some embodiments, the distance c1 from position 5508-1 to position 5508-3 on touch-sensitive surface 451 is proportionate to the distance traveled by cursor 5520" from position 5508*a*-1 to position 5508*c*-1 on display 5000" without a notch.

FIG. 5AH shows that cursor 5520' is automatically moved along the outline of notch 5303 without overlapping notch 5303, e.g., cursor 5520' is stopped at the border of notch 5303, pushed down along the edge of notch 5303, and moved (or dragged) along the edge while input 5508 is received, which is substantially a horizontal movement that would be moving through the notch 5303 had it not been for the automatic movement along the outline of notch 5303 (e.g., the tip of cursor 5520 is moved along the outline of the notch 5303 instead of automatically moving the cursor 5520' from one side of the notch to the other, hiding portions of it, or stopping it), thereby avoiding the notch that cannot display cursor 5520'. Automatically moving cursor 5520' along the outline of notch 5303 without overlapping notch 5303 as input 5508 is received that requests that the cursor be moved through an area occupied by notch 5303 on display 5000', provides feedback about interaction of cursor 5520' with notch 5303 and indicating that cursor 5520' continues to move according to user input, with an adjusted movement in such a way so as to avoid notch 5303.

FIG. 5AI illustrates user interface 5610, which includes a dock and menu bar (outline of the menu bar is drawn with a dashed line) displayed on display 5600, which has notch 5403. User interface 5610 includes an application window 565 that has been added for illustrative purposes only. In some embodiments, display 5600 is framed by a thin bezel that forms square corners 561 and 562 at the bottom, and rounded corners 563 and 564 at the top, in accordance with some embodiments. In some embodiments, all corners 561-564 may be rounded or all corners 561-564 may be square.

FIG. 5AI shows a user input 5509 moving cursor 5620 from position 5509-1*a* on display 5600 to position 5509-2*a*, towards rounded corner 563, while input 5509 is continuously detected on touch-sensitive surface 451, in accordance with some embodiments. For example, position 5509-1 of contact input 5509 corresponds to position 5509-1*a* and position 5509-2 of contact input 5509 corresponds to position 5509-2*a* on display 5600. In some embodiments, a quick command is executed when cursor 5620 reaches a particular region at any of corners 561-564. For example, as soon as cursor 5620 reaches a region of corner 563 illustrated with a dashed line (e.g., at position 5509-2*a*) where the rounded bezel overlays the rectangular display area (which is in a layer below the bezel), a quick command may be executed (e.g., such as logging out a currently logged-in user and locking the display as illustrated in FIG. 5AJ) without additional user input. Furthermore, when the cursor 5620 is moved towards, and in accordance with a determination that cursor 5620 has reached a pre-determined region in corner 563 (drawn with a dashed line, and not drawn to scale) formed by the rounded bezel at the top, portions of cursor 5620 are hidden or not displayed (e.g., the cursor 5620 appears beneath the rounded corner of the bezel), and the corresponding quick command is instantaneously executed without additional user input. In some embodiments, a particular command may be associated with each corner 561-564. In some embodiments, a user may configure which commands are triggered for a particular corner of corners 561-564. In some embodiments, instead of triggering a particular command, a menu of commands may be revealed as soon as cursor 5620 reaches one of the corners 561-564 (or a dedicated region within one of the corners 561-564).

In some embodiments, in response to user input 5509 that moves cursor 5620 to a corner 563 of display 5600, screen 5600 is directly (without additional user input) locked, and log-in user interface 5610' is displayed on display 5600 with notch 5403, as illustrated in FIG. 5AJ. FIG. 5AJ illustrates that cursor 5620 remains partially hidden by the rounded bezel of display 5600 (e.g., cursor 5620 remains at position 5509-2a within the dedicated region of corner 563). Further, FIG. 5AJ shows that the log-in user interface 5610' is displayed in full-screen mode, including around the notch 5403, e.g., to provide an immersive user interface experience on the display with notch 5403.

FIGS. 6A-6C are flow diagrams illustrating method 600 for interaction of menu bar items with a notch, in accordance with some embodiments. Method 600 is performed at an electronic device (e.g., device 200, FIG. 2, or portable multifunction device 100, FIG. 1A) with a display, a touch-sensitive surface, and one or more sensors to detect intensity of contacts with the touch-sensitive surface. In some embodiments, the display is a touch-screen display, and the touch-sensitive surface is on or integrated with the display. In some embodiments, the display is separate from the touch-sensitive surface. In some embodiments, the display has a notch region (e.g., notch 303 in FIG. 3A) that is not capable of displaying content. Some operations in method 600 are, optionally, combined and/or the order of some operations is, optionally, changed.

As described herein, method 600 automatically distributes menu bar items on a display that has a notch (e.g., a cut out in the display at the top or uppermost edge of the display that houses, for example, one or more cameras, sensors, speakers, speaker grilles, such as hardware components 310-317 in FIG. 3A) so as to utilize display area that is available around a notch (e.g., shoulders 5006 and 5008 in FIGS. 5B, 5D, 5F, 5H, 5J, and 5L) by the use of a display with a notch (e.g., notch 303 in FIG. 3A). In accordance with a determination there is a notch that is incapable of displaying content, method 600 automatically places menu items of the menu bar, which runs along the top edge of the display, on the left and/or right side of the notch, as opposed to blocking out a whole row, which would have a height equal to that of the notch, at the top of the display (e.g., menu items 5102-5110 are placed in the left shoulder 5006 in FIG. 5D; menu items 5051, 5090-5095 are placed in the left shoulder 5006, and menu items 5096, 5097 are placed in the right shoulder 5008 in FIG. 5B; menu items 5112-5118 are placed in left shoulder 5006 and menu items 5120-5124, are placed in the right shoulder 5008 in FIG. 5F, etc.). Use of a notch increases the display area and method 600 utilizes this display area by automatically distributing the menu bar items on the left and right side of the notch. The menu items are automatically distributed (without further user input) in the menu bar depending on the available space that is capable of displaying content (e.g., top edge of the display that is unobstructed by the notch) and is also sufficient to accommodate display of the menu items (e.g., menu items 5051, 5090-5097 in FIG. 5B are automatically distributed; similarly, menu items 5102-510 in FIG. 5D; menu items 5112-5124 in FIG. 5F; menu items 5051, 5126-5142 in FIG. 5H; menu items 5051, 5144-5153 in FIG. 5J; menu items 5051, 5154-5161 in FIG. 5L are also automatically distributed). Automatically distributing menu items in the menu bar so as to circumvent the notch region while at the same time utilizing display area made available by the use of a notch (e.g., using a notch as opposed to a thicker bezel frees up display area around the notch that would have otherwise been occupied by the bezel), performs an operation (e.g., automatically determining positions of the menu items in the menu bar, e.g., depending on the space in the menu bar that is unobstructed by the notch) when a set of conditions has been met (e.g., determining that there is a notch that is incapable of displaying content) without requiring further user input (e.g., there is no need that the user reposition the menu bar or the menu bar items).

A computer system (e.g., a laptop computer such as device 400b, a desktop computer such as device 400a, or tablet computer such as device 400c in FIG. 4C) that is in communication with a display generation component having a display region receives (602) a request (e.g., user selection of application 5046 in FIG. 5F; user selection of application icon 5044 in FIG. 5C; user selection of application icon 5036 in FIG. 5E; user selection of application icon 5042 in FIG. 5G; user selection of application icon 5032 in FIG. 5I; user selection of application icon 5046 in FIG. 5K, etc.) to display a user interface that includes a menu along a first edge of the user interface that corresponds to a first edge of the display region, wherein the menu (e.g., a menu bar that displays menus and icons that can be selected to invoke commands, perform tasks, or to check status information, such as menu bar 5020a in FIG. 5B) includes multiple menu objects, including a first menu object and a second menu object (e.g., menu items 5051, 5090-5097 and menu items 5066-5074 in FIG. 5B). In some embodiments, the request to display the user interface include, but is not limited to, turning on the device/computer system, opening an application, re-displaying an application, opening or displaying a system application such as a desktop application, switching from landscape mode to portrait mode and vice versa, switching displays, entering or exiting full-screen mode or a split-screen mode, plugging in or unplugging an external or a secondary monitor, selecting a user interface element that generates and opens an application window; switching active applications and/or moving opened application windows). In some embodiments, the instruction may be initiated by an operating system of the computer system and/or by a user. In some embodiments, the menu is a rectangular menu bar displayed in an application from which menus (or menu objects) can be selected by a user. In some embodiments, names of available menus are displayed in the menu bar, and choosing one (e.g., with a keyboard or with a mouse) causes a list of options in that menu to be displayed (e.g., a drop-down menu 5340 in FIG. 5AB). In some embodiments, menu objects may be represented as text (e.g., menu items 5090-597 in FIG. 5B) or graphics (menu items 5066-5074 in FIG. 5B).

In some embodiments, the menu is a menu bar (e.g., menu bar 5020*a* and 5020*b* in FIG. 5B) that runs along the top of the screen on a laptop, desktop computer, or a tablet. In some embodiments, the menu bar includes multiple menu objects such as system menu items (e.g., menu items 5066-5074 in FIG. 5B) and application menu items (e.g., menu items 5051, 5090-5097 in FIG. 5B). In some embodiments, the menu objects that are application menus/menu items are displayed on one side and the system menu items are displayed on the other side. In some embodiments the right side of the menu bar may include system menu items. System menu items provide system level functionality such as status menus for indicating battery level (e.g., menu item 5068 in FIG. 5B), network coverage, current time (menu item 5076 in FIG. 5G), weather, location, or date, or provide other system functionality such as search menu module providing searching functionality (e.g., menu item 5070 in FIG. 5B), digital assistant module, etc. In some embodiments, the system menu items that are displayed in the menu bar such as the status menus are customizable. In some embodiments, the system menu items are referred to as menu modules that provide system functionality and may include system control and notification menu modules. In some embodiments, some menu objects that are system menu items are not customizable and as such may be persistently displayed (e.g., menu items 5072 and 5074 in FIGS. 5A-5M). For example, the system and the notification menu modules may be persistently available on the menu bar even when there is insufficient space for all menu items associated with an application that is currently active and/or in focus (e.g., menu items 5072 and 5074 are persistently displayed even though there is not enough space for menu items 5144-5153 in FIG. 5J). In some embodiments, which menu objects are displayed in the menu bar is customizable. In some embodiments, menu objects are system menu objects, and, in others, the menu objects are menu items that represent commands or functionality of native or third-party applications. In some embodiments, menu objects may include menu extras that provide direct access to application developed by third parties (menu items 5073, 5075, and 5071 in FIG. 5M are developed by third parties). In some embodiments, some menu extras are customizable and can be removed in response to user input. In some embodiments, number and/or length of individual menu items and/or their names are customizable and can set by the designer of a particular application. In some embodiments, the priority of the display of menu items is customizable (e.g., an application developer can pre-set in advance which menu items have higher priority of display.

In response to receiving the request (e.g., user selects application icons in dock 5010 from FIGS. 5A, 5C, 5E, 5G, 5I, and 5K) to display the user interface that includes the menu (e.g., menu bars 5020*a* and menu 5020*b* in FIG. 5B; menu bars 5020*c* and 5020*d* in FIG. 5D; menu bars 5020*e* and 5020*f* in FIG. 5F; menu bars 5020*g* and 5020*h* in FIG. 5H; menu bars 5020*i* and 5020*j* in FIG. 5J; and menu bars 5020*k* and 5020*l* in FIG. 5L) that includes multiple menu objects (604) (e.g., menu items 5051, 5090-5097 in FIG. 5B; similarly, menu items 5102-510 in FIG. 5D; menu items 5112-5124 in FIG. 5F; menu items 5051, 5126-5142 in FIG. 5H; menu items 5051, 5144-5153 in FIG. 5J; and menu items 5051, 5154-5161 in FIG. 5L), and in accordance with a determination that the display generation component is not capable of displaying content in a respective portion of the first edge of the display region (e.g., notch 303 and notches 303*a-h* illustrated in FIGS. 3A-3B; and notch 5005 in FIGS. 5B, 5D, 5F, 5H, 5J, and 5L), the computer system displays (606) the first menu object on a first side (e.g., left side) of the respective portion of the first edge of the display region and displaying the second menu object on a second side (e.g., right side) of the respective portion of the first edge of the display region, such that the respective portion is between the first menu object and the second menu object (e.g., menu items 5095 and 5096 are separated by notch 5005 in menu bar 5020*b* in FIG. 5B; menu items 5118 and 5120 are separated by notch 5005 in menu bar 5020*f* in FIG. 5F; menu items 5136 and 5138 are separated by notch 5005 in menu bar 5020*h* in FIG. 5H; menu items 5159 and 5160 are separated by notch 5005 in menu bar 5020*l* in FIG. 5L). In some embodiments, the respective portion is a region without pixels or with significantly less pixel compared to the rest of the display region (e.g., notch 303 and notches 303*a-h* illustrated in FIGS. 3A-3B; and notch 5005 in FIGS. 5B, 5D, 5F, 5H, 5J, and 5L are not capable of displaying content). In some embodiments, the respective region is not capable of displaying content.

In response to receiving the request (e.g., user selects application icons in dock 5010 from FIGS. 5A, 5C, 5E, 5G, 5I, and 5K) to display the user interface that includes the menu that includes multiple menu objects, and in accordance with a determination that the display generation component is capable of displaying content in the respective portion of the first edge of the display region (e.g., there is no notch to obstruct the display of menu items in menu bar 5020*a* in FIG. 5B; menu bar 5020*c* in FIG. 5D, menu bar 5020*e* in FIG. 5F; menu bar 5020*g* in FIG. 5H; menu bar 5020*j* in FIG. 5J; and menu bar 5020*k* in FIG. 5L), the computer system displays (608) in the display region the first and second menu objects adjacent to one another. For example, in the absence of a notch/cutout region, the menu objects are not separated (e.g., menu items 5095 and 5096 are adjacent to one another in menu bar 5020*b* in FIG. 5B; menu items 5118 and 5120 are adjacent to one another in menu bar 5020*f* in FIG. 5F; menu items 5136 and 5138 are adjacent to one another in menu bar 5020*h* in FIG. 5H; menu items 5159 and 5160 are adjacent to one another in menu bar 5020*l* in FIG. 5L).

In some embodiments, in response to receiving the request (e.g., user selects application icons in dock 5010 from FIGS. 5A, 5C, 5E, 5G, 5I, and 5K) to display the user interface that includes the menu that includes multiple menu objects, and in accordance with a determination that there is sufficient space to distribute the multiple menu objects at the first and second sides of the respective portion (e.g., there is sufficient space to distribute menu items 5051, 5090-5097 in left shoulder 5006 and right shoulder 5008 of menu bar 5020*b* in FIG. 5B; similarly, there is sufficient space to distribute menu items 5102-5110 in left shoulder 5006 of menu bar 5020*d* in FIG. 5D), the computer system displays (610) a first set of menu objects, including the first menu object, at the first side of the respective portion (e.g., menu items 5051, 5090-5095 are displayed in left shoulder 5006 in FIG. 5B) and displaying a second set of menu objects, including the second menu object, at the second side of the respective portion (e.g., menu items 5096 and 5097 are displayed in the right shoulder along with system menu items 5004 in FIG. 5B). In some embodiments, the first set of menu objects and the second set of menu objects comprises all of the multiple menu objects of the menu. In some embodiments, the respective portion (e.g., notch 303 and notches 303*a-h* illustrated in FIGS. 3A-3B; and notch 5005 in FIGS. 5B, 5D, 5F, 5H, 5J, and 5L are not capable of displaying content) occludes display of one or more of the multiple menu objects that would have been displayed in the respective portion but for the determination that the respective portion is not capable of displaying content (e.g., menu items 5096 and 5097 in menu bar 5020*a* are displayed in a location where notch 5005 is located in menu bar 5020*b* in FIG. 5B) Accordingly, when there is sufficient space to display the menu items on the left side and the right side of the notch region (e.g., there is sufficient space in the top edge of the display that is unobstructed by the notch region, e.g., the shoulders, and is sufficient to accommodate all of the menu items), the menu items are automatically distributed on the left or right side of the notch, respectively, e.g., the notch is in between two menu items (see distribution of menu items 5051-5057 in menu bar 5020*d* in FIG. 5B; and distribution of menu items 5102-510 in menu bar 5020*d* in FIG. 5D). Automatically distributing the menu items based on the available displayable screen space around the notch region, performs an operation (e.g., automatically determining positions of the menu items in the menu bar, e.g., depending on the space in the menu bar that is unobstructed by the notch region) when a set of conditions has been met (e.g., determining that there is a notch region that is incapable of displaying content) without requiring further user input (e.g., there is no need that the user repositions the menu bar or the menu bar items).

In some embodiments, in accordance with a determination that there is sufficient space to distribute the multiple menu objects at the first and second sides of the respective portion, and in accordance with the determination that the display generation component is capable of displaying content in the respective portion, the computer system displays (612) the menu items substantially evenly spaced from one another (e.g., menu items 5051, 5090-5097 are substantially evenly spaced from one another in menu bar 5020*a* in FIG. 5B; similarly menu items 5051, 5144-5153 are evenly spaced from one another in menu bar 5020*i* in FIG. 5J). Further, in accordance with a determination that there is sufficient space to distribute the multiple menu objects at the first and second sides of the respective portion, and in accordance with the determination that the display generation component is not capable of displaying content in the respective portion, the computer system displays the first set of menu items evenly spaced from one another in a first display region on the first side of the respective portion (e.g., menu items 5051 and 5144-5147 are evenly spaced from one another in shoulder 5006 on the left side of the notch 5005 in menu bar 5020*j* in FIG. 5J), and displaying the second set of menu items in a second display region on the second side of the respective portion (e.g., menu items 5149-5153 are evenly spaced from one another in shoulder 5008 on the right side of the notch 5005 in menu bar 5020*j* in FIG. 5J), where a spacing between an item on a first side of the respective portion of the display (menu items 5147 in menu bar 5020*j* in FIG. 5J) and an item on the second side of the respective portion of the display (menu items 5147 in menu bar 5020*j* in FIG. 5J) is greater than an average spacing between items on the first side of the respective portion of the display and an average spacing between items on the second side of the respective portion of the display (e.g., d2 is greater that the length of notch 5005 in menu bar 5020*j* in FIG. 5J). The presence of the notch region on the display causes the computer system to automatically distribute the application menu items on either side of the notch, e.g., in each shoulder. Further, the computer system automatically (without further user input) spaces the menu items so as to maintain even distance of the menu items from one another in either side of the notch (e.g., dynamic spacing of menu items 5051, 5144-5147 and menu items 5149-5153 in menu bar 5020*j* in FIG. 5J). Automatically distributing the menu items based on the available screen space around the notch region so as to maintain even distance of the menu items from one another in either side of the notch, performs an operation (e.g., automatically determining positions of the menu items in the menu bar, e.g., depending on the space in the menu bar that is unobstructed by the notch region) when a set of conditions has been met (e.g., determining that there is a notch region that is incapable of displaying content) without requiring further user input (e.g., there is no need that the user repositions the menu bar or the menu bar items).

In some embodiments, in response to receiving the request (e.g., user selects application icons in dock 5010 from FIGS. 5E, 5G, 5I, and 5K) to display the user interface that includes the menu (e.g., menu bars 5020*e* and 5020*f* in FIG. 5F; menu bars 5020*g* and 5020*h* in FIG. 5H; menu bars 5020*i* and 5020*j* in FIG. 5J; and menu bars 5020*k* and 5020*l* in FIG. 5L) that includes multiple menu objects (e.g., menu items 5112-5124 in FIG. 5F; menu items 5051, 5126-5142 in FIG. 5H; menu items 5051, 5144-5153 in FIG. 5J; and menu items 5051, 5154-5161 in FIG. 5L), and in accordance with a determination that there is insufficient space to distribute the multiple menu objects at the first and second sides of the respective portion (e.g., there is insufficient space for all menu items 5051, 5112-5124 and menu items 5066-5076 in menu bar 5020*f* in FIG. 5F; similarly, there is insufficient space for all menu items 5051, 5126-5142 and menu items 5066-5075 in menu bar 5020*h* in FIG. 5H; and there is insufficient space for all menu items 5051, 5144-5153 and menu items 5066-5076 in menu bar 5020*j* in FIG. 5J), the computer system displays (614) less than all of the multiple menu objects according to a pre-determined priority (e.g., system menu items 5066, 5068 and 5078 are not displayed in menu bar 5020*f* in FIG. 5F; similarly, system menu items 5066, 5070, and 5076 are not displayed in menu bar 5020*h* in FIG. 5H; application menu item 5148 and system menu items 5066, 5070, and 5076 are not displayed in menu bar 5020*j* in FIG. 5J; and menu items 5078, 5068, 5078, 5066 are not displayed in menu bar 5020*l* in FIG. 5L). In some embodiments, the menu bar includes one or more menu objects that would have been displayed at a location on the display region that at least partially overlaps with the respective portion (e.g., menu items 5138 and 5140 in menu bar 5020*g* in FIG. 5H), which has been determined to be incapable of displaying content. In such case, the menu objects are distributed in such a way as to maintain order and spacing and at the same time avoid the respective portion that cannot display content (e.g., menu item 5138 follows menu item 5136 even though notch 5005 separates menu items 5136 and menu items 5138 in FIG. 5H). However, in some embodiments, there is insufficient space to distribute the menu objects as the space taken up by the respective region that is incapable of displaying content does not leave enough room to display all of the menu objects in the menu bar. In such case, the computer system determines priority of which items to display and which items to forego displaying (e.g., system menu items 5066, 5068 and 5078 are not displayed in menu bar 5020*f* in FIG. 5F; similarly, system menu items 5066, 5070, and 5076 are not displayed in menu bar 5020*h* in FIG. 5H; application menu item 5148 and system menu items 5066, 5070, and 5076 are not displayed in menu bar 5020*j* in FIG. 5J; and menu items 5078, 5068, 5078, 5066 are not displayed in menu bar 5020*l* in FIG. 5L). Accordingly, if there is insufficient space to display all of the menu items because the space that remains unobstructed by the notch region is not large enough (e.g., there is insufficient space in the shoulders to accommodate all of the menu items), the computer system automatically determines which menu items to display and which menu items to forego from displaying according to a pre-determined priority. Automatically determining which menu items to display when the available screen space is insufficient, performs an operation (e.g., prioritizing display of the menu items) when a set of conditions has been met (e.g., determining that the screen space around the notch that remains capable of displaying content is insufficient to display all of the menu items) without requiring further user input (e.g., there is no need that the user repositions the menu bar or the menu bar items).

In some embodiments, the multiple menu objects include one or more application menu items and one or more system menu items and displaying less than all of the multiple menu objects according to the pre-determined priority comprises (616) prioritizing the display of application menu items over system menu items (e.g., displaying application menu items 5112-5124 is prioritized over system menu items 5066, 5068 and 5078 in menu bar 5020*f* in FIG. 5F; similarly, displaying application menu items 5051, 5126-5142 is prioritized over system menu items 5066, 5070, and 5076 in menu bar 5020*h* in FIG. 5H; and displaying application menu items 5051, 5154-5161 is prioritized over system menu items 5078, 5068, 5078, 5079 in menu bar 5020*l* in FIG. 5L). Accordingly, if there is insufficient space for all menu items in the menu (e.g., because the respective region or notch obstructs the display of content), the computer system display the application menu items over the system menu items according to the pre-determined priority to provide space for displaying application menu items (e.g., the computer system forgoes displaying one or more of the system menu items such as battery indicator, Wi-Fi status indicator, network coverage indicator, etc., in favor of displaying all of the application icons). In some embodiments, in the menu bar, which is at the top of the screen, different types of menu items are displayed such as standard, system-provided, or custom menus, which are defined by application developers. For example, the menu bar includes standard menu items such as a main menu for the particular application (e.g., system menu 5051 in FIGS. 5A-5M) that is in the foreground (or otherwise in focus) and other standard menus including, but not limited to, a file menu, an edit menu, a view menu, a window menu, and a help menu (e.g., a file menu 5091, an edit menu 5092, a view menu 5093, a window menu 5096, and a help menu 5097 in FIG. 5A; a file menu 5054, an edit menu 5056, a view menu 5058, a window menu 5062, and a help menu 5064 in FIGS. 5C, 5E, 5G, 5I, and 5K). In some embodiments, the menu bar further includes application-specific menu items. For example, a browser application may include History and Bookmarks menus that are application-specific (e.g., application menu items 5136 and 5138 in FIG. 5H), and the mail application may include Mailbox menu, Message, and Format that are application-specific menu items. In some embodiments the application developers/designers determine the names and number of items in the menu bar, e.g., following guidelines and other system constraints that provides consistency across different applications and application developers. In some embodiments, the operating system may provide standard menu items. In addition, in some embodiments, the menu bar includes system menu items that are determined by the operating system and that may not be modified by the foreground application (e.g., system menu items 5072 and 5074 in FIGS. 5A-5M). In some embodiments, the menu bar includes a main application menu that is available while the application is in the foreground application and includes or provides access to a number of commands that apply to the application as whole, rather than particular sub-process running within the application such as a particular window or document (e.g., Locator menu item 5052 for the Locator application in FIG. 5A; App Shop menu item 5102 for the App Shop application in FIGS. 5D and 5G; Web menu item 5126 for the Web application in FIG. 5H; Viewer menu item 5154 in the Viewer application in FIG. 5L). For example, the main application menu may include commands such as hide the app, quit the app, display other open app windows, etc. In some embodiments, the name of the main application menu item is the name of the application and is, optionally, visually distinguished from the rest of the menu items, e.g., the name is displayed in bold. As mentioned, in some embodiments, the menu bar includes system menu items that are determined by the system and may not be modified by the application that is being active or is in focus. Such system menu items may be displayed on the opposite side from the application menu items and are, optionally, represented by an icon as opposed to text (e.g., system menus 5078, 5068, 6079, 5066, 5072, 5074 are represented by an icon). In some embodiments. such system menu items include status menus, and other system menus for providing system functionality such as searching, notifications, access to system commands, access to a virtual or digital assistant, etc. (e.g., system menus 5066-5074 in FIGS. 5A-5B and 5C-5D; system menus 5066-5076 in FIGS. 5E-5J; and system menus 5078, 5068, 6079, 5066, 5072, 5074 in FIG. 5L)

Accordingly, if there is insufficient space to display all of the menu items because the space in the menu bar that remains unobstructed by the notch region is not large enough (e.g., there is insufficient space in the shoulders to accommodate all of the menu items), the system automatically prioritizes display of the application menu items over displaying the system menu items (e.g., the status menus displayed on the opposite side of the application menu items), thereby the menu bar automatically (without additional user input) maintains consistent display of the menu items (e.g., from a display without a notch compared to display with a notch) and, at the same time, accommodates the notch. Automatically prioritizing display of the application menu items over the system menu items, performs an operation (e.g., displaying less than all menu items in the menu bar according to a pre-determined priority) when a set of conditions has been met (e.g., when there is insufficient space for all menu items in the menu bar that is unobstructed by the notch) without requiring further user input (e.g., there is no need that the user repositions the menu bar, selects the menu bar items to be displayed or adjusts positions of the menu items).

In some embodiments, the multiple menu objects include application menu items and system menu items, and displaying less than all of the multiple menu objects according to a pre-determined priority comprises (618) displaying some of the system menu items (e.g., at least one or more system menu items that provide essential system functionality are displayed, such as system menu items 5072 and 5074 in menu bar 5020*j* in FIG. 5J) and displaying some of the application menu items, wherein displaying some of the system menu items is prioritized over displaying the application menu items (e.g., system menu items 5072 and 5074 are prioritized over application menu item 5148 that is not displayed in menu bar 5020*j* in FIG. 5J). In some embodiments, the system menu items include one or more system menu items that provide access to an essential system functionality or frequently accessed or used system functionality (e.g., system menu items 5072 and 5074 in FIGS. 5A-5M). These system menu items are preconfigured to be persistently accessible from the menu bar (e.g., by selecting an icon in the menu bar). These system menu items (the ones that provide access to essential or frequently accessed system functionality) are available regardless of the available space for other menu items that are requested to be displayed on the menu bar such as other system menu items (e.g., system menu items 5072 and 5074 in FIG. 5J are prioritized over system menu items 5066, 5070, and 5076) or application menu items (e.g., system menu items 5072 and 5074 in FIG. 5J are prioritized over application menu 5148, which is not displayed in menu bar 5020*j*). In other words, system menu items that provide essential system functionality are not dropped in case there is insufficient space.

Accordingly, when there is insufficient space in the menu bar (e.g., which remains unobstructed by the notch) to display all of the menu items, the system automatically prioritizes display of one or more system menu items (e.g., system menu items that provide critical or frequently used system functionality) over all other menu items in the menu bar, thereby the computer system automatically (without additional user input) maintains consistent display of system-level functionality in the menu bar that is essential for interacting with the system and, at the same time, accommodates the notch (e.g., the region incapable of displaying content). Automatically prioritizing display of some system menu items over all other menu items, performs an operation (e.g., displaying less than all menu items in the menu bar on a display with a notch according to a pre-determined priority) when a set of conditions has been met (e.g., when there is insufficient space for all menu items in the menu bar that is unobstructed by the notch) without requiring further user input (e.g., there is no need that the user repositions the menu bar, selects the menu bar items to be displayed or adjusts positions of the menu items).

In some embodiments, the computer system adds (618) undisplayed system menu items of the multiple menu items (e.g., icons that can be selected to invoke commands, perform tasks, or request status information) to a system command menu (e.g., control center 5162 in FIG. 5M) that can be accessed from the display region. In some embodiments, system menu items that are dropped from the menu bar are added to the system command menu (e.g., user switch icon 5079 and battery indicator 5068 are added to Control Center 5162 in FIG. 5M), which is a collection of system commands or system status indicators that may be opened, accessed, or viewed by selecting an icon in the menu bar. In some embodiments, system command menu provides a quick/direct access to key system settings or frequently used commands or controls including, but not limited to, volume control (e.g., sound control 5164 in FIG. 5M), display brightness control (e.g., display brightness control 5163 in FIG. 5M), Wi-Fi (e.g., WiFi control 5066 displayed in Control Center 5162 in FIG. 5M), Bluetooth or other network or communication controls, "Do Not Disturb" control, etc. In some embodiments, the system command menu may be customized to add other items or controls, such as accessibility shortcuts or user switching, etc. In some embodiments, the system menu items that are provided with the operating system may be accessible from the control center (e.g., the battery, the sound, the Wi-Fi status indicator, language settings, location, time, etc.), whereas other menu items, such as application menu items or menu extras provided by third parties, are not accessible via the system command menu, which may be reserved for providing system functionality as opposed to application specific, in accordance with some embodiments. In some embodiments, the system command menu (e.g., control center 5162 in FIG. 5M), also includes application specific functionality such as control for playing music on a music application of the computer system.

Accordingly, when not all system menu items are displayed, the commands or functionality associated with the system menu items that are not displayed are made available automatically (e.g., without further user input) under a system command menu that provides access to high priority or frequently used system functionality, where the system command menu is directly accessible from the menu bar (e.g., the system command menu is persistently displayed without regard for available space for other menu items) to ensure integrity of the functionality provided by the menu bar, thereby providing access to the same system functionality from the menu bar without further user input (e.g., the functionality is added as sub-menu items under the system command menu automatically by the computer system). Automatically making functionality associated with the system menu items that are not displayed available from another system menu item that is displayed, e.g., the system command menu), performs an operation (e.g., providing access to system functionally from the menu bar that otherwise cannot be displayed in the menu bar) when a set of conditions has been met (e.g., when there is not enough space to display the respective system menu items) without requiring further user input (e.g., there is no need for the user to select the system menu items and add them to a list of sub-menu items that are displayed when the system command menu is selected).

In some embodiments, the respective portion is (620) a notch in the display region (e.g., notch 303 and notches 303*a-h* illustrated in FIGS. 3A-3B; and notch 5005 in FIGS. 5B, 5D, 5F, 5H, 5J, and 5L are not capable of displaying content). The notch region is a cut-out in the center of the topmost edge of the screen that houses hardware components such as cameras, sensors, etc., and is used to increase the screen-to-body ratio of the computer system. The notch region, however, obstructs display of some parts of the menu bar as the menu bar runs along the same topmost edge of the display, and thereby creates an irregular screen shape in the display region, and occupies space where otherwise content such as the menu bar is displayed. Automatically adjusting display of the menu items to accommodate the notch region at the topmost edge of the display, performs an operation (e.g., automatically determining positions of the menu items in the menu bar on a screen with a notch based on the space in the menu bar that is unobstructed by the notch region) when a set of conditions has been met (e.g., determining that there is a notch region that is incapable of displaying content) without requiring further user input (e.g., there is no need that the user reposition the menu bar or the menu bar items).

In some embodiments, the display region along the first edge of the display region includes (622) a first display region on the first side of the respective portion (e.g., a left display shoulder 5006 on the left side of notch 5005 in FIGS. 5B, 5D, 5F, 5H, and 5J) and a second display region on the second side of the respective portion (e.g., a right display shoulder 5008 on the right side of notch 5005 in FIGS. 5B, 5D, 5F, 5H, and 5J). A first set of menu objects of the multiple menu objects are application menu items that are displayed in the first display region (e.g., menu items 5102-5110 in FIG. 5D), and a second set of menu objects of the multiple menu objects are system menu items that are displayed in the second display region (e.g., system menu items shown in shoulder 5008 in FIG. 5D). In some embodiments, the application menu items change depending on which application is being used. In some embodiments, system menu items (e.g., system menu items 5066-5074 in FIGS. 5A-5D) are displayed only one side of the notch region and are not distributed on both side of the notch region (e.g., as opposed to the application menu items, which would be automatically distributed in accordance with method 600 if there isn't sufficient space in only one shoulder of notch region. In some embodiments, the application menu items are displayed in the first display region (e.g., the left shoulder 5006 in FIGS. 5B, 5D, 5F, 5H, and 5J) and the system menu items, and menu extras are typically displayed in the second display region (e.g., the right shoulder 5008 in FIGS. 5B, 5D, 5F, 5H, and 5J). In some embodiments, this order is reversed for some languages. In some embodiments, the application menu items change when the application is changed, whereas the menu extras (e.g., third-party menu extras 5073, 5075, and 5071 in FIG. 5L) and the system menu items are maintained when the application is changed (except when some system menu items are not displayed due to lack of space in accordance with method 600).

The presence of the notch region on the display frees up display area that would otherwise be obstructed by a bezel or other frame that may run along the edges of the screen, thereby maximizing the display area (e.g., increasing the screen-to-body ratio), and also introducing an irregular screen shape. Automatically distributing menu items in the menu bar so as to circumvent the notch region while at the same time utilizing screen space that has been made available by the use of a notch (e.g., using a notch as opposed to a bezel frees up space around the notch that would have otherwise been used by the bezel), performs an operation (e.g., automatically determining positions of the menu items in the menu bar, e.g., depending on the space in the menu bar that is unobstructed by the notch region) when a set of conditions has been met (e.g., determining that there is a notch region that is incapable of displaying content) without requiring further user input (e.g., there is no need that the user reposition the menu bar or the menu bar items).

It should be understood that the particular order in which the operations in FIGS. 6A-6B have been described is merely an example and is not intended to indicate that the described order is the only order in which the operations could be performed. One of ordinary skill in the art would recognize various ways to reorder the operations described herein.

FIGS. 7A-7C are flow diagrams illustrating method 700 for displaying application windows on a display with a notch, in accordance with some embodiments. Method 700 is performed at an electronic device (e.g., device 200, FIG. 2, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described herein, method 700 automatically shifts an application window that is moved to and/or placed in a position of the display (e.g., in response to user input such as a drag operation and drop operation) where the application window overlaps with a notch (e.g., the notch partially obstructs display of portions of content of the application window). The application window is moved or shifted such that all of the content in the application window is displayed and visible, and the application window is positioned such that it no longer overlaps with the notch (e.g., the window is moved adjacent to the notch, e.g., below or on the side of the notch). Automatically changing the application window's position so as to avoid any obstructions by the notch, provides for more efficient mechanism for managing application windows that are placed or moved (e.g., dragged from one position to another) on a display that has a notch incapable of displaying content. Automatically moving the application window so as to circumvent the notch, performs an operation (e.g., automatically moving app windows such that the application windows do not overlap with the notch) when a set of conditions has been met (e.g., determining that a portion of the application window overlaps with the non-display region) without requiring further user input. Performing an operation when a set of conditions has been met without requiring further user input controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

A computer system (e.g., a laptop computer such as device 400*b*, a desktop computer such as device 400*a*, or tablet computer such as device 400*c* in FIG. 4C) that is in communication with a display generation component (e.g., display 5000 in FIGS. 5N-5Z) having a display region and a non-display region (e.g., a predefined region that is not configured to display content, such as notch 303 and notches 303*a*-*h* illustrated in FIGS. 3A-3B and notch 5003 in FIGS. 5N-5Z) displays (702), via the display generation component, an application window (e.g., any application window of an application that may be installed on the computer system or available on the internet, e.g., via the cloud or otherwise, such as application window 5202 in FIGS. 5N-P and photo 5210 in FIGS. 5Q-5T). In some embodiments, the application without is associated with an application that is open, active, in focus, or at the forefront. In some embodiments, the application window is the frontmost or foreground window. In some embodiments, the application window is an opened window that is not active and is at least partially visible (e.g., behind other application windows in the background. The computer system detects (704), via the one or more input devices, an input moving the application window (e.g., a mouse input, a stylus input, a touch input on a touch-sensitive surface such as a touchscreen, a voice command, a gaze command via an eye-tracking device, or any other input mechanism may be used to move the application window, such as input 5204 moving application window 5202 from position 5202*a* to position 5202*b* in FIG. 5N, and input 5206 moving photo 5210 from position 5210*a* to position 5210*b* in FIG. 5Q). In some embodiments, the application window may be dragged by its title bar to a target position, e.g., with the cursor, finger, or mouse. While detecting the input moving the application window (e.g., while the window is being dragged), the computer system moves (706) the application window in accordance with the input to a first position (e.g., the computer moves application window 5202 from position 5202*a* to position 5202*b* in accordance with input 5204 in FIG. 5N, and the computer moves photo 5210 from position 5210*a* to position 5210*b* in accordance with input 5206 in FIG. 5Q). The computer detects (708) detects an end of the input (e.g., liftoff if the touch input or a release of a mouse click or other type of end of the input, such liftoff 5204-3 of contact 5204 from the touch-sensitive surface 451, which represents the end of contact 5204 in FIG. 5O and a liftoff 5206-3 of contact 5206 from the touch-sensitive surface 451, which represents the end of contact 5206 in FIG. 5R). In response (710) to detecting the end of the input and in accordance with a determination that at least a portion of the application window overlaps with the non-display region (e.g., application window 5202 overlaps with notch 5003 at position 5202*b* in FIG. 5O, and photo 5210 overlaps with notch 5003 at position 5210*b* in FIG. 5R), the computer system (automatically, without additional user input) moves (712) the application window from the first position to a different second position wherein the second position for the application window is automatically selected so that the application window (e.g., including the portion that was overlapping with the non-display region) does not overlap with the non-display region (e.g., the computer moves application window 5202 from position 5202*b* to position 5202*c* where application window 5202 does not overlap with notch 5003 in FIG. 5P, and the computer moves photo 5210 from position 5210*b* to position 5210*c* or position 5210*d* where photo 5210 does not overlap with notch 5003 in FIGS. 5S and 5T). In some embodiments, the application window is aligned with the notch region when automatically moved, e.g., the application window and the notch are aligned without overlapping. In some embodiments, multiple windows may be aligned with each other and the notch. In some embodiments, the system automatically determines a position of the application window that is adjacent to the notch and aligned with the notch, but where the application window is not overlapping with the notch.

In response to detecting the end of the input and in accordance with a determination that the application window does not overlap with the non-display region (e.g., a display notch such notch 303 in FIG. 3A), the computer system displays (714) (e.g., or maintains display of) the application window at the first position. For example, the window is placed at a position determined in accordance with the user input (e.g., at the location of the liftoff following the dragging input), without automatic adjustment of the position of the window.

In some embodiments, in response to detecting the end of the input (e.g., liftoff 5204-3 of contact 5204 from the touch-sensitive surface 451, which represents the end of contact 5204 in FIG. 5O and a liftoff 5206-3 of contact 5206 from the touch-sensitive surface 451, which represents the end of contact 5206 in FIG. 5R), and in accordance with the determination that at least a portion of the application window overlaps with the non-display region (e.g., application window 5202 overlaps with notch 5003 at position 5202*b* in FIG. 5O), the computer system automatically (e.g., without additional user input) moves (716) the application window vertically from the first position to the second position such that the application window is below the non-display region and a top edge of the application window is adjacent to a bottom edge of the non-display region (e.g., the computer moves application window 5202 substantially vertically from position 5202*b* to position 5202*c* where application window 5202 does not overlap with notch 5003 in FIG. 5P). In some embodiments, the application window is pushed or shifted in a downward direction (e.g., without moving the window horizontally) so that the portion of the application window that overlapped with the non-display region no longer overlaps with the non-display region and the application window is adjacent to and/or aligned with the notch, e.g., such as the bottom edge of the notch (e.g., see FIGS. 5N-5P). Accordingly, application windows are automatically shifted down (or vertically) in accordance with a determination that a user input requests to place or move the window over the non-display region (e.g., in position where the application window at least partially overlaps the non-display region, such as position 5202*b* of application window 5202 in FIG. 5O). Automatically moving application windows down such that all of the content in the application window is displayed and visible, and the application window is positioned such that it no longer overlaps with the non-display region (e.g., the window is moved adjacent to the notch, e.g., below the notch, aligned with the notch, adjacent to the bottom edge of the notch, etc., such as application window 5202 is moved from position 5202*b* to position 5202*c* in FIG. 5P) provides for more efficient mechanism for managing application windows that are placed or moved (e.g., dragged from one position to another) on a display that has a region incapable of displaying content. Shifting the application window down, and thereby automatically changing the application window's position so as to avoid any obstructions by a non-display region formed in the display by a cutout or notch, provides for more efficient mechanism for managing application windows that are placed or moved (e.g., dragged from one position to another) on a display that has a region incapable of displaying content. Automatically moving the application window so as to circumvent the non-display region, performs an operation (e.g., automatically moving app windows away from the notch) when a set of conditions has been met (e.g., determining that a portion of the application window overlaps with the non-display region) without requiring further user input.

In some embodiments, in response to detecting the end of the input (e.g., liftoff if the touch input or a release of a mouse click or other type of end of the input, such liftoff 5204-3 of contact 5204 from the touch-sensitive surface 451, which represents the end of contact 5204 in FIG. 5O and a liftoff 5206-3 of contact 5206 from the touch-sensitive surface 451, which represents the end of contact 5206 in FIG. 5R), and in accordance with the determination that at least a portion of the application window overlaps with the non-display (e.g., application window 5202 overlaps with notch 5003 at position 5202*b* in FIG. 5O, and photo 5210 overlaps with notch 5003 at position 5210*b* in FIG. 5R), the computer system automatically (e.g., without further user input) moves (718) the application window horizontally from the first position to the second position such that the application window is displayed on a side of the non-display region, and a side edge of the application window is adjacent to a side edge of the non-display region (e.g., photo 5210 is automatically moved substantially horizontally from position 5210*b* to position 5210*c* in FIG. 5S). In some embodiments, the application window is pushed or shifted in a leftward or rightward direction (e.g., without also moving the application window vertically) so that the portion of the application window that overlapped with the non-display region no longer overlaps with the non-display region and the application window is set to a position that is adjacent to and aligned with the left or right side edges of the notch, respectively (e.g., see photo 5210 in FIG. 5S). Accordingly, application windows are automatically shifted to the left side or right side of the notch (e.g., horizontally or laterally) in accordance with a determination that user input requests to place or move the window over the notch (e.g., in position where the application window at least partially overlaps the non-display region). The application window is moved or shifted to the left or right side such that all of the content in the application window is displayed and visible, and the application window is positioned such that it no longer overlaps with the notch (e.g., the window is moved adjacent to the notch, e.g., below the notch, aligned with the notch, adjacent to the bottom edge of the notch, etc.). Shifting the application window to the left or right side of the notch, and thereby automatically changing the application window's position so as to avoid any obstructions by the notch region, provides for more efficient mechanism for managing application windows that are placed or moved (e.g., dragged from one position to another) on a display that has a notch region incapable of displaying content. Automatically moving the application window so as to circumvent the notch region, performs an operation (e.g., automatically moving app windows away from the notch) when a set of conditions has been met (e.g., determining that a portion of the application window overlaps with the non-display region) without requiring further user input.

In some embodiments, the application window may be adjusted both vertically and horizontally (e.g., photo 5210 is automatically moved substantially horizontally and vertically from position 5210*b* to position 5210*c* in FIG. 5S). For example, the application window may be pushed not only to the side, but it may also be pushed vertically so as to align with the top edge of the display generation component.

In some embodiments, the second position, which is automatically selected is (720) a position, adjacent to the non-display region, where the application window first contacted the non-display region (e.g., a point of contact where the cursor drags the application window over a side of the notch region, thereby crossing over and overlapping the non-display region) while detecting the input moving the application window. In some embodiments, the application window is moved in such a way as to be aligned with an edge of the notch that was crossed by the application window in response to the user's input (e.g., application window 5202 crossed the bottom edge of notch 5003 and is thus aligned with the bottom edge of notch 5003 at position 5202*c* in FIG. 5P; photo 5210 crossed the left side edge of notch 5003 and is this aligned with left side of notch 5003 in position 5210*c* in FIG. 5S). In some embodiments, the application window is placed closest to the first position requested by the received input. Application windows are automatically shifted to the left or side of the notch (e.g., horizontally or laterally) in accordance with a determination that user input requests to place or move the window over the notch (e.g., in position where the application window at least partially overlaps the non-display region). The application windows are moved or shifted to the left or right side such that all of the content in the application windows is displayed and visible, and the application window is automatically placed at a position adjacent to where a border of the window (first) contacted a border of the notch. Shifting the application window to the left or right side of the notch, and thereby automatically changing the application window's position so as to avoid any obstructions by the notch region, provides for more efficient mechanism for managing application windows that are placed or moved (e.g., dragged from one position to another) on a display that has a notch region incapable of displaying content. Automatically moving the application window so as to circumvent the notch region, performs an operation (e.g., automatically moving app windows away from the notch at a position that is adjacent to where the application window first contacted the non-display region) when a set of conditions has been met (e.g., determining that a portion of the application window overlaps with the non-display region) without requiring further user input.

In some embodiments, while detecting the input moving the application window (e.g., continuous contact 5204 from position 5204-1 to position 5204-2 in FIG. 5N, and continuous contact 5206 on the touch-sensitive surface 451 from position 5206-1 to position 5206-2), and before detecting the end of the input (e.g., before detecting liftoff 5204-3 of contact 5204 from the touch-sensitive surface 451, which represents the end of contact 5204 in FIG. 5O; before detecting a liftoff 5206-3 of contact 5206 from the touch-sensitive surface 451, which represents the end of contact 5206 in FIG. 5R), the computer system displays (724) portions of the application window that do not overlap with the non-display region while forgoing display of portions of the application window that would have overlapped with the non-display region (e.g., a portion of the content is not displayed as it is occluded by the notch region, such as a portion of application window 5202 is occluded by notch 5003 at position 5202*b* in FIG. 5O and a portion of photo 5210 is occluded by notch 5003 at position 5210*b* in FIG. 5Q). When an application window is dragged over the non-display region (e.g., a notch 5003 in FIG. 5O), the non-display region obstructs/hides display of portions of content that would otherwise be displayed in the application window. Hiding portions of the window that overlap with the non-display region while the window is being dragged on the display through the non-display region provides the user with visual feedback that the window continues to move in response to the user's input (or that the computer system is responsive to the user's input), and at the same time, provides visual feedback that the window is being moved through a region in the display that is not capable of displaying content. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while detecting the input moving the application window (e.g., continuous contact 5204 from position 5204-1 to position 5204-2 in FIG. 5N, and continuous contact 5206 on the touch-sensitive surface 451 from position 5206-1 to position 5206-2), and before detecting the end of the input (e.g., before detecting liftoff 5204-3 of contact 5204 from the touch-sensitive surface 451, which represents the end of contact 5204 in FIG. 5O; before detecting a liftoff 5206-3 of contact 5206 from the touch-sensitive surface 451, which represents the end of contact 5206 in FIG. 5R), in accordance with a determination that the input requests to move the application window through the non-display region, the computer system shifts (726) the application while the application is being moved to avoid the location of the non-display region while the application is being moved. When the user's input requests to move an application window through the non-display region (e.g., a notch 5003 in FIGS. 5N-5T), the application window is automatically moved along an outline of the non-display region without overlapping the non-display region, e.g., the window is moved along a path different from the one based on the user's input such that the application window avoids the non-display region, and at the same time maintains proximity to the borders of the notch and is also responsive to the user's input. Automatically moving the application window along the outline of the non-display region without overlapping the non-display region as user input requests that the app window is moved through the non-display region, provides the user with visual feedback that the window continues to move in response to the user's input, and, performs an operation (e.g., automatically moving application to avoid overlapping the non-display region) when a set of conditions has been met (e.g., determining that there is a region that is incapable of displaying content that is on the path requested by the user input) without requiring further user input (e.g., there is no need that the user reposition the application window away from the non-display region).

In some embodiments, the computer system displays (728) a menu along a first edge of the user interface that corresponds to a first edge of the display region, wherein the menu includes multiple menu objects (e.g., menu bar 5220 in FIG. 5V that includes application menu items 5051, 5320-5326 and system menu items 5066-5074). In some embodiments, if the notch obstructs display of some menu items in the menu bar, method 600, described in more detail above, automatically determines display priority of the menu items so as to accommodate the notch (e.g., menu item 5324 is separated from menu items 5325 by notch 5303 in FIG. 5V). The computer system further detects, via the one or more input devices, a request to display the application window in a full-screen mode (e.g., a user input such as pressing on a function key on a keyboard (e.g., virtual or hardware) or a touch bar, voice command, eye-gaze command, touch input or other gesture, mouse click on a menu displayed in the application window, etc., such as user input 5284a in FIG. 5V). It should be noted that the term full-screen mode should not be construed literally. Full-screen mode is a mode in which a window is expanded to occupy the available displayable surface of a screen as opposed to presenting content in a graphical window (or frame), which occupies only portions of the screen and leaves unoccupied areas and/or areas occupied by other user interface elements. For example, full-screen mode shows as much content as possible by hiding elements such as status bars, navigation bars, toolbars, menu bars, etc. In full-screen mode, a window is expanded as much as it is allowed to, without the operating system's typical window-framing interface and other restrictions (e.g., display size). In response to the request to display the application window in the full-screen mode, the computer system ceases displaying the menu bar, including ceasing to display the first and the second menu objects, and displays the application window in the full-screen mode without the application window overlapping the non-display region (e.g., menu bar 5220, which includes application menu items 5051, 5320-5326 and system menu items 5066-5074 is no longer displayed in FIGS. 5X-5Z and window 5310 is expanded and displayed below the notch region 5303 and aligned with the notch region 5303 in FIGS. 5X-5Z). For example, the application window is pushed down under the notch such that a rectangular that represents the outline of the application window is below and aligned with the notch and there is no menu bar or application content displayed in the shoulder regions around the notch (e.g., window 5310 is expanded and displayed below the notch region 5303 in FIGS. 5X-5Z, and menu bar 5220, which includes application menu items 5051, 5320-5326 and system menu items 5066-5074 are hidden from display). Accordingly, application windows are automatically displayed in full-screen mode without any portion of the application window overlapping the non-display region. For example, the application window is expanded to the bottom edge of the non-display region (e.g., the window is enlarged and toolbars and other menus within the window are removed, and the window is displayed below the notch), and the menu bar is removed from display. Automatically expanding the application window while also avoiding any obstructions by the notch region, provides for more efficient mechanism for entering and exiting full-screen mode on a display that has a region incapable of displaying content, and performs an operation (e.g., entering full-screen mode without overlapping the non-display region) when a set of conditions has been met (e.g., a request to enter full-screen mode has been received) without requiring further user input (e.g., the system automatically determined how to place the screen in full-screen mode with having the non-display region obstructing content display).

In some embodiments, displaying the application window in full-screen mode without any portion of the application window overlapping the non-display region includes (730) displaying the application window such that a top edge of the application window (e.g., edge 5312 in FIG. 5X) is adjacent to a bottom edge of the non-display region, and areas of the display region above the top edge of the application window (e.g., the areas or shoulders that are formed above the top edge of the application window on each side of the notch region are displayed in a color matching a color of the non-display region (e.g., the shoulder regions are displayed in the color of notch so as to mask the notch, see FIGS. 5X-5Y). In some embodiments, the menu bar is removed from the top edge of the display region (e.g., in response to a request to enter full-screen mode, the system hides or ceases to display the menu bar), and this makes a space in the display region, above the top edge of the app window, that does not include application content to display. In some embodiments, the shoulders are colored in black so as to form a top band (e.g., above the application window where the menu bar was previously displayed) in which the borders between the notch and the shoulders are indistinguishable or hard to distinguish with a human eye (see FIGS. 5X-5Y). For example, when the user requests to enter full-screen mode, the system hides the menu bar (menu bar 5220, which includes application menu items 5051, 5320-5326 and system menu items 5066-5074 are hidden from display in FIGS. 5X-5Z) and pushes the full-screen or otherwise expanded application window under the notch such that a rectangular application window is displayed right under/adjacent to the notch region, and the application window and the notch are aligned such that the content in the application window appears to be displayed below or under a black band on the top of the screen (e.g., window 5310 is expanded and displayed below the notch region 5303 in FIGS. 5X-5Z). Application windows are expanded and displayed below the bottom edge in response to a request to enter full-screen mode, and the areas around the non-display region (e.g., above the top edge of the expanded application window) are masked in a color that matches the color of the non-display region (e.g., black). Masking the areas around the non-display region, provides visual feedback to the user indicating that the window is displayed in a full-screen mode, and automatically removes clutter from the screen that may otherwise impede the immersive experience that full-screen mode requires. Expanding application windows to full-screen while automatically circumventing a non-display region, and masking the non-display region (e.g., of irregular shape), provides for more efficient and mechanism for entering and exiting full-screen mode on a display that has a region incapable of displaying content, and performs an operation (e.g., entering full-screen mode without overlapping the non-display region while also masking the non-display region and the areas around it, such as the shoulders) when a set of conditions has been met (e.g., a request to enter full-screen mode has been received) without requiring further user input (e.g., the system automatically determines how to expand the screen on a display with a non-display region that obstructs the display of the application content).

In some embodiments, while displaying the application window in full-screen mode, the computer system detects (732), via the one or more input devices, a request to display the menu bar (e.g., or re-display the menu bar that was removed in response to entering full-screen mode, such as input 5284*b* is detected in FIG. 5Z). In some embodiments, the request may include, but it is not limited to, a focus selector or a cursor that is moved over the top edge of the display, a voice command, a touch input, gaze commands or gestures, etc. In response to the request to display the menu bar, the computer system displays the menu bar in the color that matches the color of the non-display region (e.g., menu bar 5220' is displayed in black to match the color of notch 5303 in FIG. 5AA). In some embodiments, when the application enters a full-screen mode, the color of the menu bar changes from one color, e.g., from a first color such as the wallpaper or background color, to a second color that matches the color of the notch such as black such that the menu bar and the notch form a uniform band on one side of the display, e.g., the top edge. When the application window is displayed in full-screen mode, the non-display region is masked by hiding the menu bar and displaying the vacated areas around the non-display region in the color of the non-display region (e.g., menu bar 5220 is hidden and the shoulders around notch 5303 are displayed in black in FIGS. 5X-5Z). In response, to a request to re-display the menu bar, the system automatically masks the non-display region by displaying the menu bar in a matching color. The method automatically masks the non-display region in response to a request to re-display the menu bar when in full-screen mode, while it also utilizes the space made available around the non-display region. Automatically masking the non-display region while also utilizing the space made available by it, provides visual feedback to the user about the screen mode indicating that the screen is in full-screen mode, and performs an operation (e.g., re-displaying the menu bar while also masking the non-display region to maintain the immersive experience of the full-screen mode) when a set of conditions has been met (e.g., a request to re-display the menu bar is received while an application window is displayed in a full-screen mode) without requiring further user input (e.g., the system automatically determines how to display the menu bar while also hiding a non-display region that obstructs the display of the application content and the menu bar).

In some embodiments, displaying the menu bar further includes (734) displaying the multiple menu objects in the menu bar in a color that contrasts the color of the menu bar and the non-display region (e.g., white menu objects displayed on black menu bar, such as menu items 5051', 5320'-5326', 5066'-5074' are displayed in white, whereas menu bar 5220' is displayed in black in FIG. 5AA). In this way, the full-screen size of the application window is maintained while the shoulders are utilized to (re-)display the menu objects thus maximizing the real estate on the display. Accordingly, in response to a request to re-display the menu bar after it was hidden when an application window entered full-screen mode, the system automatically masks the non-display region by displaying the menu bar in a matching color, and the menu bar objects in a contrasting color (e.g., white menu objects on a black menu bar). The method automatically masks the non-display region while also re-displays the menu bar and its menu objects while the window is in full-screen mode, and also utilizes the space made available around the non-display region. Automatically masking the non-display region while also utilizing the space made available by it, provides visual feedback to the user about the screen mode indicating that the screen is in full-screen mode, and performs an operation (e.g., re-displaying the menu bar and its menu objects while also masking the non-display region to maintain the immersive experience of the full-screen mode) when a set of conditions has been met (e.g., a request to re-display the menu bar is received while an application window is displayed in a full-screen mode) without requiring further user input (e.g., the system automatically determines how to display the menu bar while also hiding a non-display region that obstructs the display of the application content and the menu bar).

In some embodiments, in response to detecting the request to display the application window in full-screen mode, the computer system ceases (736) to display the multiple menu objects (e.g., menu bar 5220 application menu items 5051, 5320-5326 and system menu items 5066-5074 are ceased to be displayed in FIGS. 5X-5Z). Further, in some embodiments, while displaying the application window in full-screen mode, the computer detects (738) a movement of a cursor in an area adjacent the non-display region (e.g., the computer system detects input 5284*b* that is directed to a location where menu bar 5220 was previously displayed, see FIG. 5Z). In response to detecting the movement of the cursor, the computer system displays one or more of the multiple menu objects (e.g., displays the menu objects in white on a black menu bar, such menu bar 5220' is redisplayed in black, whereas menu items 5051', 5320'-5326', 5066'-5074' are displayed in white in FIG. 5AA). In some embodiments, the one or more of the multiple menu objects are displayed in an appearance that is different from an appearance when the application window is not in full-screen mode (e.g., the menu objects are displayed in white and the color of the shoulders is black, and the notch is also black, whereas when there is no application window that is in full-screen mode, the menu bar has a standard color such as grey or the color of the wallpaper, and the menu objects are usually black, and so is the notch). When the application window is displayed in full-screen mode, the non-display region is masked by hiding the menu bar and displaying the vacated areas around the non-display region in the color of the non-display region. In response, to detecting a movement of a cursor in an area adjacent the non-display region while the screen is in full-screen mode (e.g., detecting the cursor moves over the topmost edge of the display where the menu bar is displayed when the application window is not in full-screen mode), the multiple menu objects are displayed in appearance that is different from the appearance of the multiple menu objects when displayed in a normal mode (e.g., not full-screen mode). Displaying the multiple menu objects in appearance that is different from the appearance of the multiple menu objects when displayed in a normal mode, provides visual feedback to the user about the mode of the screen indicating that the mode is full-screen mode, while at the same time utilizing the space made available by the introduction of the non-display region.

In some embodiments, the non-display region is (742) a notch in the display region (e.g., a cutout in the display that houses hardware components such as notch 303 in FIG. 3A; notch 5303 in FIGS. 5U-5AE). The notch region is a cut-out in the center of the topmost edge of the screen that houses hardware components (e.g., hardware that needs to be front-facing such as cameras, sensors, etc.) and is used to increase the screen-to-body ratio of computer system/electronic device. The notch region, however, obstructs display of content included in application windows. Automatically adjusting positions of application windows in the display to accommodate the notch region, performs an operation (e.g., automatically moving application to avoid overlapping the notch) when a set of conditions has been met (e.g., determining that there is a notch region that is incapable of displaying content and is overlapping the application window) without requiring further user input (e.g., there is no need that the user reposition the application window away from the notch).

In some embodiments, the computer system detects (744), via the one or more input devices, a request to display the application window in full-screen mode (e.g., user input 5284a in FIG. 5V). In response to the request to display the application window in full-screen mode, the computer system ceases display of the menu bar including the first menu object and the second menu object, and displays the application window in full-screen mode such that the non-display region is a notch in the application window where content is not displayed (e.g., while the window is in full-screen mode the notch represents a cutout from content displayed in the application window, which is displayed in full-screen size; see FIG. 5AC, where application window 5311 is displayed in full-screen mode and extends to corners of display 5000 and around the notch region 5303). For example, the application window is enlarged so that it touches all four edges of the display (e.g., the notch 5303 is surrounded by content of application 5311 in FIG. 5AC). Displaying the application window in full-screen mode such that the non-display region is a notch in the application window where content is not displayed, utilizes the space made available around the non-display region, and performs an operation (e.g., entering full-screen mode on a display with a non-display region) when a set of conditions has been met (e.g., a request to enter full-screen mode has been received) without requiring further user input (e.g., the system automatically determines how to display windows in full-screen mode where there is a non-display region on the display).

It should be understood that the particular order in which the operations in FIGS. 7A-7C have been described is merely an example and is not intended to indicate that the described order is the only order in which the operations could be performed. One of ordinary skill in the art would recognize various ways to reorder the operations described herein.

FIGS. 8A-8B are flow diagrams illustrating method 800 for interaction of a focus selector (or a cursor) with a notch, in accordance with some embodiments. Method 800 is performed at an electronic device (e.g., device 200, FIG. 2, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described herein, when the user's input requests to move the focus selector through the non-display region (e.g., a notch, cutout, etc.), method 800 provides visual feedback about the movement of the focus selector (e.g., cursor 5220' in FIGS. 5AE-5AH) and/or its interaction with the non-display region (e.g., notch 303 in FIG. 3A; notch 5303 in FIGS. 5AE-5AH) and provides visual feedback indicating that the requested movement path of the focus selector would include moving through a region which is not capable of displaying the focus selector.

A computer system that is in communication with a display generation component (e.g., display 5000' in FIGS. 5AE-5AH) having a display region, and one or more input devices, displays (802), via the display generation component, a user interface (e.g., an application window, a desktop application interface, etc.). The computer system further detects (804), via the one or more input devices (e.g., touch-sensitive surface 451 in FIGS. 5AE-5AH), an input moving a focus selector (e.g., input 5505 moving cursor 5220' in FIG. 5AE; input 5506 moving cursor 5220' in FIG. 5AF; input 5507 moving cursor 5520' in FIG. 5AG; and input 5508 moving cursor 5520' in FIG. 5AH). In accordance with a determination that the input is moving (806) the focus selector through a predetermined region (e.g., notch 5303 in FIGS. 5AE-5AH), and in accordance with a determination that the predetermined region cannot display content (e.g., notch 5303 in FIGS. 5AE-5AH does not have pixels or it has insufficient number of pixels), the computer system provides (808) visual feedback showing that the focus selector would be (or is) moving through the predetermined region that is not capable of displaying content (e.g., visual feedback indicating the movement path of the focus selector goes through or is cut by the non-display region; see movement of cursor 5220' on display 5000' in FIGS. 5AE-5AH). In accordance with a determination that the input is moving the focus selector through a predetermined region, and in accordance with a determination that the predetermined region is configured to display content, the computer system does not provide (820) the visual feedback (e.g., the moving cursor is displayed while moving through the predetermined region without changing the appearance of the cursor or without changing the movement path of the cursor; see movement of cursor 5220" on display 5000" in FIGS. 5AE-5AH).

In some embodiments, the visual feedback that the computer system provides includes (810), in accordance with a determination that the input requests to move the focus selector through the predetermined region (e.g., input 5506 requests to move cursor 5520' through notch 5303 in FIG. 5AF), the computer system stops (812) movement of the focus selector at an edge of the predetermined region (e.g., even as the user continues to request movement through the predetermined region; see FIG. 5AF and the associated description, where cursor 5220' is stopped at the left side edge of notch 5303). Accordingly, the focus selector is automatically stopped at the edge or border of the non-display region, thereby avoiding obstructing display of the focus selector (or portions thereof). Automatically stopping the focus selector when an input is received that requests that the focus selector is moved through the non-display region, provides the user with visual feedback about interaction of the focus selector with the non-display region and indicates that the non-display region is not capable of displaying the focus selector.

In some embodiments, the visual feedback that the computer system provides includes, in accordance with a determination that the input requests to move the focus selector through the predetermined region (e.g., input 5505 requests to move cursor 5520' through notch 5303 in FIG. 5AE), the computer system automatically moves (814) the focus selector to an opposite side of the predetermined region at a position that is adjacent to a border of the non-display region (e.g., the focus selector is moved as if it was teleported from one side of the notch to the other; see FIG. 5AE and the associated description, where cursor 5220' is automatically moved from position 5505b-2 to position 5505c-3). A focus selector is automatically moved on an opposite side of a non-display region when the focus selector reaches the non-display region while moving the focus selector in response to an input thereby avoiding obstructing display of the focus selector (or portions thereof). Automatically moving the focus selector through the pre-determined region, provides the user with visual feedback about interaction of the focus selector with the non-display region and indicates that the non-display region is not capable of displaying the focus selector.

In some embodiments, in accordance with a determination that the input requests to move the focus selector through the predetermined region (e.g., input 5507 request to move cursor 5520' through notch 5303 in FIG. 5AG), the visual feedback includes the computer system moves (816) the focus selector through the predetermined region while only displaying a portion of the focus selector that does not overlap with the predetermined region (e.g., only the tail of the focus selector is displayed, and the tip of the focus selector is hidden; see FIG. 5AG and the associated description, where only the tail of cursor 5220' is displayed when cursor 5220' is moved from position 5507b-2 to position 5507c-2). Accordingly, a focus selector (e.g., a cursor 5220' in FIG. 5AG) is moved through a predetermined region (e.g., notch 5303 in FIG. 5AG that is not capable of displaying content) while only displaying a portion of the focus selector that does not overlap with the predetermined region (e.g., only the tail of the focus selector is displayed while the tip is hidden) when moving the focus selector in response to an input. Displaying only a portion of the focus selector when moving the focus selector through the pre-determined region, provides the user with visual feedback about interaction of the focus selector with the non-display region and indicates that the non-display region is not capable of displaying the focus selector.

In some embodiments, the input includes (822) a request to move the focus selector in a first direction (e.g., input 5508 from position 5508-1 to position 5508-2 requests to move the focus selector in a rightward direction). Further, the visual feedback that the computer system provides includes moving the focus selector in the first direction (e.g., leftward or rightward) by an amount determined based on the input, and moving the focus selector in a second direction, different from the first direction (e.g., downward), by an amount determined based on a distance between the location of the focus selector and an edge of the predetermined region. (e.g., push downward the cursor by a distance determined from the requested location of the cursor to the bottom edge of the notch, such as cursor 5220' is moved from position 5508b-2 to position 5508b-3). Accordingly, the focus selector/cursor is automatically moved along an outline of the non-display region without overlapping the non-display region, e.g., the focus selector is stopped at the border of the non-display region and dragged around it while input is received that requests to move the focus selector through the non-display region (e.g., instead of moving through the notch, the cursor moves around the edges or along the outline of the notch), thereby avoid obstructing display of portions of the focus selector (see FIG. 5AH and the associated description). Automatically moving the focus selector along the outline of the non-display region without overlapping the non-display region as input is received that requests that the focus selector is moved through the non-display region, provides the user with visual feedback about interaction of the focus selector with the non-display region and indicating that the focus selector continues to move according to user input, with an adjusted movement in such a way so as to avoid a region that is not capable of displaying the focus selector.

In some embodiments, after moving the focus selector in the first direction by the amount determined based on the input and moving the focus selector in the second direction by the amount determined based on the distance between the location of the focus selector and the edge of the predetermined region, the computer system detects (824) further input corresponding to a request to move the focus selector in the first direction. In response to detecting the further input, the computer system, moves the focus selector in the first direction by an amount determined based on the further input (e.g., leftward or rightward), and moving the focus selector in a direction that is opposite to the second direction (the selector is moved upward along the outline of the notch, e.g., by the amount determined based on the distance between the edge of the predetermined region and the location of the focus selector before the focus selector was moved in the second direction.

It should be understood that the particular order in which the operations in FIGS. 8A-8B have been described is merely an example and is not intended to indicate that the described order is the only order in which the operations could be performed. One of ordinary skill in the art would recognize various ways to reorder the operations described herein.

The operations described above with reference to FIGS. 6A-6B, 7A-7C, and 8A-8C are, optionally, implemented by components depicted in FIGS. 1A-1B. For example, requests to move the application window or the cursor, requests to display an application, requests to display an application in full-screen mode, etc., are (optionally) implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An electronic device, comprising:
   a display generation component having a display region;
   a touch-sensitive surface;
   one or more processors; and
   memory storing one or more programs, wherein the one or more programs are configured to be executed by the one or more processors, the one or more programs including instructions for:
   receiving a request to display a user interface that includes a menu along a first edge of the user interface that corresponds to a first edge of the display region wherein the first edge of the display region has a respective location on the electronic device relative to a physical keyboard that is attached to the electronic device, wherein the menu includes multiple menu objects, including a first menu object and a second menu object;
   in response to receiving the request to display the user interface that includes the menu that includes multiple menu objects:
   in accordance with a determination that the display generation component is not capable of displaying content in a first respective portion of the first edge of the display region as the first respective portion does not include pixels, displaying the first menu object on a first side of the first respective portion of the first edge of the display region and displaying the second menu object on a second side of the first respective portion of the first edge of the display region, such that the first respective portion is between the first menu object and the second menu object and the second menu object is displayed in a second respective portion, distinct from the first respective portion, of the display region in the first edge of the user interface; and
   in accordance with a determination that the display generation component is capable of displaying content in the first respective portion of the first edge of the display region, displaying in the display region the first and second menu objects adjacent to one another and displaying, in the second respective portion of the display region in the first edge of the user interface.

2. The electronic device of claim 1, wherein the one or more programs include instructions for:
   in response to receiving the request to display the user interface that includes the menu that includes multiple menu objects:
   in accordance with a determination that there is sufficient space to distribute the multiple menu objects at the first and second sides of the first respective portion, displaying a first set of menu objects, including the first menu object, at the first side of the first respective portion and displaying a second set of menu objects, including the second menu object, at the second side of the first respective portion.

3. The electronic device of claim 2, wherein the one or more programs include instructions for:

in accordance with the determination that the display region is capable of displaying content in the first respective portion, displaying the menu objects substantially evenly spaced from one another; and
in accordance with the determination that the display region is not capable of displaying content in the first respective portion, displaying the first set of menu objects evenly spaced from one another in a first display region on the first side of the first respective portion, and displaying the second set of menu objects in a second display region on the second side of the first respective portion, wherein a spacing between a menu object on a first side of the first respective portion of the display and a menu object on the second side of the first respective portion of the display is greater than an average spacing between items on the first side of the first respective portion of the display and an average spacing between items on the second side of the first respective portion of the display.

4. The electronic device of claim 1, wherein the one or more programs include instructions for:
   in response to receiving the request to display the user interface that includes the menu that includes multiple menu objects:
   in accordance with a determination that there is insufficient space to distribute the multiple menu objects at the first and second sides of the first respective portion, displaying less than all of the multiple menu objects according to a pre-determined priority.

5. The electronic device of claim 4, wherein the multiple menu objects include one or more application menu items and one or more system menu items, and wherein displaying less than all of the multiple menu objects according to a pre-determined priority comprises prioritizing the display of the one or more application menu items over the one or more system menu items.

6. The electronic device of claim 4, wherein the multiple menu objects include application menu items and system menu items, and displaying less than all of the multiple menu objects according to a pre-determined priority comprises:
   displaying some of the system menu items; and
   displaying some of the application menu items; and
   wherein displaying some of the system menu items is prioritized over displaying the application menu items.

7. The electronic device of claim 4, wherein the one or more programs include instructions for adding undisplayed system menu items of the multiple menu objects to a system command menu that can be accessible from the display region.

8. The electronic device of claim 1, wherein the first respective portion is a notch in the display region.

9. The electronic device of claim 1, wherein the display region along the first edge of the display region includes a first display region on the first side of the first respective portion and a second display region on the second side of the first respective portion, and wherein a first set of menu objects of the multiple menu objects are application menu items that are displayed in the first display region, and a second set of menu objects of the multiple menu objects are system menu items that are displayed in the second display region.

10. The electronic device of claim 1, wherein:
    the menu, including the first menu object and the second menu object, are associated with a respective application;

the first menu object, included in the menu, is associated with a first set of one or more commands associated with the respective application; and the second menu object, included in the menu, is associated with a second set of one or more commands associated with the respective application.

11. The electronic device of claim 1, wherein:

the menu, including the first menu object and the second menu object, are associated with a respective application;

the one or more programs include instructions for:
  detecting a selection input directed to a respective menu object of the multiple menu objects;
  in response to detecting the selection input:
    in accordance with a determination that the selection input is directed to the first menu object, displaying a first drop-down menu with one or more first options, wherein selecting a respective option of the first drop-down menu causes the electronic device to perform a first respective operation associated with the respective application; and
    in accordance with a determination that the selection input is directed to the second menu object, displaying a second drop-down menu with one or more second options, wherein selecting a respective option of the second drop-down menu causes the electronic device to perform a second respective operation associated with the respective application.

12. The electronic device of claim 1, wherein:

a content window is displayed in the user interface concurrently with the menu; and the one or more programs include instructions for:
  detecting an input requesting to display the content window in a full-screen mode;
  in response to the input requesting to display the content window in the full-screen mode:
    expanding the content window such that a top edge of the content window is adjacent to a bottom edge of the first respective portion, wherein the first respective portion is not capable of displaying content; and
    ceasing to display the first menu object and the second menu object.

13. The electronic device of claim 12, wherein the one or more programs include instructions for:

detecting a second input directed to the menu; and in response to detecting the second input directed to the menu, redisplaying the first menu object and the second menu object.

14. The electronic device of claim 1, wherein:

the menu is a first menu associated with a first application, and the multiple menu objects include a first number of menu objects; and the one or more programs include instructions for:
  detecting a request to display a user interface of a second application different from the first application;
  in response to the request to display the user interface of the second application, ceasing to display the first menu and displaying a second menu along the first edge of the display region, wherein the second menu is different from the first menu and the second menu includes a second number of menu objects different from the first number of menu objects, including a first respective menu object, a second respective menu object, and a third respective menu object, including:
    in accordance with a determination that the display generation component is not capable of displaying content in the first respective portion of the first edge of the display region, displaying the first respective menu object on the first side of the first respective portion of the first edge of the display region and displaying the second respective menu object and the third respective menu object on the second side of the first respective portion of the first edge of the display region, such that the first respective portion is between the first respective menu object and the second respective menu object and the second respective menu object is adjacent to the third respective menu object; and
    in accordance with a determination that the display generation component is capable of displaying content in the first respective portion of the first edge of the display region, displaying the first respective menu object adjacent to the second respective menu object and the second respective menu object adjacent to the third respective menu object.

15. The electronic device of claim 1, wherein the first edge of the display region corresponds to a long edge of a laptop computer display or a desktop computer display.

16. The electronic device of claim 1, wherein the first edge of the display region is parallel to a top edge of the physical keyboard that is attached to the electronic device.

17. The electronic device of claim 1, wherein the physical keyboard is communicatively attached to the electronic device.

18. A non-transitory computer readable storage medium storing one or more programs, the one or more programs comprising instructions, which, when executed by a computer system with a display generation component having a display region, and a touch-sensitive surface, cause the computer system to:

receive a request to display a user interface that includes a menu along a first edge of the user interface that corresponds to a first edge of the display region wherein the first edge of the display region has a respective location on the computer system relative to a physical keyboard that is attached to the computer system, wherein the menu includes multiple menu objects, including a first menu object and a second menu object;

in response to receiving the request to display the user interface that includes the menu that includes multiple menu objects:
  in accordance with a determination that the display generation component is not capable of displaying content in a first respective portion of the first edge of the display region as the first respective portion does not include pixels, display the first menu object on a first side of the first respective portion of the first edge of the display region and display the second menu object on a second side of the first respective portion of the first edge of the display region, such that the first respective portion is between the first menu object and the second menu object and the second menu object is displayed in a second respective portion, distinct from the first respective portion, of the display region in the first edge of the user interface; and in accordance with a determination that the display generation component is capable of displaying content in the first respective portion of the first edge of the display region, display in the display region the first and second menu objects adjacent to one another and display, in the second respective portion of the display region in the first edge of the user interface, a third menu object different from the first menu object and the second menu object.

19. The non-transitory computer readable storage medium of claim 18, wherein the one or more programs comprising the instructions cause the computer system to, in response to receiving the request to display the user interface that includes the menu that includes multiple menu objects:
in accordance with a determination that there is sufficient space to distribute the multiple menu objects at the first and second sides of the first respective portion, display a first set of menu objects, including the first menu object, at the first side of the first respective portion and display a second set of menu objects, including the second menu object, at the second side of the first respective portion.

20. The non-transitory computer readable storage medium of claim 19, wherein the one or more programs the instructions cause the computer system to:
in accordance with the determination that the display region is capable of displaying content in the first respective portion, display the menu objects substantially evenly spaced from one another; and
in accordance with the determination that the display region is not capable of displaying content in the first respective portion, display the first set of menu objects evenly spaced from one another in a first display region on the first side of the first respective portion, and display the second set of menu objects in a second display region on the second side of the first respective portion, wherein a spacing between a menu object on a first side of the first respective portion of the display and a menu object on the second side of the first respective portion of the display is greater than an average spacing between items on the first side of the first respective portion of the display and an average spacing between items on the second side of the first respective portion of the display.

21. The non-transitory computer readable storage medium of claim 18, wherein the one or more programs comprising the instructions cause the computer system to, in response to receiving the request to display the user interface that includes the menu that includes multiple menu objects:
in accordance with a determination that there is insufficient space to distribute the multiple menu objects at the first and second sides of the first respective portion, display less than all of the multiple menu objects according to a pre-determined priority.

22. The non-transitory computer readable storage medium of claim 21, wherein the multiple menu objects include one or more application menu items and one or more system menu items, and displaying less than all of the multiple menu objects according to a pre-determined priority comprises prioritizing the display of the one or more application menu items over the one or more system menu items.

23. The non-transitory computer readable storage medium of claim 21, wherein the multiple menu objects include application menu items and system menu items, and displaying less than all of the multiple menu objects according to a pre-determined priority comprises:
displaying some of the system menu items; and
displaying some of the application menu items; and
wherein displaying some of the system menu items is prioritized over displaying the application menu items.

24. The non-transitory computer readable storage medium of claim 21, wherein the one or more programs comprising the instructions cause the computer system to add undisplayed system menu items of the multiple menu objects to a system command menu that can be accessible from the display region.

25. The non-transitory computer readable storage medium of claim 18, wherein the first respective portion is a notch in the display region.

26. The non-transitory computer readable storage medium of claim 18, wherein the display region along the first edge of the display region includes a first display region on the first side of the first respective portion and a second display region on the second side of the first respective portion, and wherein a first set of menu objects of the multiple menu objects are application menu items that are displayed in the first display region, and a second set of menu objects of the multiple menu objects are system menu items that are displayed in the second display region.

27. The non-transitory computer readable storage medium of claim 18, wherein:
the menu, including the first menu object and the second menu object, are associated with a respective application;
the first menu object, included in the menu, is associated with a first set of one or more commands associated with the respective application; and
the second menu object, included in the menu, is associated with a second set of one or more commands associated with the respective application.

28. The non-transitory computer readable storage medium of claim 18, wherein:
the menu, including the first menu object and the second menu object, are associated with a respective application;
the one or more programs comprising the instructions cause the computer system to:
detect a selection input directed to a respective menu object of the multiple menu objects;
in response to detecting the selection input:
in accordance with a determination that the selection input is directed to the first menu object, display a first drop-down menu with one or more first options, wherein selecting a respective option of the first drop-down menu causes the computer system to perform a first respective operation associated with the respective application; and
in accordance with a determination that the selection input is directed to the second menu object, display a second drop-down menu with one or more second options, wherein selecting a respective option of the second drop-down menu causes the computer system to perform a second respective operation associated with the respective application.

29. The non-transitory computer readable storage medium of claim 18, wherein:
a content window is displayed in the user interface concurrently with the menu; and
the one or more programs comprising the instructions cause the computer system to:
detect an input requesting to display the content window in a full-screen mode;
in response to the input requesting to display the content window in the full-screen mode:

expand the content window such that a top edge of the content window is adjacent to a bottom edge of the first respective portion, wherein the first respective portion is not capable of displaying content; and cease to display the first menu object and the second menu object.

30. The non-transitory computer readable storage medium of claim 29, wherein the one or more programs the instructions cause the computer system to:

detect a second input directed to the menu; and in response to detecting the second input directed to the menu, redisplay the first menu object and the second menu object.

31. The non-transitory computer readable storage medium of claim 18, wherein:

the menu is a first menu associated with a first application, and the multiple menu objects include a first number of menu objects; and the one or more programs the instructions cause the computer system to:

detect a request to display a user interface of a second application different from the first application;

in response to the request to display the user interface of the second application, cease to display the first menu and display a second menu along the first edge of the display region, wherein the second menu is different from the first menu and the second menu includes a second number of menu objects different from the first number of menu objects, including a first respective menu object, a second respective menu object, and a third respective menu object, including:

in accordance with a determination that the display generation component is not capable of displaying content in the first respective portion of the first edge of the display region, display the first respective menu object on the first side of the first respective portion of the first edge of the display region and display the second respective menu object and the third respective menu object on the second side of the first respective portion of the first edge of the display region, such that the first respective portion is between the first respective menu object and the second respective menu object and the second respective menu object is adjacent to the third respective menu object; and in accordance with a determination that the display generation component is capable of displaying content in the first respective portion of the first edge of the display region, display the first respective menu object adjacent to the second respective menu object and the second respective menu object adjacent to the third respective menu object.

32. The non-transitory computer readable storage medium of claim 18, wherein the first edge of the display region corresponds to a long edge of a laptop computer display or a desktop computer display.

33. The non-transitory computer readable storage medium of claim 18, wherein the first edge of the display region is parallel to a top edge of the physical keyboard that is attached to the computer system.

34. The non-transitory computer readable storage medium of claim 18, wherein the physical keyboard is communicatively attached to the computer system.

* * * * *